United States Patent
Harms

(10) Patent No.: US 12,081,672 B2
(45) Date of Patent: Sep. 3, 2024

(54) DISTRIBUTED LEDGER APPLIANCE AND METHODS OF USE

(71) Applicant: MICRON TECHNOLOGY, INC., Boise, ID (US)

(72) Inventor: Jonathan D. Harms, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 1054 days.

(21) Appl. No.: 16/573,855

(22) Filed: Sep. 17, 2019

(65) Prior Publication Data

US 2021/0083876 A1   Mar. 18, 2021

(51) Int. Cl.
*H04L 9/32* (2006.01)
*G06Q 20/06* (2012.01)
*G06Q 20/38* (2012.01)
*H04L 9/00* (2022.01)

(52) U.S. Cl.
CPC ....... *H04L 9/3218* (2013.01); *G06Q 20/0658* (2013.01); *G06Q 20/389* (2013.01); *G06Q 2220/10* (2013.01); *H04L 9/50* (2022.05); *H04L 2209/56* (2013.01)

(58) Field of Classification Search
CPC ..... H04L 9/3218; H04L 9/50; H04L 2209/56; G06F 1/3275; G06F 1/08; G06F 1/3206; G06F 1/324; G06F 1/3225; G06F 1/3296; G06F 11/008; G06F 11/3037; G06F 11/3409; G06F 2201/81; G06Q 20/0658; G06Q 20/389; G06Q 2220/10
See application file for complete search history.

(56) References Cited

U.S. PATENT DOCUMENTS 11,057,188 B2 * 7/2021 Nogayama .............. G06F 21/51
11,063,744 B2 * 7/2021 Schmidt-Karaca ... H04L 9/0618
11,079,945 B2 * 8/2021 Irshad .................... G06F 3/0604
(Continued)

OTHER PUBLICATIONS

Extended European Search Report, EP20865896.3, mailed on Aug. 23, 2023.
(Continued)

*Primary Examiner* — Saleh Najjar
*Assistant Examiner* — Devin E Almeida
(74) *Attorney, Agent, or Firm* — Greenberg Traurig

(57) ABSTRACT

Computerized apparatus using characterized devices such as memories for intensive computational applications such as blockchain processing. In one embodiment, the computerized apparatus comprises a computational appliance (e.g., stand-alone box, server blade, plug-in card, or mobile device) that includes characterized memory devices. These memory devices are associated with a range of performances over a range of operational parameters, and can be used in conjunction with a solution density function to optimize memory searching. In one embodiment, the ledger appliance can communicate with other ledger appliances to create and/or use a blockchain ledger so as to facilitate decentralized exchanges between untrusted parties. In some variants, the ledger appliance may additionally use an application programming interface (API) to dynamically generate blockchains on the fly. Various other applications are also described (e.g., social media, machine learning, probabilistic applications and other error-tolerant applications).

18 Claims, 32 Drawing Sheets

(56) References Cited

U.S. PATENT DOCUMENTS

| | | | |
|---|---|---|---|
| 11,455,380 B2* | 9/2022 | Patel | H04L 9/0637 |
| 2009/0256546 A1* | 10/2009 | Wu | G06F 1/08 |
| | | | 323/318 |
| 2010/0131221 A1* | 5/2010 | Chien | G11C 29/023 |
| | | | 702/81 |
| 2010/0146252 A1* | 6/2010 | Chang | G06F 1/24 |
| | | | 713/1 |
| 2014/0136823 A1* | 5/2014 | Ragland | G06F 9/44505 |
| | | | 713/1 |
| 2015/0016191 A1* | 1/2015 | Tsai | G11C 29/12015 |
| | | | 365/185.18 |
| 2017/0213597 A1* | 7/2017 | Micheloni | G11C 16/12 |
| 2018/0188769 A1* | 7/2018 | Chen | G06F 11/24 |
| 2018/0287915 A1 | 10/2018 | Smith et al. | |
| 2018/0336552 A1* | 11/2018 | Bohli | G06Q 20/382 |
| 2019/0146864 A1 | 5/2019 | Nair et al. | |
| 2019/0253524 A1* | 8/2019 | Hoshizuki | G06F 16/2465 |
| 2019/0370793 A1* | 12/2019 | Zhu | G06Q 20/3678 |
| 2019/0379664 A1* | 12/2019 | Suthar | H04W 4/70 |
| 2020/0213091 A1* | 7/2020 | Mai | H04L 9/14 |
| 2020/0286049 A1* | 9/2020 | Basu | G06Q 20/3827 |

OTHER PUBLICATIONS

Kariuki, David, "How to Optimize the Performance of Your GPU in Cypto Mining." Retrieved from the Internet on Jun. 22, 2023 <https://cryptomorrow.com/2019/06/12/gpu-miner-rig-performance-improvement>, Jun. 12, 2019.

* cited by examiner

DISTRIBUTED LEDGER APPLIANCE AND METHODS OF USE

RELATED APPLICATIONS

This application is related to co-owned and co-pending U.S. patent application Ser. No. 16/211,029, filed Dec. 5, 2018, and entitled "METHODS AND APPARATUS FOR INCENTIVIZING PARTICIPATION IN FOG NETWORKS", Ser. No. 16/242,960, filed Jan. 8, 2019, and entitled "METHODS AND APPARATUS FOR ROUTINE BASED FOG NETWORKING", Ser. No. 16/276,461, filed Feb. 14, 2019, and entitled "METHODS AND APPARATUS FOR CHARACTERIZING MEMORY DEVICES", Ser. No. 16/276,471, filed Feb. 14, 2019, and entitled "METHODS AND APPARATUS FOR CHECKING THE RESULTS OF CHARACTERIZED MEMORY SEARCHES", and Ser. No. 16/276,489, filed Feb. 14, 2019, and entitled "METHODS AND APPARATUS FOR MAINTAINING CHARACTERIZED MEMORY DEVICES, each of the foregoing incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

1. Technological Field

The following disclosure relates generally to computational apparatus including memory devices. Various aspects of the present disclosure are directed to, inter alia, a ledger appliance useful for distributed accounting, cost efficiently.

2. Description of Related Technology

Numerous highly intensive computational application environments currently exist, each seeking to leverage the intrinsic ability of digital processing technology to perform billions of operations per second (or more) to address problems or challenges ranging from DNA sequencing to astrophysics to cryptocurrency mining.

In the particular context of cryptocurrency processing (such as so-called "mining"), there has been a significant surge in consumer interest and participation in the field as of late. As a brief aside, currencies are a medium of exchange. Traditionally, money derived its value from a "backing" commodity (e.g., gold, silver, etc.) Speculation for commodity backed moneys often suffer from "hoarding" behavior and economic stagnation. Modern economies use a "fiat currency" where the value of the currency is controlled by a "fiat" (e.g., the Federal Reserve, European Central Bank, etc.) When well-managed, fiat currencies can be manipulated to stimulate (or depress) economic growth. However, fiats cannot always be trusted to manage economic growth properly. One proposed solution to the perceived problem of fiat mismanagement is decentralized "cryptocurrency" that uses a virtualized medium of exchange without a centralized fiat.

Examples of popular cryptocurrencies include Bitcoin (used in the Bitcoin network) and Ether (used in the Ethereum network). Each of these cryptocurrencies use proof-of-work (POW) algorithms to process monetary transactions that are recorded in ledgers that are shared or distributed among a community of untrusted peers. Many cryptocurrencies use shared ledgers based on a "blockchain" data structure: a chained sequence of data blocks.

Cryptocurrency "mining" generally refers to cryptocurrency computations and activities that generate or are rewarded monetary value based on proof-of-work (POW). For example, cryptocurrency mining activities may include e.g., verifying and securely adding transactions to the distributed ledger and/or creating new units of cryptocurrency. Bitcoin is considered a "processor hard" or "processor bound" cryptocurrency because its mining algorithms rely on computational processing. In contrast, Ether is considered a "memory hard" or "memory bound" cryptocurrency because its mining algorithms require large amounts of memory bandwidth to run. In other words, a memory hard cryptocurrency or memory hard application is one in which memory bandwidth or usage is a principal indicator of POW.

The virtual domain within which cryptocurrencies operate contains no physical conservation laws. In the physical world, a token of value (e.g., a physical coin) cannot be "double spent". Specifically, Alice cannot give a coin to Bob, and then give the same coin to Charlie because of conservation of matter. In contrast, there is nothing that prevents Alice from sending the same digital token to both Bob and Charlie. Proof-of-work (POW) is a virtualized representation of physical entropy (e.g., computational work, memory searches, etc.). A blockchain is a data structure that records accumulated POW; in modern use, blockchains accumulate POW at rates that introduce physical conservation laws into the virtual domain. More directly, a blockchain represents the accumulation of entropy on scales that are physically impractical for malicious parties to attack. For example, cryptocurrencies use a blockchain that is continuously checked by a network of miners to ensure that only valid transactions are added within blocks to the blockchain. Although a malicious party may attempt to generate a false POW, it is physically infeasible to generate a valid POW for the ever expanding blockchain (due to practical constraints on processing power and/or memory). Invalid POW transactions can be identified and rejected by the community of miners in the network. Additionally, in some cases the node or IP address associated with a misbehaving miner or malicious party can experience undesirable consequences; for example, a miner that generates excessive amounts of invalid POW may be banned, kicked from the network, waste resources, fined, and/or penalized.

SUMMARY

The present disclosure provides, inter alia, ledger apparatus and methods for use in distributed accounting, such as cryptocurrency mining and blockchain processing.

In one aspect, a blockchain ledger apparatus is disclosed. In one embodiment, the blockchain ledger apparatus includes: a processor apparatus; a data interface in data communication with the processor apparatus, the data interface configured to communicate via a data network; and at least one blockchain processing module in data communication with the processor apparatus. In one exemplary embodiment, the at least one blockchain processing module includes: a memory apparatus, the memory apparatus includes one or more cells that can be read to and written from; and a search apparatus in data communication with the memory apparatus, the search apparatus configured to search the memory apparatus according to a blockchain algorithm. In one such exemplary embodiment, the memory apparatus is characterized by a first performance associated with a first operating parameter; and the search apparatus is configured to operate the memory apparatus in accordance with the first operating parameter.

In one variant, the first performance associated with the first operating parameter includes a characterized BER (bit error rate) performance associated with at least one of: (i) an applied voltage; (ii) an over-clocking rate; and (iii) a temperature.

In one variant, the memory apparatus includes a general compute memory apparatus having a specified rate for operation under standardized operating conditions; and the first operating parameter includes a characterized rate for operation under non-standardized operating conditions.

In one variant, the memory apparatus includes a defective memory apparatus; and the first operating parameter includes a characterized rate for operation under non-standardized operating conditions.

In one variant, the at least one blockchain processing module includes a validation stage, the validation stage configured to validate at least one output of the search apparatus, the at least one output generated from a search of the memory apparatus according to the blockchain algorithm. In one such variant, the processor apparatus is further configured to transmit the at least one output of the search apparatus to a peer device when the at least one output is successfully validated.

In one variant, the at least one blockchain processing module includes a plurality of blockchain processing modules which can be selectively activated and deactivated by the processor apparatus. In one such variant, the blockchain ledger apparatus also includes a non-transitory computer readable medium including one or more instructions which when executed by the processor apparatus causes the processor apparatus to: determine a progress within an epoch of the blockchain algorithm; and based at least on the progress, selectively activate or deactivate at least one of the plurality of blockchain processing modules.

In one variant, the at least one blockchain processing module includes a plurality of blockchain processing modules; and a first blockchain processing modules has a first configuration which is different than a second blockchain processing modules that has a second configuration. In one exemplary variant, the first configuration includes a first overclocking rate and the second configuration includes a second overclocking rate.

In one aspect, a method of generating a blockchain ledger is disclosed. In one embodiment, the method includes: creating an ad hoc network between at least a first ledger appliance and a second ledger appliance; negotiating one or more blockchain parameters between at least the first ledger appliance and the second ledger appliance; determining a proof-of-work (POW) schema at the first ledger appliance based on the one or more blockchain parameters; mining POW at the first ledger appliance based on the POW schema; and transmitting the POW to the second ledger appliance.

In one variant, the negotiating one or more blockchain parameters includes a prioritization of at least one of: scalability, security and immutability. In one exemplary variant, negotiating one or more blockchain parameters further includes a de-prioritization of at least one of: scalability, security and immutability.

In one variant, the method further includes: responsive to discovering a third ledger appliance, providing the one or more blockchain parameters to the third ledger appliance; and forming a community of ledger appliances from the first ledger appliance, the second ledger appliance, and the third ledger appliance. In some exemplary variants, the method also includes receiving a proposed POW from the third ledger appliance; validating the proposed POW; and adding the proposed POW to a blockchain data structure if the community of ledger appliances achieve consensus on validity. In one such case, the method also includes settling one or more transactions with a trusted database, based on the blockchain data structure.

In one aspect a user apparatus is disclosed. In one embodiment, the user apparatus includes: a processor apparatus; a data interface in data communication with the processor apparatus, the data interface configured to communicate via a fog network; a blockchain processing module in data communication with the processor apparatus, the blockchain processing module including at least one characterized memory configured to provide a first performance with a first operating parameter; and a non-transitory computer readable medium. In one exemplary embodiment, the non-transitory computer readable medium includes one or more instructions that when executed by the processor apparatus, causes the user apparatus to: discover a peer device; negotiate one or more blockchain parameters with the peer device; create a blockchain data structure based on the one or more blockchain parameters; and record one or more transactions with the peer device in the blockchain data structure.

In one variant, the one or more blockchain parameters ensure a minimum security of the blockchain data structure.

In one variant, the one or more blockchain parameters ensure a minimum scalability of the blockchain data structure.

In one variant, the one or more blockchain parameters ensure a minimum immutability of the blockchain data structure.

In one aspect, an apparatus configured to enable distributed accounting is disclosed. In one embodiment, the apparatus includes: a characterized memory including one or more uncorrectable faults; wherein the characterized memory accumulates one or more correctable faults probabilistically during use; a processor configured to access the characterized memory at a characteristic rate; controller logic configured to determine a performance metric based on the one or more uncorrectable faults and the one or more correctable faults; wherein the controller logic is configured to secure accounting transactions based on characterized memory proof-of-work (POW).

In another aspect of the disclosure, a computerized wireless access node apparatus configured to dynamically access a characterized memory is disclosed. In one embodiment, the computerized wireless access node includes: a wireless interface configured to transmit and receive RF waveforms in the spectrum portion; digital processor apparatus in data communication with the wireless interface; and a characterized memory in data communication with the digital processor apparatus and including at least one computer program. In one exemplary embodiment, the computerized wireless access node apparatus is configured to securely, scalably, and/or immutably record transactions within a blockchain data structure.

In an additional aspect of the disclosure, computer readable apparatus is described. In one embodiment, the apparatus includes a storage medium configured to store one or more computer programs within or in conjunction with characterized memory. In one embodiment, the apparatus includes a program memory or HDD or SDD on a computerized controller device. In another embodiment, the apparatus includes a program memory, HDD or SSD on a computerized access node. In one exemplary embodiment, the computer readable apparatus is configured to search a characterized memory so as to generate proof-of-work (POW).

These and other aspects shall become apparent when considered in light of the disclosure provided herein.

POW and consensus transaction (FIG. 9B) according to the present disclosure, wherein fog networks provide new synergies for decentralized access.

Figure 9A:
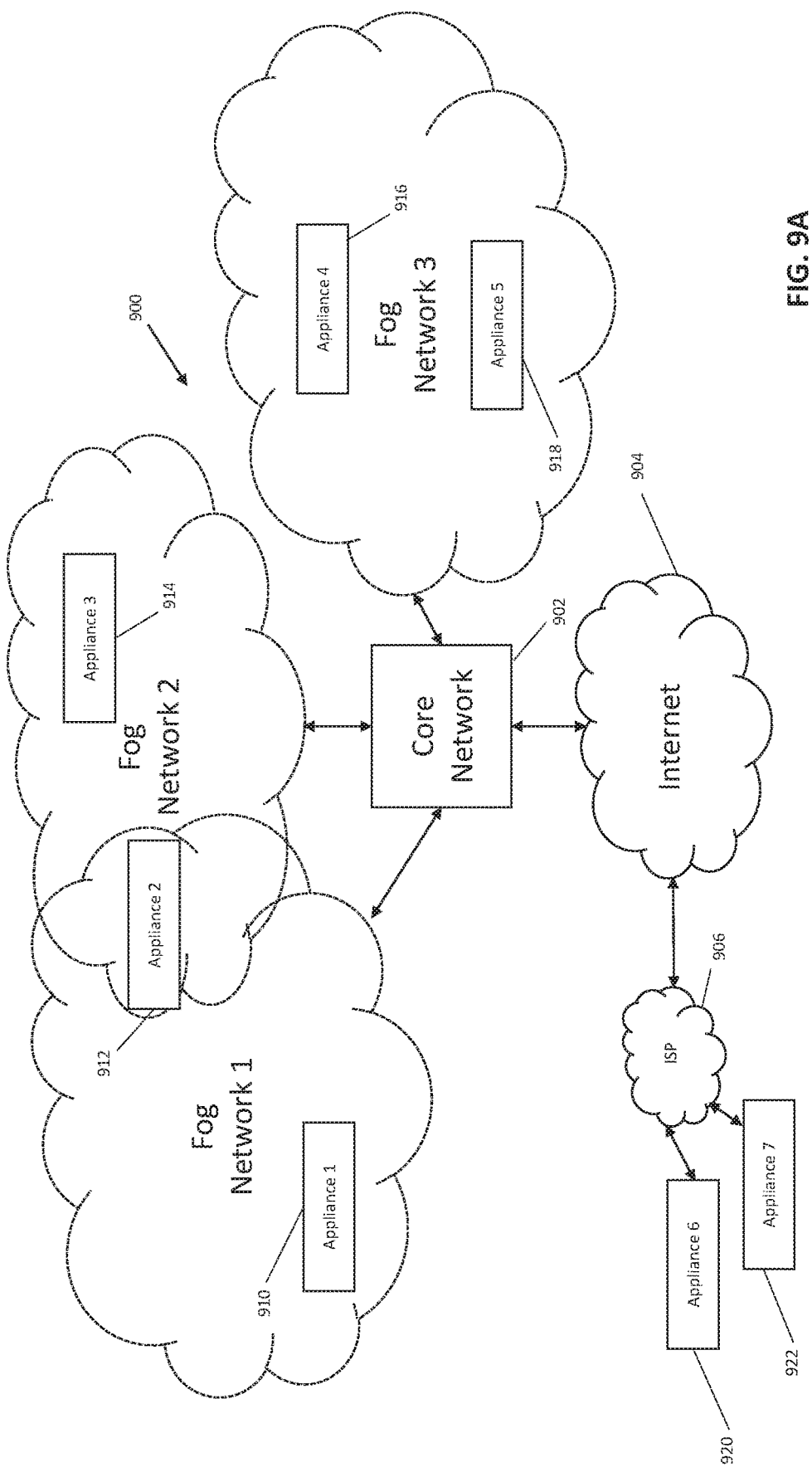
FIGS. 9A-9B illustrate one embodiment of network architecture (FIG. 9A)
Figure 9B:
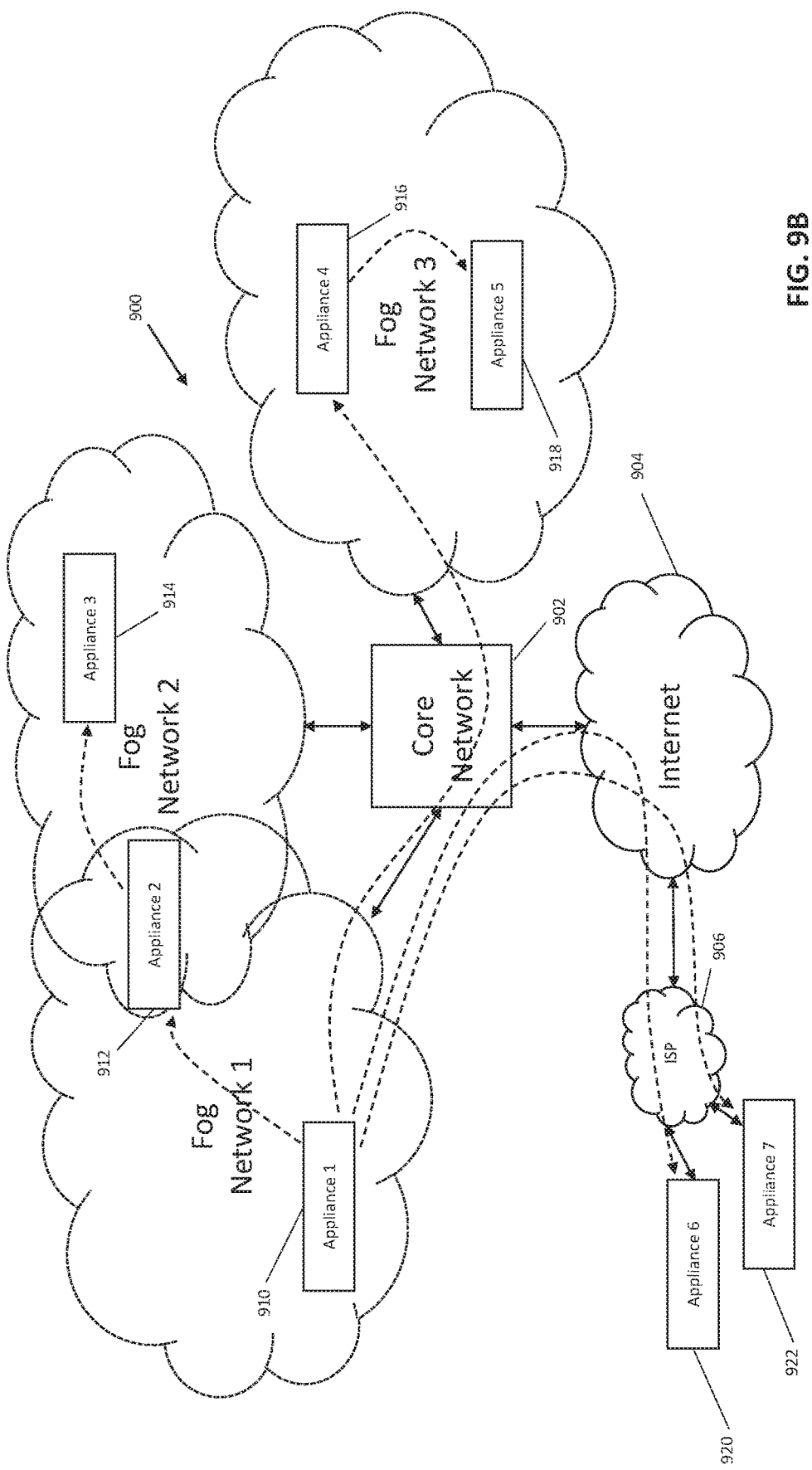
Figure 9C:
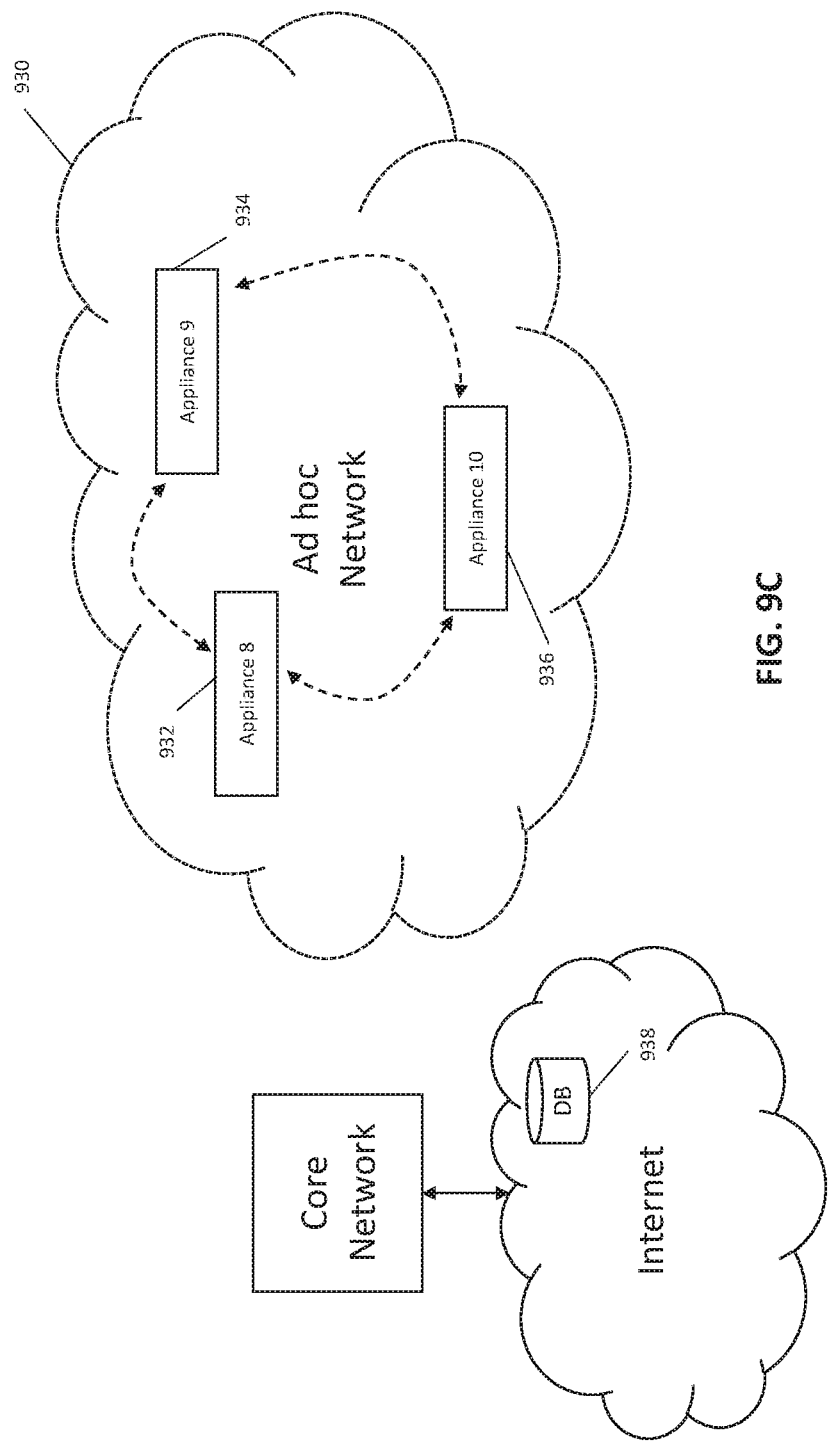
Figure 9D:
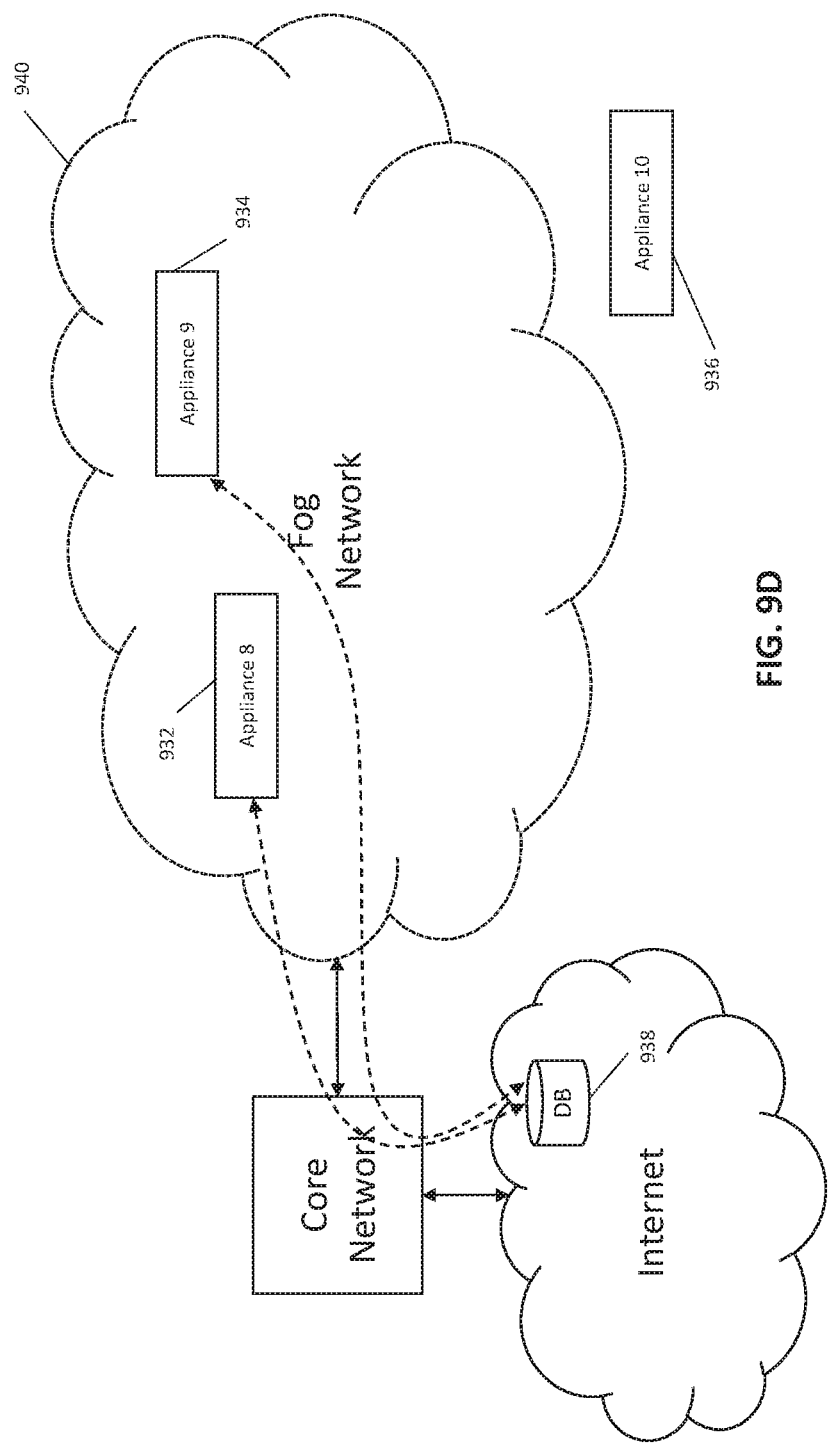

FIGS. 9C-9D illustrate a second embodiment of network architecture (FIG. 9C) and POW and consensus transaction (FIG. 9D) according to the present disclosure, wherein ad hoc and fog networks provide new synergies for decentralized access.

Figure 10:
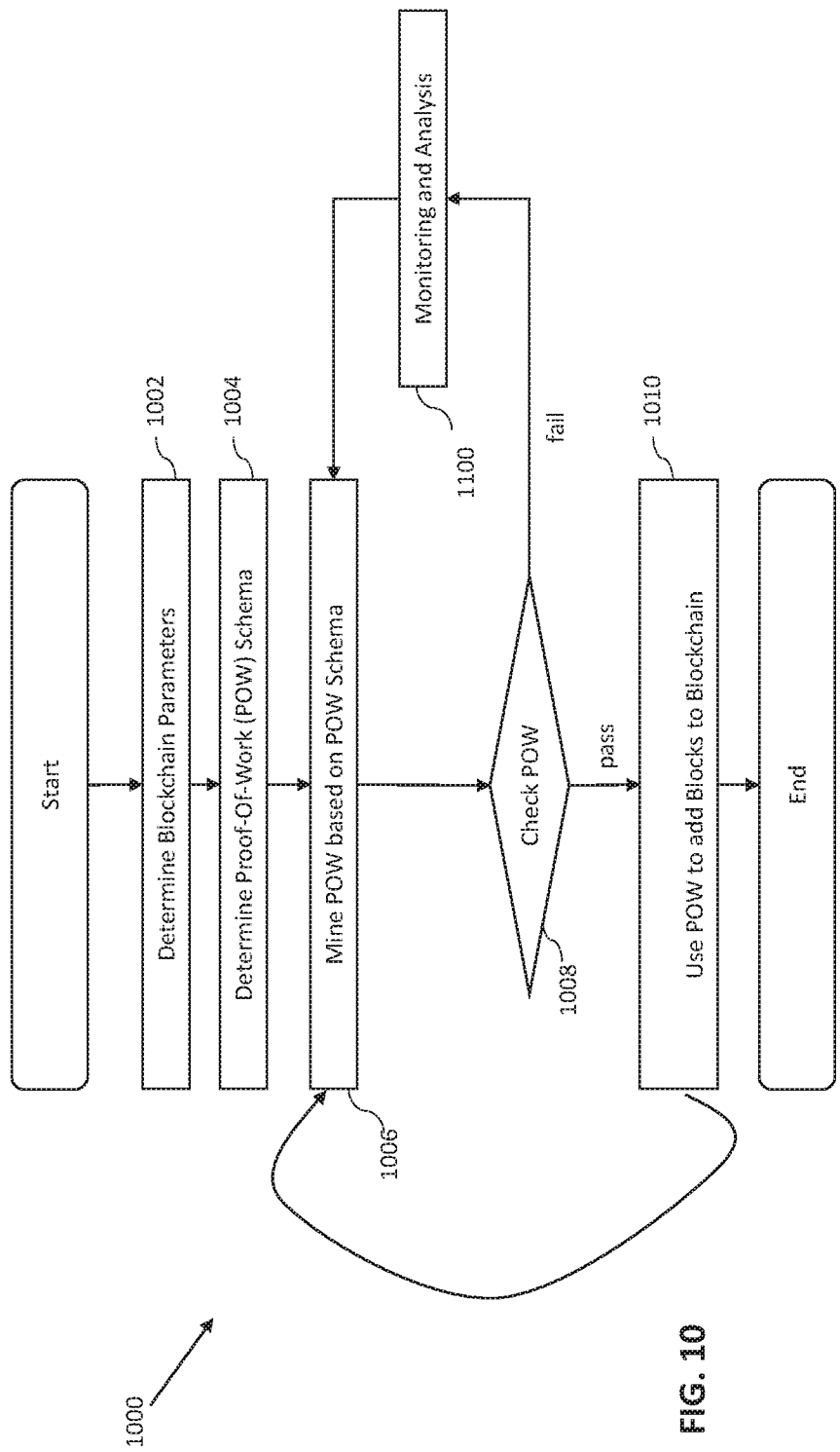

FIG. 10 is logical flow diagram of one embodiment of a method for searching a characterized memory using a computational appliance, in accordance with the present disclosure.

Figure 11:
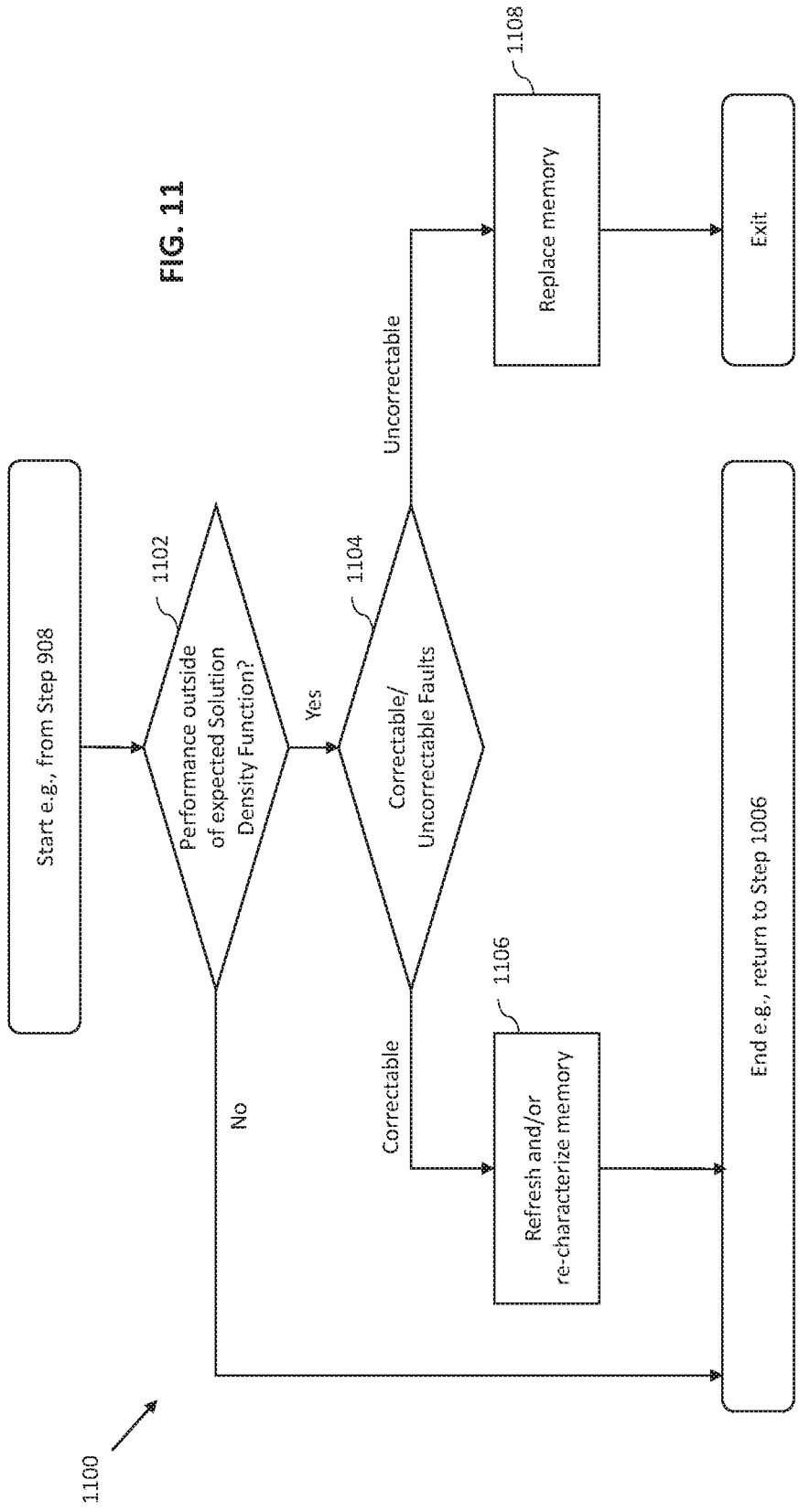

FIG. 11 is logical flow diagram of one embodiment of a method for monitoring and analyzing characterized memory performance associated with a computational appliance, in accordance with the present disclosure.

All figures © Copyright 2018-2019 Micron Technology, Inc. All rights reserved.

DETAILED DESCRIPTION

Reference is now made to the drawings wherein like numerals refer to like parts throughout.

As used herein, the term "access node" refers generally and without limitation to a network node which enables communication between a user or client device and another entity within a network, such as for example a 5G NR gNB, an LTE eNB, a Wi-Fi AP, or a Wi-Fi-Direct enabled client or other device acting as a Group Owner (GO).

As used herein, the term "application" (or "app") refers generally and without limitation to a unit of executable software that implements a certain functionality or theme. The themes of applications vary broadly across any number of disciplines and functions (such as cryptocurrency mining, on-demand content management, e-commerce transactions, brokerage transactions, home entertainment, etc.), and an application may have more than one theme. The unit of executable software generally runs in a predetermined environment; for example, a processor architecture may retrieve and execute instructions from a non-transitory computer-readable storage medium where the instructions are compiled for the processor architecture.

As used herein, the terms "client device" or "user device" or "UE" may include, but are not limited to, mobile devices such as handheld computers, PDAs, personal media devices (PMDs), tablets, "phablets", smartphones, and vehicle infotainment systems or portions thereof, as well as set-top boxes (e.g., DSTBs), gateways, modems, personal computers (PCs), and minicomputers, whether desktop, laptop, or otherwise.

As used herein, the term "computer program" or "software" is meant to include any sequence or human or machine cognizable steps which perform a function. Such program may be rendered in virtually any programming language or environment including, for example, C/C++, Python, Ruby, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.), Register Transfer Language (RTL), VHSIC (Very High Speed Integrated Circuit) Hardware Description Language (VHDL), Verilog, and the like.

As used herein, the terms "Internet" and "internet" are used interchangeably to refer to inter-networks including, without limitation, the Internet. Other common examples include but are not limited to: a network of external servers, "cloud" entities or "fog" networks (such as memory or storage not local to a device, storage generally accessible at any time via a network connection, and the like), service nodes, access points, controller devices, client devices, etc.

As used herein, the terms "5G NR, "5G," and "New Radio" refer without limitation to 3GPP Release 15 and TS 38.XXX Series and subsequent or related standards.

As used herein, the term "memory" includes any type of integrated circuit or other storage device adapted for storing digital data including, without limitation, random access memory (RAM), pseudostatic RAM (PSRAM), dynamic RAM (DRAM), synchronous dynamic RAM (SDRAM) including double data rate (DDR) class memory and graphics DDR (GDDR) and variants thereof, ferroelectric RAM (FeRAM), magnetic RAM (MRAM), resistive RAM (RRAM), read-only memory (ROM), programmable ROM (PROM), electrically erasable PROM (EEPROM or EPROM), DDR/2 SDRAM, EDO/FPMS, reduced-latency DRAM (RLDRAM), static RAM (SRAM), "flash" memory (e.g., NAND/NOR), phase change memory (PCM), 3-dimensional cross-point memory (3D Xpoint), and magnetoresistive RAM (MRAM), such as spin torque transfer RAM (STT RAM).

As used herein, the terms "microprocessor" and "processor" or "digital processor" are meant generally to include all types of digital processing devices including, without limitation, digital signal processors (DSPs), reduced instruction set computers (RISC), general-purpose (CISC) processors, microprocessors, gate arrays (e.g., FPGAs), PLDs, reconfigurable computer fabrics (RCFs), array processors, graphics processors (e.g., GPUs), secure microprocessors, and application-specific integrated circuits (ASICs). Such digital processors may be contained on a single unitary IC die, or distributed across multiple components.

As used herein, the terms "network" and "bearer network" refer generally to any type of telecommunications or data network including, without limitation, hybrid fiber coax (HFC) networks, satellite networks, telco networks, and data networks (including MANs, WANs, LANs, WLANs, internets, and intranets). Such networks or portions thereof may utilize any one or more different topologies (e.g., ring, bus, star, loop, etc.), transmission media (e.g., wired/RF cable, RF wireless, millimeter wave, optical, etc.) and/or communications or networking protocols (e.g., SONET, DOCSIS, IEEE Std. 802.3, ATM, X.25, Frame Relay, 3GPP, 3GPP2, LTE/LTE-A/LTE-U/LTE-LAA, WAP, SIP, UDP, FTP, RTP/RTCP, H.323, etc.).

As used herein, the term "network interface" refers to any signal or data interface with a component or network including, without limitation, those of the FireWire (e.g., FW400, FW800, etc.), USB (e.g., USB 2.0, 3.0. OTG), Ethernet (e.g., 10/100, 10/100/1000 (Gigabit Ethernet), 10-Gig-E, etc.), PCIe, MoCA, Coaxsys (e.g., TVnet™), radio frequency tuner (e.g., in-band or OOB, cable modem, etc.), LTE/LTE-A/LTE-U/LTE-LAA, 5G NR, Wi-Fi (802.11), WiMAX (802.16), Z-wave, PAN (e.g., 802.15), or power line carrier (PLC) families.

As used herein, the term "server" refers to any computerized component, system or entity regardless of form which is adapted to provide data, files, applications, content, or other services to one or more other devices or entities on a computer network.

As used herein, the term "storage" refers to without limitation computer hard drives, DVR device, memory, RAID devices or arrays, optical media (e.g., CD-ROMs, Laserdiscs, Blu-Ray, etc.), or any other devices or media capable of storing content or other information.

As used herein, the term "wireless" means any wireless signal, data, communication, or other interface including without limitation Wi-Fi, Bluetooth/BLE, 3G (3GPP/3GPP2), HSDPA/HSUPA, TDMA, CBRS, CDMA (e.g., IS-95A, WCDMA, etc.), FHSS, DSSS, GSM, PAN/802.15, WiMAX (802.16), 802.20, Zigbee®, Z-wave, narrowband/FDMA, OFDM, PCS/DCS, LTE/LTE-A/LTE-U/LTE-LAA, analog cellular, CDPD, satellite systems, millimeter wave or microwave systems, acoustic, and infrared (i.e., IrDA).

As used herein, the term "class," within the context of memory, refers to memories which may exceed yet minimally perform according to a specific requirement. For example, current "general compute" memories are termed "first-class" memories that guarantee a maximum bit error rate (BER) of e.g., $1 \times 10^{-18}$ under standardized operating conditions (e.g., room temperature, voltage, current, humidity, etc.), whereas "second-class" memories can include memories with a maximum BER of $1 \times 10^{-5}$ under the same standardized operating conditions. Notably, memories may perform at significantly better or worse BER under other environments; for example, a second class memory may provide better than $1 \times 10^{-18}$ BER under ideal conditions, and similarly a first class memory may perform worse than $1 \times 10^{-5}$ BER under harsh conditions.

The foregoing terms of first class and second class are purely used as relative measures of performance under a fixed set of conditions for consumer applications, and are purely arbitrary. Other classification schemes (e.g., military specifications) may classify memories under different characteristics and/or with other levels of gradation. For example, memories may be classified according to environmental tolerances (high temperatures/humidity, low temperatures/humidity), performance ranges (e.g., different speed grades), and/or any other operational parameter. Various other classification schemes will be readily appreciated by those of ordinary skill given the contents of the present disclosure.

Overview

Currently, cryptocurrency mining (whether "processor hard" or "memory hard") is done with "general compute" memories and highly specialized apparatus. In some cases, cryptocurrency mining equipment requires an appreciable amount of expertise to operate, and may be constructed from heterogeneous components (i.e., one cryptocurrency mining platform may have distinct differences in configuration from others). More generally, existing mining is performed within a "patchwork" of different hardware/software environments. For example, one such "processor hard" solution available on the market is the so-called 'Antminer' devices offered by Bitmain, which allow the owner to mine for Bitcoin and other cryptocurrencies. Bitmain utilizes a so-called "fabless" model, which means that it develops its own IC design and works with manufacturing entities/foundries which produce physical IC's based on the design. Those fabricated ICs are then used to power mining hardware which lets the owner, for example, earn a reward by mining Bitcoin and other cryptocurrencies.

Specialization has exponentially driven the costs of cryptocurrency mining hardware (now into the thousands of U.S. dollars for an average platform), and practical barriers to entry (e.g., the ancillary components/services required to support the mining platform, such as electricity, HVAC support for heat dissipation, security, etc.) place cryptocurrency mining out of reach of most consumers. In fact, highly specialized equipment and techniques only add to the scarcity of cryptocurrencies, and their perceived value. Accordingly, economic realities have caused mining operations to centralize over time into larger and larger "collectives" of miners which provide better economies of scale than say an equal number of individually operated mining apparatus; unfortunately, centralization is in contradiction with the foundational tenets of cryptocurrencies. More directly, existing cryptocurrencies fail to deliver on the promise of decentralized control.

Based on the foregoing, there is a substantial unsatisfied need to develop and widely distribute faster, more efficient mining or processing hardware, including that which can provide one or more of the following: (i) it can be fielded at a cost reasonably achievable by an average consumer/user; (ii) it can be operated by others than those particularly knowledgeable on the subject; (iii) it can be fielded in large quantities (i.e., has ubiquity) and can be decentralized; and (iv) it is scalable (e.g., a user or miner can readily expand their operation if desired), Moreover, such improved apparatus would also ideally have selective operation adaptability (e.g., is less restricted in terms of operational environment than traditional mining or computational apparatus).

The present disclosure describes, inter alia, improved computational apparatus and associated techniques useful in demanding, intensive computational applications, such as in cryptocurrency mining or other types of blockchain-based processing. In one exemplary aspect, a computational (e.g., mining) appliance is disclosed which is particularly adapted to provide a high degree of computational performance in support of such operations, yet with reduced cost and ease of operation relative to extant processing solutions based on the use of so-called "characterized" memory devices within the appliance.

As previously noted, "general compute" memories are specified for very high levels of performance (e.g., they must demonstrate a comparatively low bit error rate (BER) during manufacture or they will be deemed to fail testing). As described in greater detail subsequently herein, prevailing memory standards such as JEDEC require certain minimum levels of performance in terms of, inter alia, BER. In contrast, so-called "characterized" memory devices refer to memories that have been verified (empirically tested or otherwise) to provide at least a specific level of performance over a range of conditions. As described in greater detail herein, characterized memories can be operated for more performance and/or at less expense when compared to general compute memories.

In one particular variant, the appliance includes a generic processor in communication with one or more characterized memories. The appliance enables faster, more efficient, cost-effective memory searches compared to existing general compute memory-based searches and/or dedicated ASIC implementations. In some variants, the generic processor may have primary tasks (e.g., network servers, media servers, user devices, etc.), and perform blockchain ledgering and/or blockchain POW searching in its spare cycles. While the present disclosure is described in the context of generic processors and characterized memories, artisans of ordinary skill in the related arts will readily appreciate that the techniques described herein may be used with equivalent success with e.g., customized processing logic (via, inter alia, one or more optimized ASICs) and/or general compute memory devices.

A validation processor (e.g., validation ASIC or processor and associated general compute memory) may be used to validate the output of the blockchain module(s) for applications such as Ethereum, which use "memory hard" proof-of-work (POW) to protect against malicious attacks. In other variants, the computational appliance has no validation process/stage, and may be used in applications such as error-tolerant or stochastic computing systems; e.g., systems that assume the presence of some noise and/or errors in memory and/or data.

Multifunctional variants (i.e., those with and without validations processes) are also disclosed, such that the user or a host controller process can select which of the modules to utilize depending on application requirements.

Exemplary implementations of the computational apparatus may utilize "intelligent" operational parameter selection (e.g., memory over-clocking rate, voltage, maximum operational temperature) based on the particular application in which the appliance is used. As such, these implementations can use a broader range of memory devices (e.g., including but not limited to those that have not fully passed qualification testing), and are also less restricted in terms of operational environment than traditional mining or computational apparatus (e.g., can be operated hotter so as to reduce HVAC load while maintaining a requisite level of performance).

The exemplary embodiments of the appliance are also designed to be highly scalable, including one variant wherein one or more data bus interfaces which enable two or more appliances to be utilized in parallel, and another variant wherein the amount of characterized memory used in supporting memory hard processing can be varied to add/reduce capacity within the same appliance.

The present disclosure further describes, inter alia, improved application programming interfaces (APIs) useful in customizing a blockchain ledger in accordance with various application requirements. In one exemplary aspect, a computational (e.g., mining) appliance is disclosed which is able to generate a new blockchain ledger based on various ledger requirements. More directly, the API enables the creation of a blockchain ledger having varying degrees of security, scalability, and/or immutability. The blockchain ledger parameters can be communicated to other ledger apparatus so as to enable a variety of customizable ledgering for communities of arbitrary size, security, and/or lifetime. Moreover, the exemplary techniques disclosed herein specifically enables a highly distributed or decentralized model of blockchain processing. For example, so-called "fog" network architectures use available devices at the edge of the network to distribute/offload computation burden from the core network. In some cases, devices may become or drop out of availability on unpredictable schedules. In one such implementation, a fog network can coordinate a large number of individual blockchain appliances disposed at the edges of the network.

Various embodiments of the present disclosure are directed to an inexpensive ledger appliance which can provide performance equivalent to, or even better than, existing hardened ASICs and general compute memories. Wide dissemination of inexpensive ledger appliances can be used to facilitate exchanges between arbitrary parties that otherwise do not trust one another, without any promise or requirement of value based on scarcity. In other words, providing check-in/check-out capabilities from inexpensive ledger appliances can enable virtually ubiquitous use of worthless (or nearly worthless), limited use, and/or even temporary/fungible cryptocurrencies for "barter" type transactions (rather than the "speculative hoarding" of scarce cryptocurrencies among relatively few powerful miners that plagues existing cryptocurrencies).

Detailed Description of Exemplary Embodiments

Exemplary embodiments of the present disclosure are now described in detail. While these exemplary embodiments are described in the context of the previously mentioned memory-bound (or memory-hard), proof-of-work (POW)-based cryptocurrency mining utilizing a blockchain (e.g., Ethereum mining), the general principles and advantages of the disclosure may be extended to other types of systems involving sequential transactional databases, cryptocurrencies, networks, architectures, and mechanisms, any of which are configured to provide a distributed chain of blocks or transaction data structures accessed by a network of nodes (also referred to as a network of miners, in some instances).

As of the filing date of the present disclosure, Ethereum (and the cryptocurrency Ether) uses the proof-of-work (POW) algorithm "Ethash"; however, there is some interest in modifying Ethereum for a proof-of-stake algorithm (e.g., where the network is secured by proof of ownership of tokens, rather than a proof of work). Accordingly, while the exemplary embodiments of the present disclosure are described in the context of memory hard POW, the present disclosure contemplates leveraging other forms of POW as well as other proof-of schemes (including proof-of-stake, proof-of-authority, proof-of-space, etc.).

The appliances, architectures, systems, apparatus, and methods described herein can be utilized in any application involving error-tolerance, noise, probability, and/or stochasticity. For example, the present disclosure can apply to various probabilistic or machine learning fields such as DNA sequencing, retail inventory, disease prediction, pattern recognition, and/or any other large scale pattern recognition. More generally, as described in greater detail hereinafter, a "system efficiency curve" (or set of curves) can be used to characterize solution density as a function of noise/errors. The system efficiency curve can be used to tradeoff requirements necessary to accomplish a desired performance, with other parameters (e.g., component cost, component quality, etc.). Such information can be used to intelligently select and/or reuse a variety of characterized memory devices (rather than "general compute" memories).

Other features and advantages of the present disclosure will immediately be recognized by persons of ordinary skill in the art with reference to the attached drawings and detailed description of exemplary embodiments as given below.

Exemplary Ethereum and Ethash Operation—

Figure 1A:
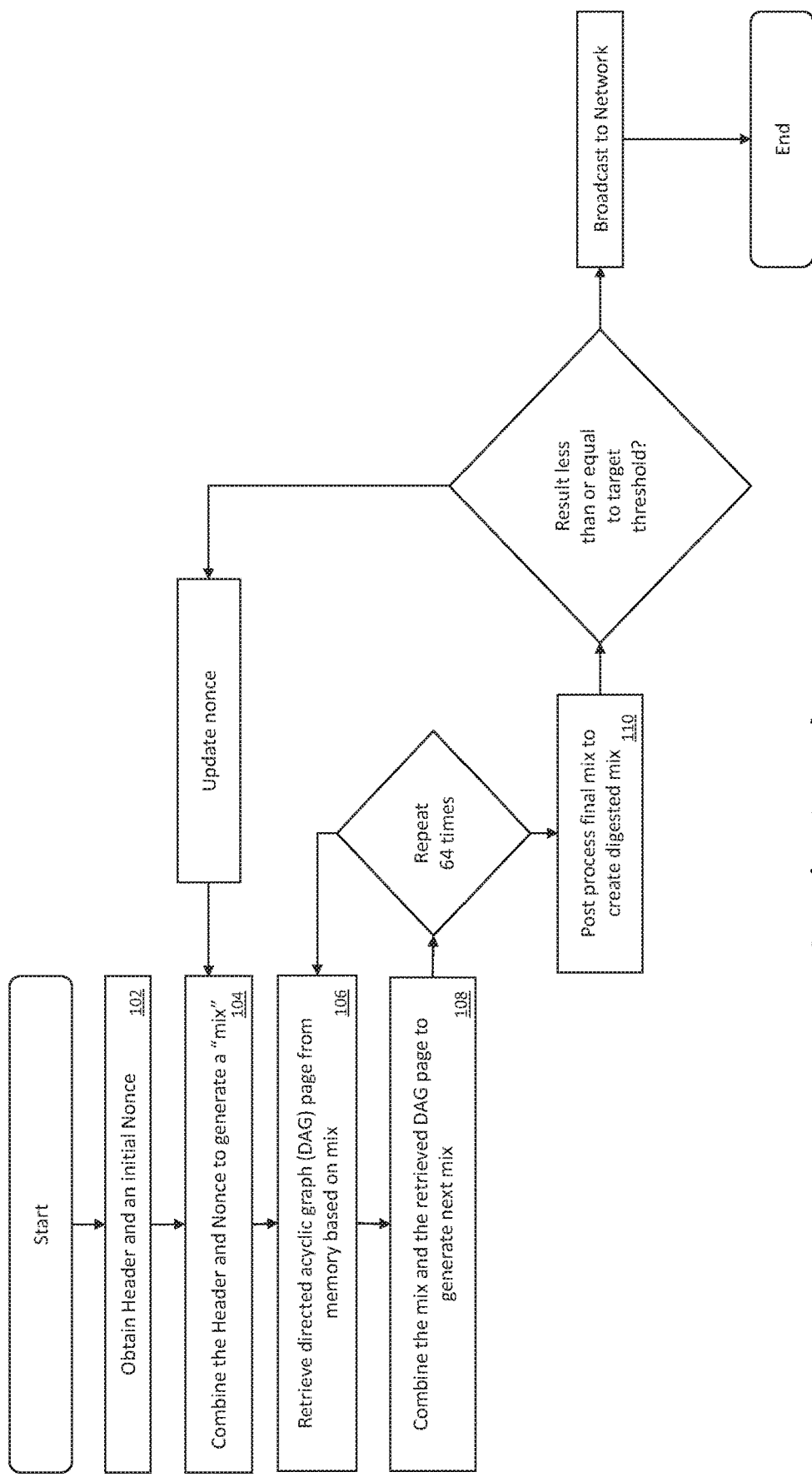
FIG. 1A is a graphical illustration of a prior art Ethash algorithm.

As previously noted, Ethereum is one exemplary blockchain-based distributed computing platform and operating system. Ethereum networks create and transact Ether as a cryptocurrency. FIG. 1A is a logical flow diagram of an existing method for proof-of-work (POW) mining with the Ethash algorithm useful for demonstrating memory hardness in the context of Ethereum.

At step 102, the miner generates a short binary blob (binary large object) "nonce"; a nonce is data that is only used once (e.g., to avoid playback type attacks). Within the context of Ethash, the nonce serves as an input to a mixing process and algorithm. The miner combines the nonce with unique header metadata (including timestamp and software version) derived from the latest block of the blockchain. A SHA3-like (Secure Hash Algorithm 3) algorithm is used to combine the pre-process header and nonce to create an initial 128 byte "mix" (step 104).

At step 106, the 128 byte mix is used to identify a 128 byte page to retrieve from memory based on an Ethash specific directed acyclic graph (DAG). As a brief aside, a DAG provides a pseudorandom memory data set that is computationally straightforward to generate. The DAG dataset is generated as a linear function of the blockchain length, and is regenerated every 30,000 blocks (a so-called "epoch"). As of the present disclosure, the DAG was approximately 4 GB, and the DAG will continue grow in size as the blockchain grows. Retrieving memory pages from the DAG stored in memory is physically constrained by memory bandwidth; thus, the periodically changing Ethereum DAG provides a source of memory hardness for Ethereum.

Referring back to FIG. 1A, once the 128 byte page is retrieved from the DAG, it is combined with the initial 128 byte mix, yielding a new mix (step 108). The new mix is then utilized to identify another DAG page to retrieve. Once that new DAG page is retrieved, it is combined with the new mix to generate yet another mix. This process is performed 64 times. After the $64^{th}$ time of mixing, the resulting 128 byte mix is then post-processed to generate a shorter, 32 byte digested mix (step 110).

After the mixing function and post-processing, the 32 byte digested mix is compared against a predefined 32 byte target threshold. If the 32 byte digested mix is less than or equal to predefined 32 byte target threshold, then the current nonce is considered valid, and can be broadcast with the header as a POW to the Ethereum network. If the target threshold is not met, the current nonce is considered invalid, and the algorithm is re-run with a different nonce (either by incrementing the current nonce, or picking a new one at random).

While not expressly shown in FIG. 1A, it should be emphasized that searching for a nonce and header combination that will result in a digested mix that satisfies the target threshold may require many attempts; in other words, searching for a valid nonce requires a substantial amount of physical entropy in the form of memory bandwidth. However, once a nonce is successfully found, any peer entity can straightforwardly verify that the nonce indeed results in a value that satisfies the target threshold by checking that the header/nonce combination and DAG lookups to generate the digested mix. Moreover, since each header and nonce combination can only be used once, the Ethash algorithm ensures that only new nonce searches can be added to the blockchain.

Figure 1B:
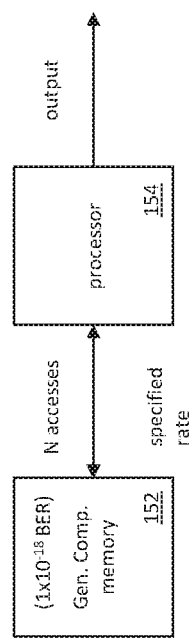
FIG. 1B is a logical block diagram of a prior art apparatus configured to search for proof-of-work (POW) with the Ethash algorithm of FIG. 1A.

FIG. 1B is a logical block diagram of an existing apparatus configured to search for proof-of-work (POW) with the aforementioned Ethash algorithm of FIG. 1A. As shown in FIG. 1B, the system includes a general compute memory 152 and a processor 154. The general compute memory 152 is "specified" for an identified performance under standardized conditions (e.g., a RAM provides 3.6 Gb/s at $1\times10^{-18}$ BER, at a particular voltage, temperature, humidity, etc.). The general compute memory 152 stores the Ethash specific directed acyclic graph (DAG) and each iteration of the Ethash algorithm requires 64 accesses to generate a digested mix. Since the vast majority of header/nonce combinations will not satisfy the target threshold, the apparatus is likely to consume a significant amount of memory bandwidth for each attempt.

Figure 1C:
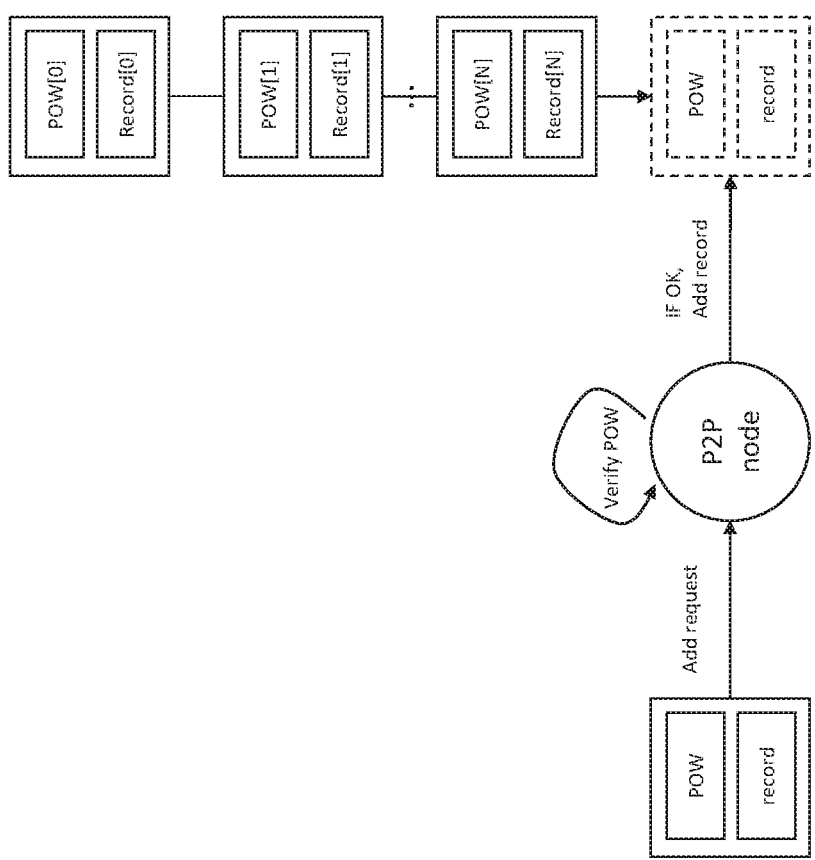
FIG. 1C is a graphical illustration of a prior art process by which proof-of-work (POW) that is generated by an Ethereum miner can be used in the context of the blockchain-based shared ledger.

FIG. 1C illustrates the process by which proof-of-work (POW) that is generated by an Ethereum miner can be used in the context of the blockchain-based shared ledger.

Each transactional block includes data representing each transaction (e.g., a POW and record). The record typically includes unique header metadata (including timestamp and software version) derived from the latest block.

A proposed transaction (including a generated POW and a record) is broadcast to the network and validated by peers; for clarity, only a single P2P peer is shown in FIG. 1C. Specifically, the P2P peer receives a block that is proposed to be added to the blockchain. If the POW is successfully verified by the P2P peer node, then the proposed block can be added to the blockchain. In some cases, the miner may also receive a reward in the form of the digital currency (e.g., Ether).

As previously alluded to, cryptocurrency mining is designed to account for malicious parties and fake POW. Transactions added erroneously or maliciously will not be verified by other miners in the network and will not persist in the blockchain. Furthermore, the Ethereum network penalizes malicious behavior. Specifically, the node or IP address associated with a misbehaving miner can experience undesirable consequences, like being banned or temporarily kicked from the network.

Figure 1D:
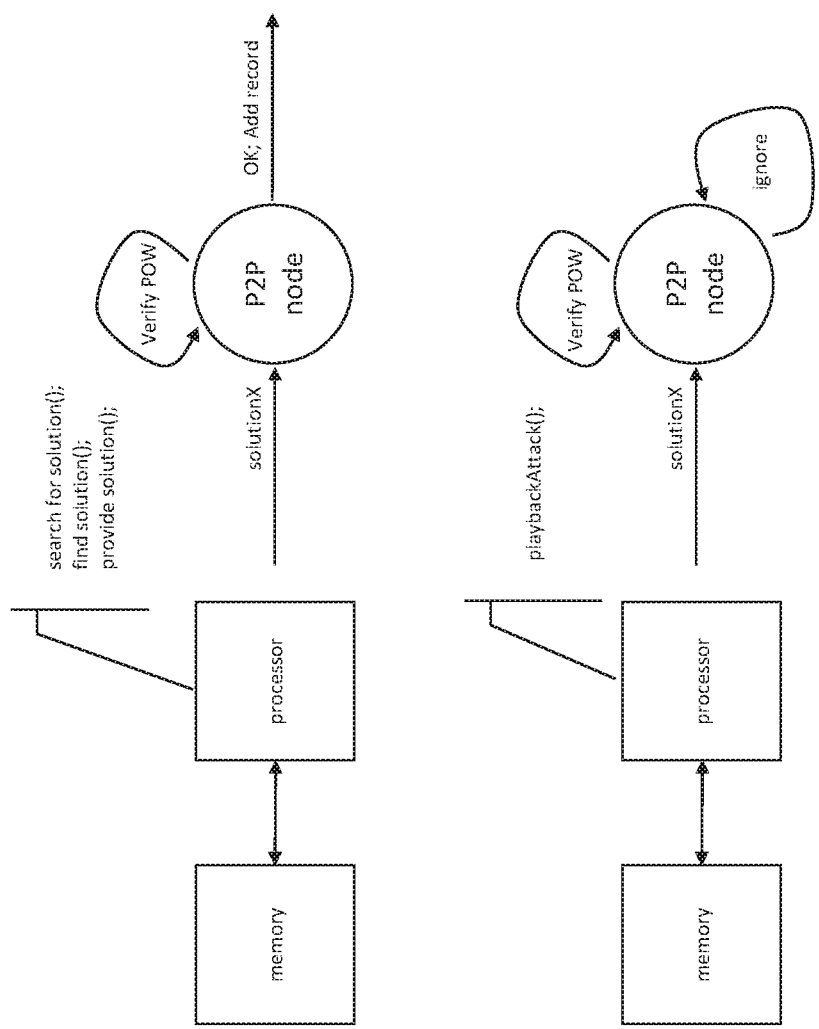
FIG. 1D is a graphical illustration of a prior art process by which proof-of-work (POW) that is generated by an Ethereum miner cannot be used multiple times in the context of the blockchain-based shared ledger.

For example, as shown in FIG. 1D, a solution (header/nonce combination) can only be used once. If the same solution is repeated (e.g., in a playback type attack), then the P2P node will reject the new solution. Since the DAG is shared by all of the Ethereum miners and the DAG is regenerated at 30,000 blocks, there are 30,000 unique solutions that the miners of the Ethereum mining community are in a race to find. More directly, a miners' profitability depends on their ability to generate valid header/nonce combinations and the amount of computing power they devote to the process in outputting valid blocks before other miners.

Figure 1E:
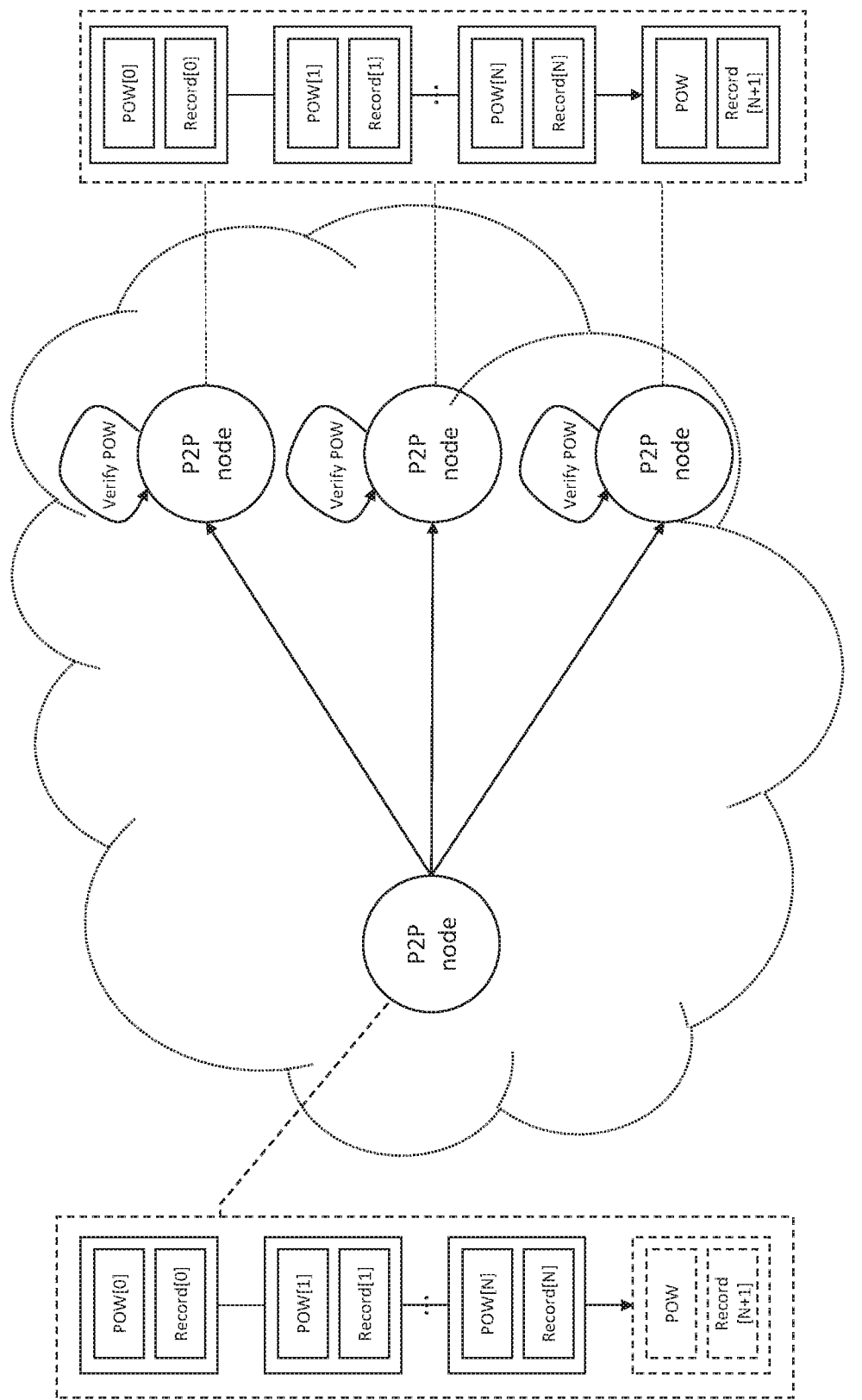
FIG. 1E is a graphical illustration of a prior art process by which proof-of-work (POW) that is verified by a community of miners can be added to the blockchain-based shared ledger.

Furthermore, the shared ledger nature of the Ethereum blockchain also ensures that each of the peer mining nodes of the Ethereum community cannot falsify a record. As shown in FIG. 1E, when a peer node successfully adds another block to the blockchain, the proposed blockchain is provided to each of the other peer nodes. Only when a majority of the peer nodes of the community have reached consensus that the proposed addition is legitimate does the proposed ledger become the shared ledger. If the peer network does not reach consensus, then the proposed ledger is ignored. When the shared ledger successfully adds another block, then the miners will stop work on the current block and start on the next block.

As a related corollary, the fact that a blockchain accumulates entropy means that the rate at which entropy is being added to a community is a "proof of cooperation" without any central organizer. Specifically, one computer is only capable of adding a certain amount of entropy, but a million computers working together generate entropy additively (a Poisson process). In other words, the largest pool of entropy is considered the valid state of the network (the consensus of the community), and the largest pool of entropy can only be generated by the network as a whole; it cannot be generated by a single attacker or even a subset of the pool. Thus, the ability to measure consensus or cooperation is as simple as validating the amount of entropy of the system.

More generally, artisans of ordinary skill in the related arts will appreciate that cryptocurrencies (like Ethereum) that are based on a community of untrusted parties which cooperate to share a public ledger must implement barriers to malicious activity and/or penalize malicious behaviors. The combined results of infeasibility of attack, expense to attack, and the likelihood of penalty for a failed attack provide strong disincentive for malicious behavior within cryptocurrency networks; in this manner, cryptocurrency networks are able to ensure that the shared ledger can be trusted, without vesting trust in any single party.

Defining an Efficiency Curve for Exemplary Ethereum Solutions—

As noted above, the exemplary case of Ethereum mining is error intolerant because the network paradigm is focused on eliminating malicious activity within a community of untrusted peers. However, there is no technical distinction between a malicious fault and a hardware fault; more directly, both malicious faults and hardware faults result in incorrect data. Conventional wisdom would suggest that the difficulty of finding a valid header/nonce solution and the penalties assessed for invalid solutions favor careful and thorough memory searching. Consequently, Ethereum mining is currently implemented within general compute memories; so-called general compute memories impose a very high manufacturing tolerance (e.g., $1\times10^{-18}$ BER). By using general compute memories, an Ethereum miner is assured that they will not waste resources generating false positives (i.e., invalid solutions) and/or miss valid solutions (i.e., a false negative) in the predefined space.

Consider a system where Ethereum mining is performed by nodes that trust one another (i.e., no malicious activity). Under such a scenario, errors may be attributed to hardware faults rather than malicious activity and would not be penalized. Instead, hardware faults can be handled with a variety of error-tolerant techniques. For example, hardware systems may use error-tolerant techniques such as self-monitoring, analysis, and reporting technologies (SMART).

Additionally, memories could be used under conditions that exceed normal operating parameters (e.g., over clocked for faster searching) and/or unreliable memories could be used at much lower cost.

Conceptually, using error-tolerant systems to perform proof-of-work (POW) searching may seem to provide advantages over traditional general compute memory alternatives. However, the amount of error-tolerance that is acceptable may be characterized in order to ensure that the benefits outweigh the possible inefficiencies caused by false positives and/or missed solutions.

A generalized mathematical representation to express solution error rate (SER) (also referred to as "false positives") as a function of corrected bit error rate (BER) is given by:

$$SER = 1 - (1-BER)^M \qquad \text{EQN 1:}$$

Where:
BER is the bit error rate of the memory (after ECC correction); and
M is the size of the solution (in bits).

Figure 2A:
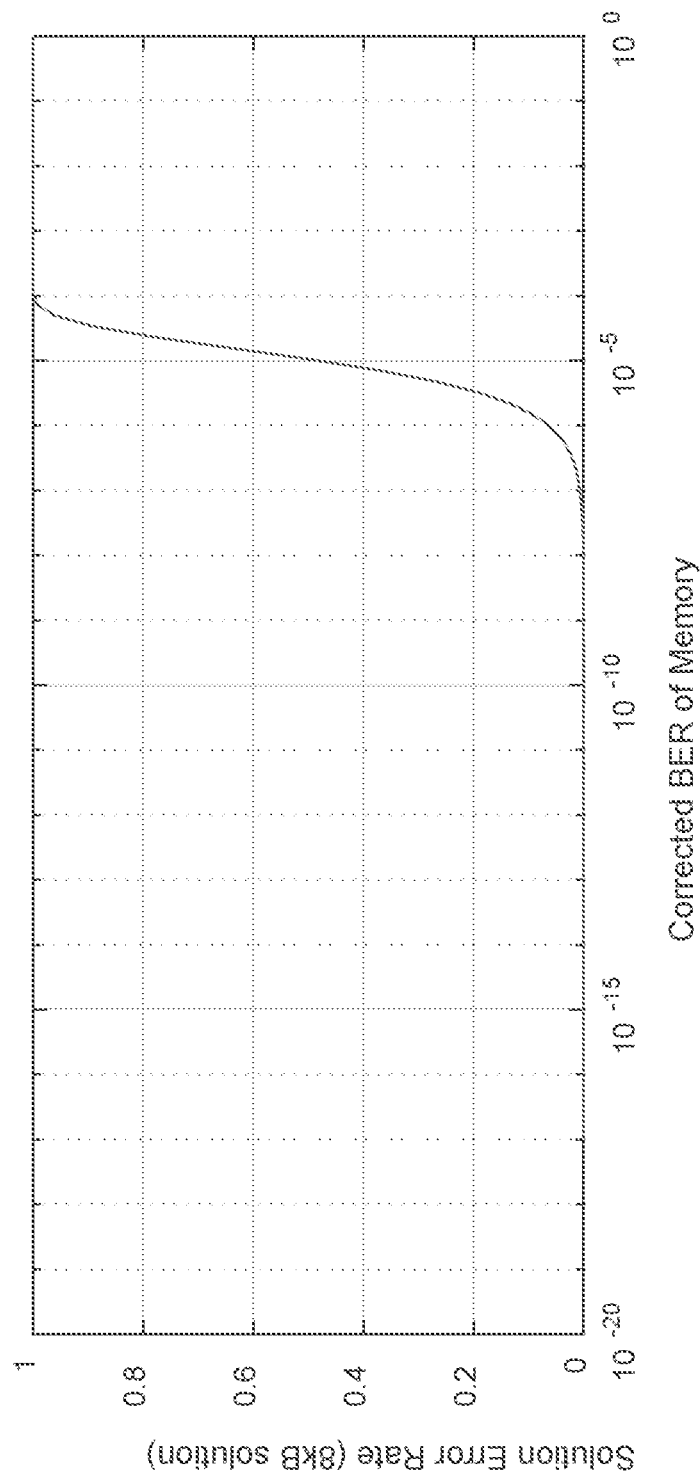
FIGS. 2A-2C are graphical representations of corrected Bit Error Rate (BER), useful to calculate a system efficiency, in accordance with the various principles described herein.

FIG. 2A graphs an exemplary SER as a function of the corrected BER of memory, using parameters that model Ethash for Ethereum (e.g., M=64*128B (a 8 KB solution)).

Some valid solutions are also lost due to BER. However, the solution loss rate (SLR) ("false negatives") only occurs once a valid solution is found but an error prevents its correct identification. Very rarely, some errors that should cause invalid solutions may also achieve a "lucky" outcome and be valid. In other words, a false negative is the combination of: (i) the error free condition $(1-BER)^M$ and (ii) a lucky error that causes the solution density function (SDF)) to be serendipitously corrupted $(1-(1-BER)^M)$. Thus, a generalized mathematical representation to express solution loss rate (SLR) as a function of corrected bit error rate (BER) is given by the combination of the two foregoing scenarios (i) and (ii):

$$SLR = 1 - ((1-BER)^M + SFD*(1-(1-BER)^M)) \qquad \text{EQN 2:}$$

Where:
BER is the bit error rate of the memory (after ECC correction);
M is the size of the solution (in bits); and
SFD is the solution density function.

Figure 2B:
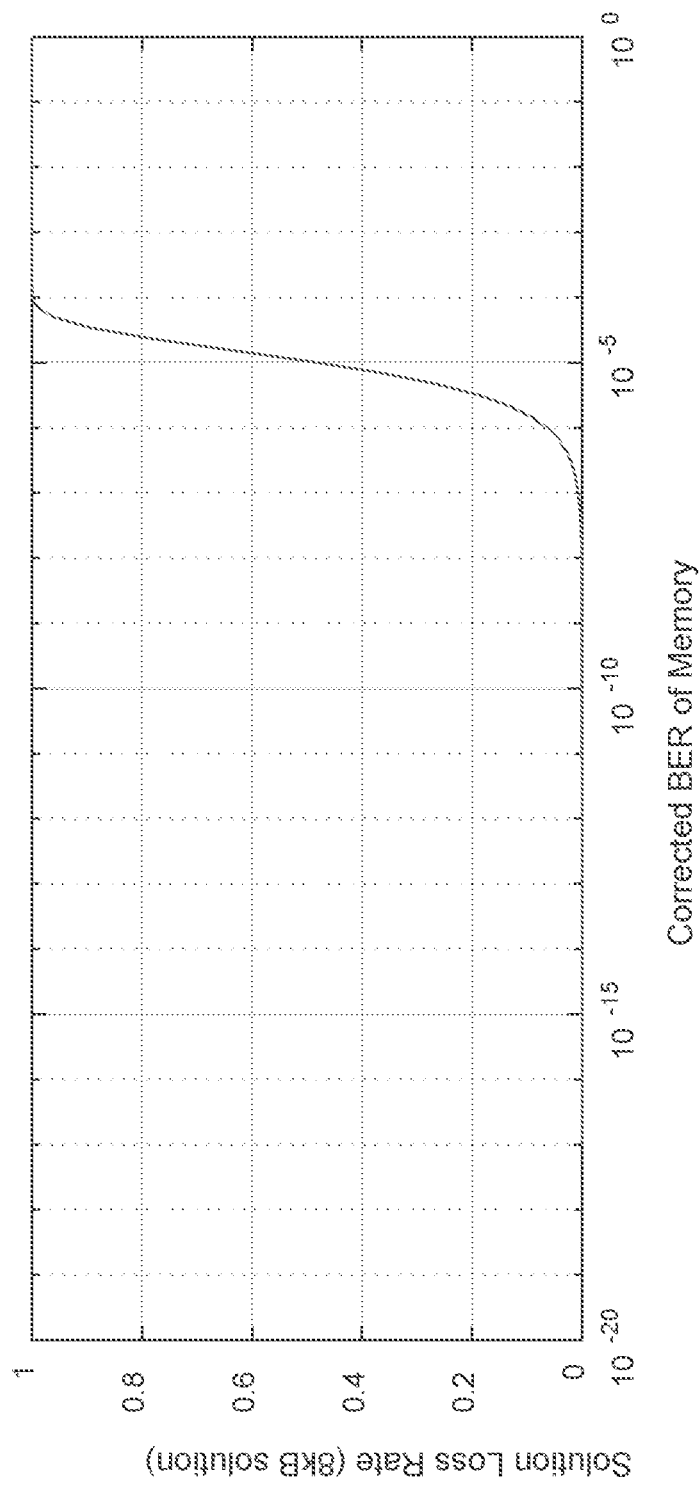

FIG. 2B graphs an exemplary SLR as a function of the corrected BER of memory, using parameters that model Ethash for Ethereum (e.g., for M=64*128B (a 8 KB solution) and SFD=1/1515456000). Here, the SFD represents a "difficulty" ratio of valid solutions to total search space for Ethash.

The system efficiency can be determined as a function of false positives and false negatives; system efficiency provides a relative measure to prior art systems (which are assumed to have a 100% efficiency (1)). A generalized mathematical representation based on the two foregoing equations EQN 1 and EQN 2 is provided herein:

$$\text{System Efficiency} = ((1-BER)^M + SFD*(1-(1-BER)^M)) - 1 \qquad \text{EQN 3:}$$

Where:
BER is the bit error rate of the memory (after ECC correction);
M is the size of the solution (in bits); and
SFD is the solution density function.

Figure 2C:
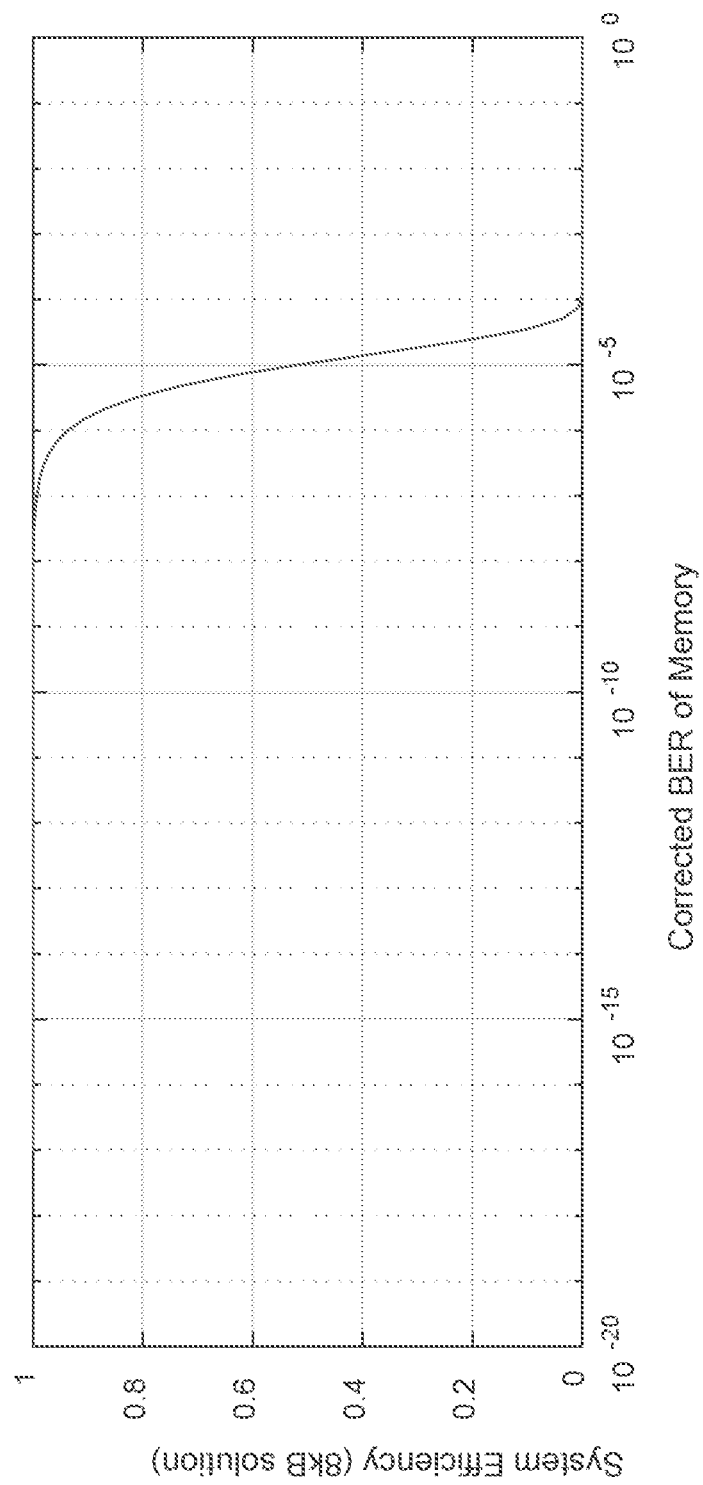

FIG. 2C graphs an exemplary system efficiency as a function of the corrected BER of memory, based on the Ethash parameters. As shown therein, even memories with very high error rates can provide Ethash proof-of-work (POW) that is almost as efficient as general compute memory over a very broad range of BER performance. More directly, FIG. 2C demonstrates that error-tolerant techniques can be successfully used in Ethereum mining.

Artisans of ordinary skill in the related arts will readily appreciate that although the efficiency curve of FIG. 2C shows an exemplary Ethereum POW system efficiency curve as a function of corrected BER performance, the Ethereum POW mining application is merely exemplary in nature. Any application could be analyzed in the same manner to generate an efficiency curve. Furthermore, the "corrected BER" analysis is conservative. Most memories (such as DRAM) include internal error-correcting code (ECC) logic that provides a "corrected BER" with substantially better performance than the raw BER of the DRAM. The corrected BER of the forgoing discussion is a BER after ECC, but does not account for the effects of other error correcting logic that may be external to the memory.

Exemplary Blockchain Ledger Appliances—

Figure 3:
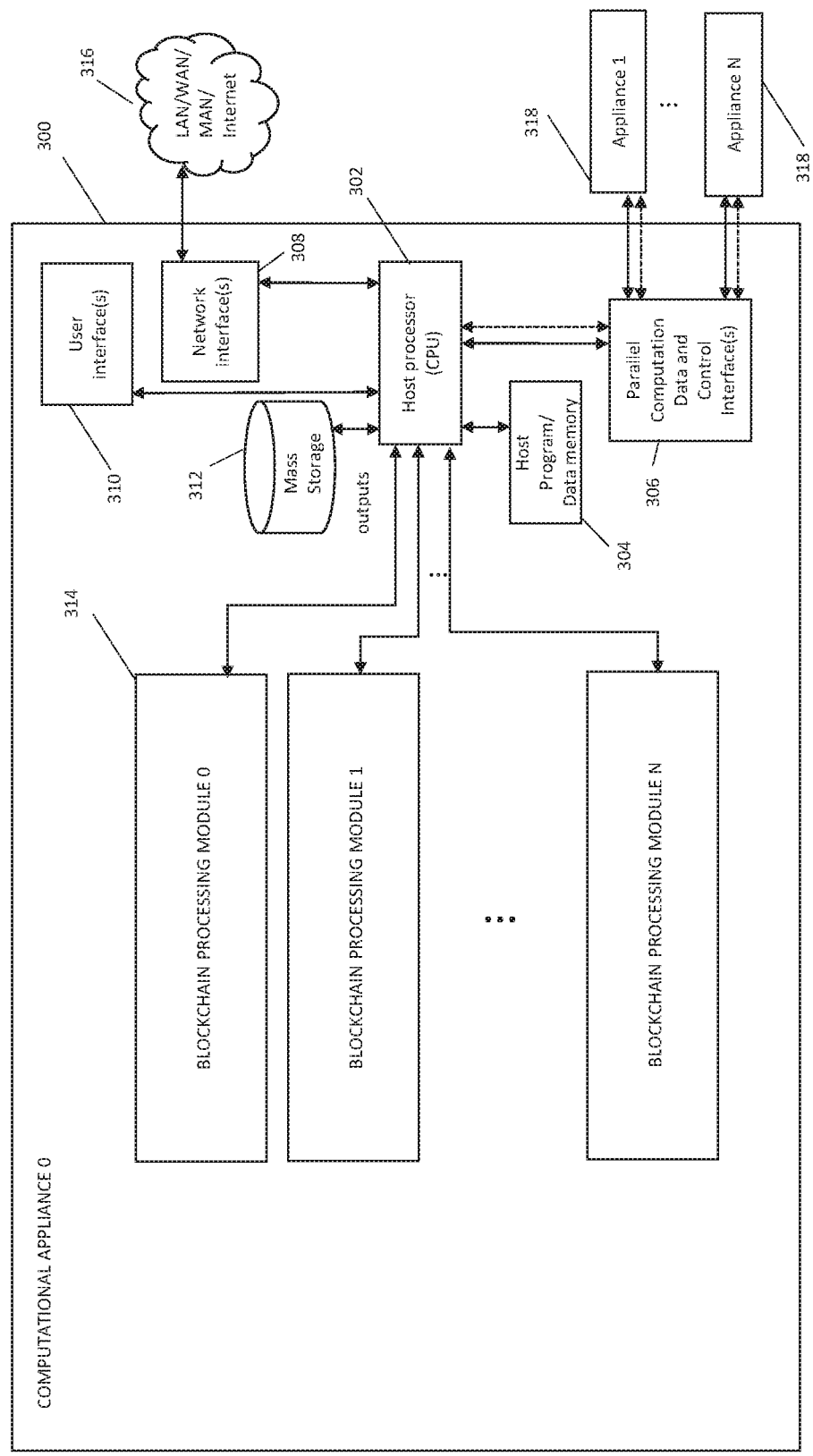
FIG. 3 is a functional block diagram of a generalized embodiment of a computational appliance according to the present disclosure.

Referring now to FIG. 3, one embodiment of a computational appliance according to the present disclosure is shown and described. It will be recognized that while the following discussion is cast primarily in terms of computerized device form factor (e.g., a desktop, tower, rack-mounted, or similar type of "box"), the various embodiments of the appliance described herein may take on any type of form factor, including for instance client devices (e.g., smartphones, 3GPP UEs, tablets, server blades, or plug-in cards or modules, as but a few examples).

As illustrated in FIG. 3, the computation appliance 300 of the present embodiment includes, inter alia, a host processor/CPU 302, program/data memory 304 supporting the host processor, mass storage 312 (e.g., HDD, SSD, or other), one or more data network interfaces 308 to external LAN/WAN/MAN/Internet(s) 316, a user interface 310 (e.g., capacitive touch screen, speech input, mouse, trackball, touchpad, and/or keyboard).

In one embodiment, the appliance includes a parallel computation data interface 306 such as a PCIe bus interface, USB port, etc. for data communication between the appliance 300 and other such appliances 318 which may be placed in communication with the appliance for purposes of, inter alia, parallel computation such as blockchain proof-of-work (POW) searches and/or application programming interface (API) communications discussed in greater detail hereinafter. In the illustrated embodiment, the host processor 302 is configured to execute one or more management algorithms or programs which enable the appliance 300 and any connected other appliances 318 to run in parallel to perform non-duplicative operations, such as blockchain POW searches using different randomized seeds as one example. In some embodiments (not shown) the appliance 300 may also be in communication with other appliances 318 via the network interface 308. For example, various ledger appliances may communicate over a LAN/WAN/MAN or internet for the aforementioned purposes of, inter alia, parallel blockchain POW searches and/or application programming interface (API) communications.

The appliance 300 of FIG. 3 also includes a blockchain processing module 314; while multiple modules 314 are shown, it will be appreciated that any number of modules may be used consistent with the present disclosure (e.g., a single module, or multiple sub-modules within the modules 314, not shown).

As described in greater detail with respect to FIGS. 4-6 below, the exemplary processing module(s) 314 may take on any number of forms, including both those with search logic (e.g., one or more "search stages") and validation logic (e.g., one or more "validation stages"), or merely search stage(s). Generally speaking, the exemplary embodiments of the search stages of the blockchain processing modules 314 of FIG. 3 may include one or more generic processors and one or more "characterized" memory devices. Higher end implementations may use e.g., customized ASICs and/or general compute memories.

Figure 3A:
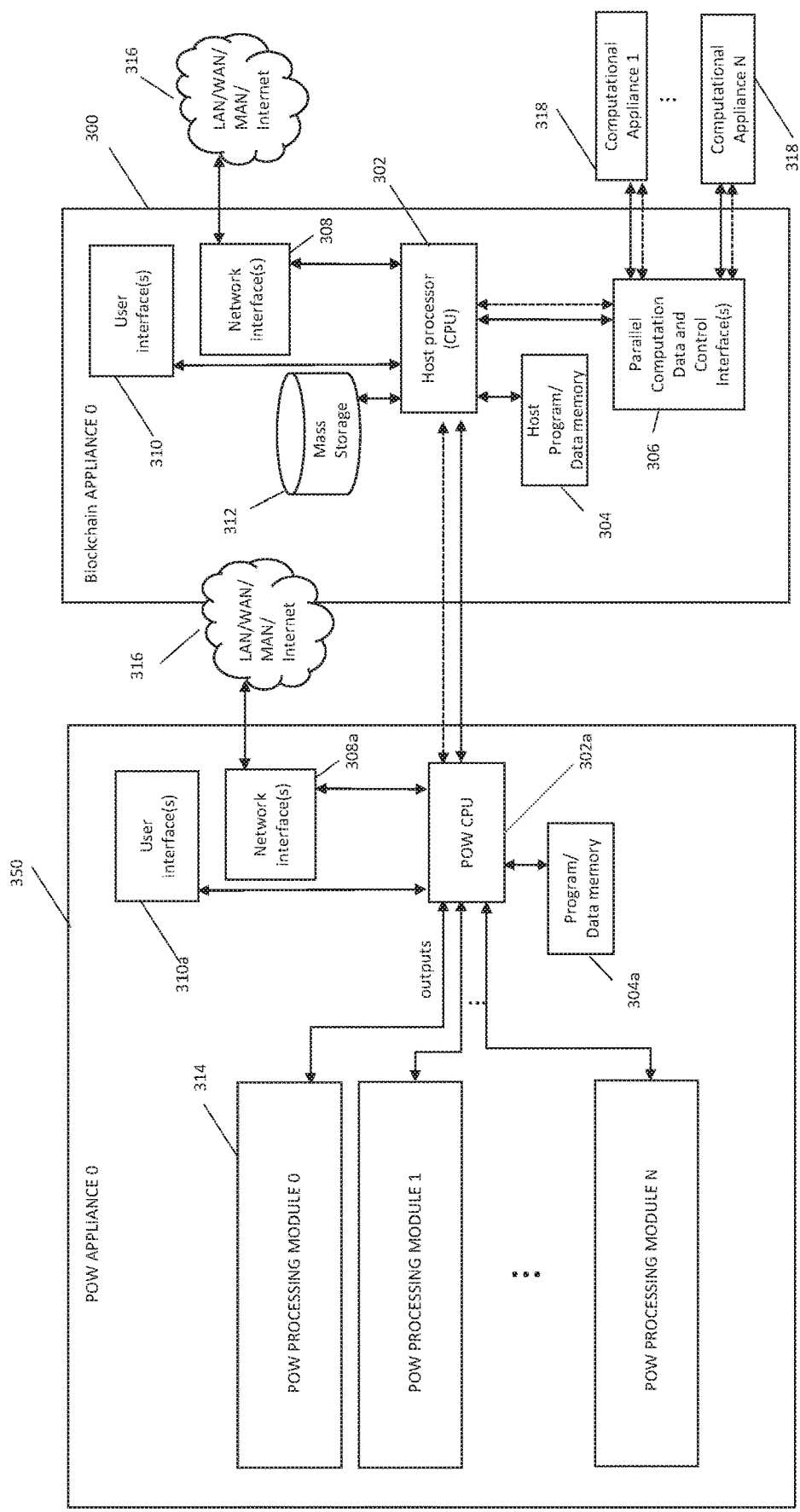
FIG. 3A is a functional block diagram of one embodiment of a blockchain appliance connected to a proof-of-work (POW) appliance, according to aspects of the present disclosure.

FIG. 3A illustrates a computational system including a proof-of-work (POW) appliance 350 separated from a blockchain appliance 300, according to aspects of the present disclosure. The POW appliance 350 generates entropy for a consumer that is on the order of about 2000× of the energy consumption of the blockchain appliance 300. The POW appliance 350 can be e.g., a water heater sitting in someone's house that is heating water with waste energy. The separate blockchain appliance 300 actually serves the blockchain.

Referring back to FIG. 3A, the blockchain appliance 300 includes, inter alia, a host processor/CPU 302, program/data memory 304 supporting the host processor, mass storage 312 (e.g., HDD, SSD, or other), one or more data network interfaces 308 to external LAN/WAN/MAN/Internet(s) 316, and a user interface 310 (e.g., capacitive touch screen, speech input, mouse, trackball, touchpad, and/or keyboard). The separate POW appliance 350 includes, inter alia, an internal POW processor/CPU 302a connected to blockchain processing module(s) 314, a program/data memory 304a supporting the POW processor 302a, one or more data network interfaces 308a to the external LAN/WAN/MAN/Internet(s) 316, and a user interface 310a. The host processor 302 of the blockchain appliance 300 is in communication with the POW processor 302a through an interface (e.g., a bus interface or the network interface 308a). In one embodiment, the host processor 302 of the blockchain appliance 300 is also in data communication with computational appliances 318, through a parallel computation data interface 306. The computational appliances 318 may be: (i) similar to the blockchain appliance 300, in communication with their respective POW appliances, (ii) blockchain appliances with integrated POW processing modules (as in FIG. 3), or (iii) any combination of the different types of computational appliances. In some embodiments, the host processor 302 may be in communication with one or more of the computational appliances via the network interface 308.

Figure 3B:
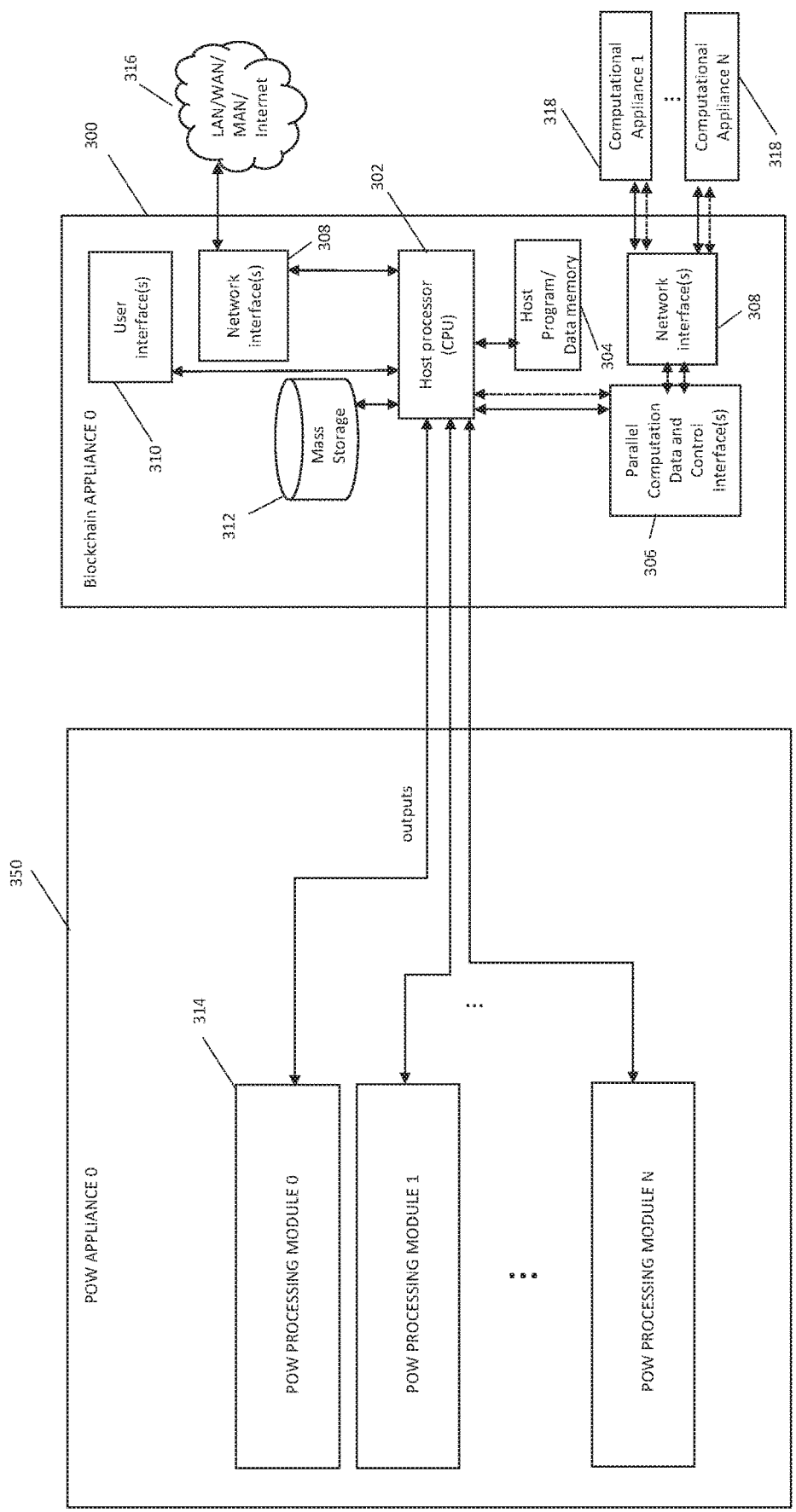
FIG. 3B is a functional block diagram of another embodiment of a blockchain appliance connected to a POW appliance, according to aspects of the present disclosure.

FIG. 3B illustrates another embodiment of the present disclosure, where a blockchain appliance 300 is connected to a separate POW appliance 350. The embodiment of FIG. 3B is similar to the embodiment of FIG. 3A. However, the blockchain appliance 300 of FIG. 3B incorporates the validation step/logic of the POW appliance, which allows for a simpler POW appliance 350. The blockchain appliance 300 of the present embodiment includes, inter alia, a host processor/CPU 302, program/data memory 304 supporting the host processor, mass storage 312 (e.g., HDD, SSD, or other), one or more data network interfaces 308 to external LAN/WAN/MAN/Internet(s) 316, a user interface 310 (e.g., capacitive touch screen, speech input, mouse, trackball, touchpad, and/or keyboard). The blockchain appliance 300 may be in data communication with additional application appliances 318 through e.g., the network interface 308. The POW appliance 350 includes POW processing module or modules 314 in communication with the host processor 302 of the blockchain appliance 350.

Figure 3C:
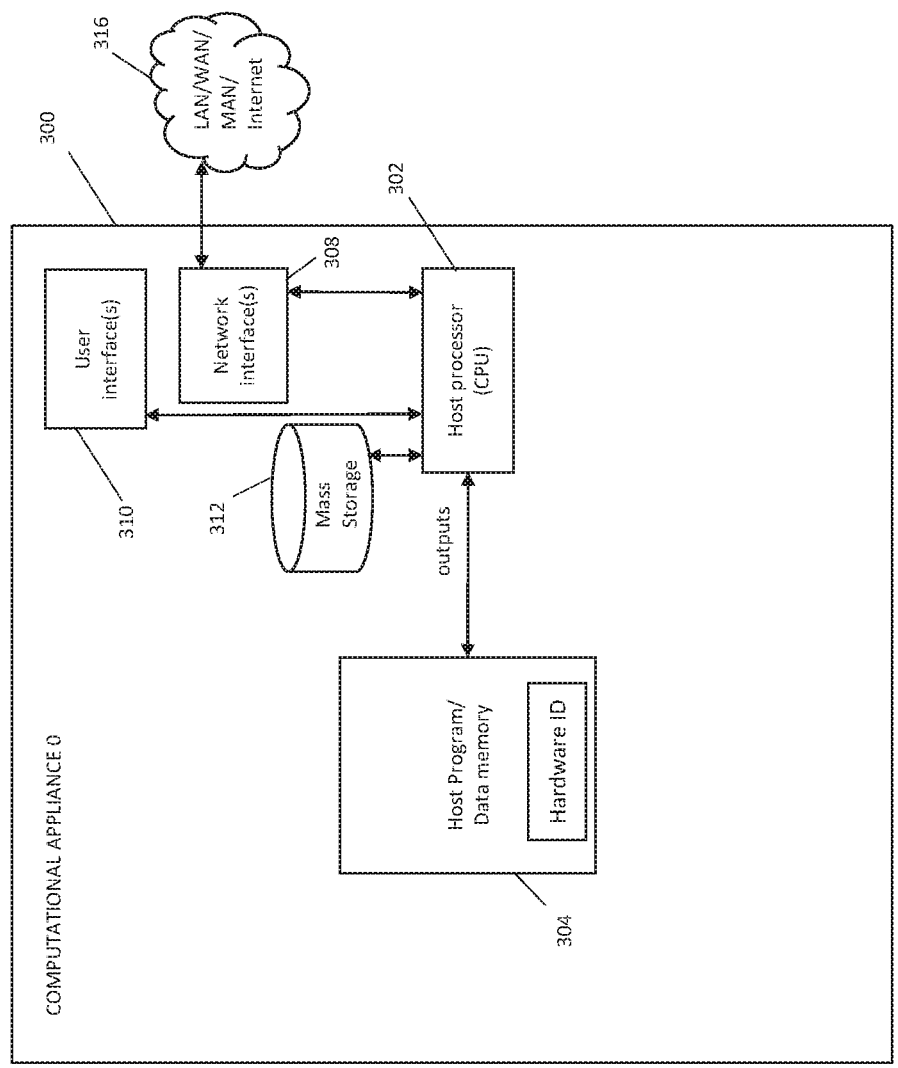
FIG. 3C is a functional block diagram of a computational appliance using proof-of-hardware (POH), according to aspects of the present disclosure.

FIG. 3C illustrates an embodiment of a computational appliance 300 in accordance with the present disclosure, where the computational appliance 300 includes a proof-of-hardware (POH) memory which generates a hardware encrypted signature for POH. For example, a small device within the memory 304 with a physically unclonable function (PUF) can be used to generate a secure hardware identity for the computational appliance (e.g., the hardware has a unique ID and is cryptographically capable of signing messages). In another variant, a manufacturer can load a hardware identity into the memory hardware through some other means. The computational appliance 300 of FIG. 3C uses the unique hardware ID to provide blocks with poof-of-hardware (POH) instead of proof-of-work (POW).

In another variant, transactions within a blockchain (such as for example a Lightning channel) may be signed using a PUF. As a brief aside, Lightning is a decentralized network using smart contract functionality in the blockchain to enable payments across a network of participants. The Lightning network is dependent upon the underlying technology of the blockchain. Based on real Bitcoin/blockchain transactions, Lightning creates an ostensibly secure network of participants which can transact at comparatively higher volume and higher speed. In one implementation, multiple (e.g., two) participants create a ledger entry on the blockchain. This entry requires each of the participants to confirm/authorize on any spending of funds. Transactions which refund the ledger entry to their individual allocation are created for each participant; however these are not distributed to the blockchain. Participants update individual allocations for the ledger entry through creation of transactions "spending" from the current ledger entry, with only the most recent version being valid. This mechanism is enforced in one implementation of the present disclosure by blockchain-parsable smart-contract scripting, as well as use of the aforementioned PUF (physically unclonable function), the latter which can be used to generate a secure hardware identity for the computational appliance of the particular participant in some or all of the above Lightning transaction(s).

Figure 3D:
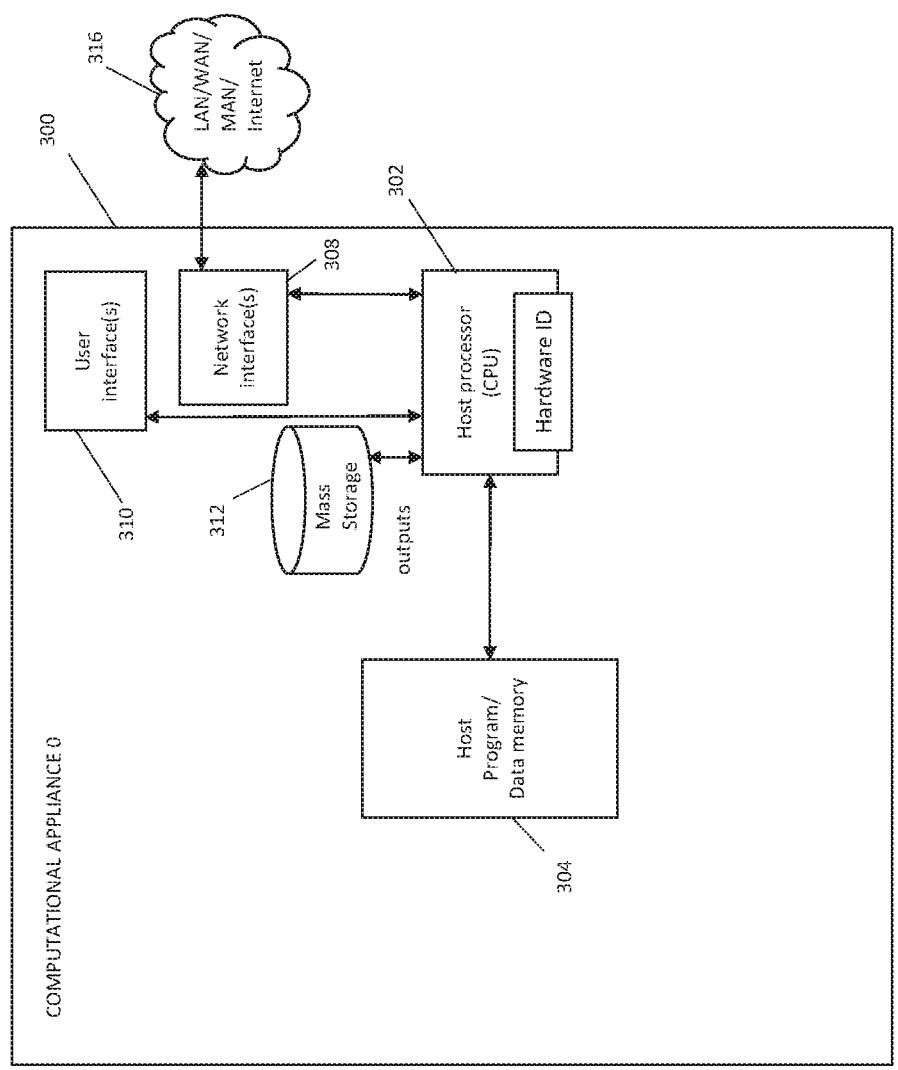
FIG. 3D is a functional block diagram of a computational appliance using POH, according to aspects of the present disclosure.

FIG. 3D illustrates another embodiment of a computational appliance 300 in accordance with the present disclosure. The embodiment of FIG. 3D is similar to the embodiment of FIG. 3C, except the POH is generated from the processor 302. In various other embodiments, the POH can be generated from any component within the computational appliance, including a standalone chip.

Figure 3E:
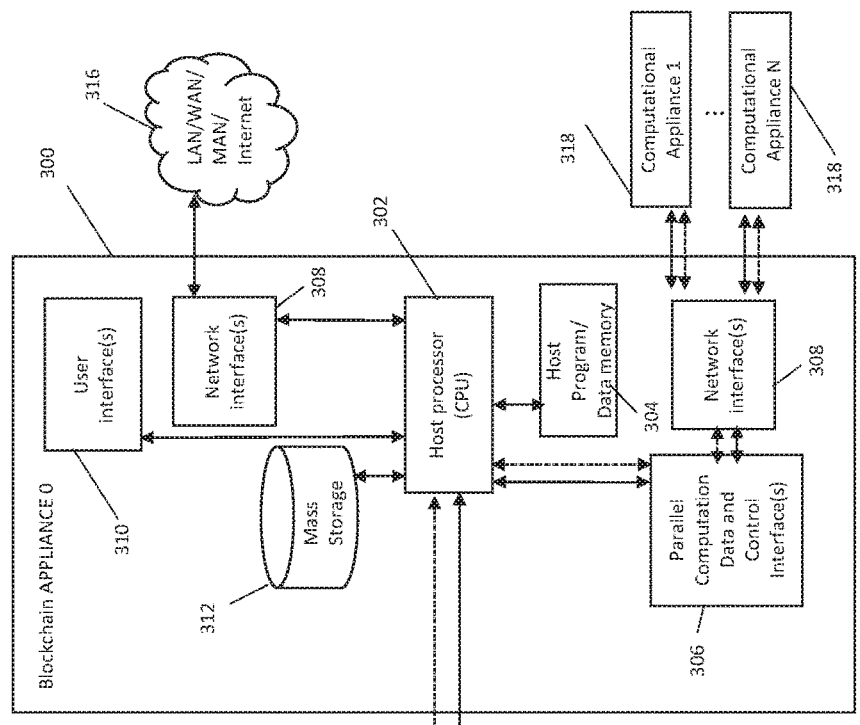
FIG. 3E is a functional block diagram of one embodiment of a blockchain appliance connected to a POH appliance, according to aspects of the present disclosure.
Figure 3E:
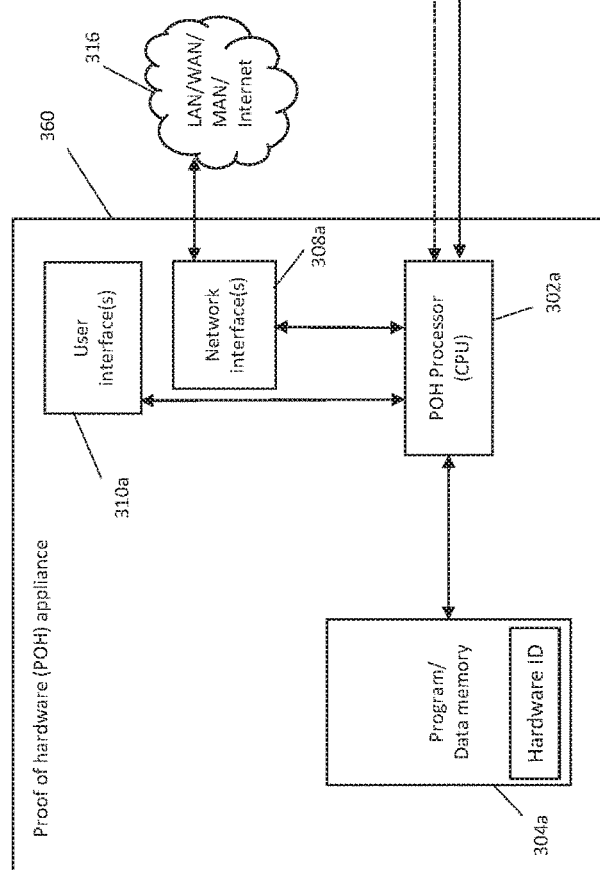

FIG. 3E illustrates a computational system according to aspects of the present invention, including a proof-of-hardware (POH) appliance 360 separated from a blockchain appliance 300. The use of the POH appliance 360 instead of a POW appliance can provide savings on entropy cost. The blockchain appliance 300 includes, inter alia, a host processor/CPU 302, program/data memory 304 supporting the host processor, mass storage 312 (e.g., HDD, SSD, or other), one or more data network interfaces 308 to external LAN/WAN/MAN/Internet(s) 316, and a user interface 310. The separate POH appliance 360 includes, inter alia, an internal POH processor/CPU 302a, a program/data memory 304a supporting the POW processor 302a, one or more data network interfaces 308a to the external LAN/WAN/MAN/Internet(s) 316, and a user interface 310a. The POH appliance provides a unique hardware encrypted signature generated by e.g., a hardware ID of the program/data memory 304a of the POH appliance. In one variant, the POH is generated by the POH processor 302a or another component of the POH appliance 360.

The host processor 302 of the blockchain appliance 300 is in communication with the POH processor 302a through e.g., a separate bus interface or through a network or Internet 316. In one embodiment, the host processor 302 of the blockchain appliance 300 is also in data communication with additional computational appliances 318 through e.g., the network interface 308.

As used herein, the term "generic" is used to describe a processor that is not specifically designed for blockchain processing. Many special use processors (e.g., application processors, media processors, baseband processors, etc.) may be viewed as "generic" within the context of blockchain processing; for example, a network server may (during periods of inactivity) be pressed into service as a generic processor for blockchain processing. While the techniques described herein may be performed on generic processors, they may also be used with success in custom blockchain processing applications. More directly, the various concepts described herein can accomplish performance gains through a numerosity of ledger appliances, rather than specific performance requirements for any single device or appliance.

Within the present context, the term "characterized" is used to describe a memory device that has been verified (empirically tested or otherwise) to provide at least a specific level of performance over a range of conditions. As a brief aside, general compute memories are typically only "specified" for an identified performance under standardized conditions via factory run pass/fail memory test; there is no commercial value to testing general compute memories beyond the pass/fail test. In contrast, characterized memories may include memories from experimental memory runs, refurbished memories, faulty memories, or other applications that undergo a more comprehensive set of testing to assess performance over a range of operating conditions.

For example, with respect to POW solutions, 99 of 100 attempted header/nonce combinations could be valid with characterized memories. A low-end memory (e.g., a memory device that is nominal rated or specified for lower performance relative to higher-class devices) can be over-clocked at higher speeds to generate sufficient POWs. Memories may be over-clocked using higher voltages to achieve acceptable error rates. Moreover, since the memory POW can tolerate much higher error rates than normal computation, the memories can be over-clocked at normal voltages (resulting in longer overclocked lifetimes).

In other words, using characterized memory for mining, consistent with the present disclosure, may intentionally tradeoff errors for other benefits e.g., improved performance, reduced cost, improved memory life. For example, if 3% of results are invalid but the results are being generated 25% faster, the overall acceleration of the system is 21.25% (e.g., 125% faster times 97% accuracy). The overall boost may be even greater in "race" scenarios such as cryptocurrency mining (i.e., only the first miner to locate a solution is rewarded, the second miner loses out even if he eventually locates the same solution).

In one exemplary embodiment, a pool of characterized memories can return memory search results for memory hard proof-of-work (POW) solutions used in cryptocurrency mining e.g., Ethereum mining. Advantageously, the less expensive, defective, or otherwise unmarketable memory that has been characterized with an error rate performance over a range of one or more parameters can be leveraged. Such characterized memories can expand and parallelize memory searching in cryptocurrency mining in a cost efficient manner.

As described in greater detail hereinafter, memory devices may be tiered into many different tiers of class based on their uncorrectable fault performance. In particular, so-called "correctable" faults can be corrected with e.g., repair and/or error correcting codes (ECC). However, "uncorrectable" faults cannot be corrected due to e.g., exhaustion of repair resources and/or limitations of ECC capability. In one such variant, memories with uncorrectable faults may be validated (with a validation stage); such techniques may enable cost efficient reuse of memories that otherwise might be unmarketable and/or thrown away.

Furthermore, schemes for categorizing memory faults into probabilistic errors in memory technology due to stochastic sources, and hardware failures due to physical defects, are disclosed. Various methods and apparatus are described which, inter alia, monitor the degradation of memory performance to provide a continuous in-use performance characterization. Degradation of memory performance attributed to stochastic errors and not physical defects can be used to intelligently refresh the characterized memory more or less frequently to optimize performance and/or productive life. Degradation of memory performance attributed to uncorrectable faults due to accumulating physical defects can be used to trigger hardware replacement. The various described techniques ensure proper performance (e.g., error rate) and/or efficiency of the characterized memory.

Additionally, as is discussed in greater detail hereinafter, the mathematical relationship between corrected BER and system efficiency can be used to in reverse to infer the corrected BER of a memory. In other words, memories that have not been characterized or that have degraded in performance since characterization, can be monitored to infer a likely corrected BER.

In one exemplary embodiment of the appliance 300 in FIG. 3, the network interfaces 308 for communication with network entities (e.g., other miners) include a radio frequency (RF) device having, inter alia, antenna and one or more RF tuners. The RF antenna(s) are configured to detect and transmit and receive signals from radio access technologies (RATs) in the service area or venue with which the validation apparatus is associated. For example, LTE (including, e.g., LTE, LTE-A, LTE-U, LTE-LAA) signals may be used as the basis of communication between the computational apparatus 300 and the various other devices (e.g., other miners). The antenna(s) may include multiple spatially diverse individual elements in e.g., a MIMO- or MISO-type configuration, such that spatial diversity of the transmitted and/or received signals can be utilized.

In one such implementation, the radio interface(s) include one or more LTE-based radios compliant with 3GPP. Additional unlicensed, licensed, or quasi-licensed air interfaces may also be used within the exemplary apparatus 300, including e.g., Wi-Fi, LTE, 5G NR, or others. Moreover, the LTE radio functionality may be extended to incipient 3GPP-based 5G NR protocols; e.g., at maturation of LTE deployment and when 5G NR-enabled handsets are fielded, such adaptation being accomplished by those of ordinary skill given the contents of the present disclosure.

As a brief aside, NG-RAN or "NextGen RAN (Radio Area Network)" is part of the 3GPP "5G" next generation radio system. 3GPP is currently specifying Release 15 NG-RAN, its components, and interactions among the involved nodes including so-called "gNBs" (next generation Node B's or eNBs). NG-RAN will provide high-bandwidth, low-latency (e.g., on the order of 1 ms or less "round trip") wireless communication and efficiently utilize, depending on application, both licensed and unlicensed spectrum of the type described supra in a wide variety of deployment scenarios, including indoor "spot" use, urban "macro" (large cell) coverage, rural coverage, use in vehicles, and "smart" grids and structures. NG-RAN will also integrate with 4G/4.5G systems and infrastructure, and moreover new LTE entities are used (e.g., an "evolved" LTE eNB or "eLTE eNB" which supports connectivity to both the EPC (Evolved Packet Core) and the NR "NGC" (Next Generation Core).

Incipient wireless technologies have expanded with each iteration (e.g., 3G, 4G, and 5G) to cover a broader and broader ecosystem of devices; modern wireless technologies will span from commodity type modems (e.g., in Internet-of-Things (IoT)) to high-end modems. Additionally, many intended use-cases that are under discussion for e.g., 5G are based on the passive collection of data by many commodity type modems, often under circumstances that are noisy, untrusted, prone to malicious attack. Blockchain algorithms are designed for exactly these untrusted scenarios. Consequently, the memory hard blockchain solutions described herein will enable a variety of incipient and future wireless applications.

Notably, the enhanced bandwidth and latency reduction, and more importantly the general ubiquity or granularity with which 5G NR networks are designed to operate (including "edge heavy" operating profiles which decentralize many operations previously only accessible via the EPC in 4G/4.5G, and support for a broad array of device profiles ranging from simplistic IoT devices to fully featured UE), yet further leverage the decentralization aspects of the exemplary computational apparatus described herein. Simply put, much smaller, less power consumptive and ubiquitous mining or other computational appliance 300 at the edge of the network, supported by a non-centralized wireless infrastructure, enables a large increase in the scale and distribution of the computational work under e.g., an exemplary POW model. With many entities each having a moderate- or small-scale computational device in direct data communication with many other similarly equipped entities, the POW model becomes almost completely de-centralized, in contrast to extant architectures which as described supra, are becoming increasingly centralized.

It will further be recognized that the exemplary memory-bound applications and techniques described herein are particularly synergistic in the context of wireless applications (and other processor and/or power limited environments) from another aspect. Specifically, "processor hard" and "processor bound" algorithms inherently require abundant processing cycles (and power). Unfortunately, wireless devices often time share processing power for communication protocol stacks and applications. Moreover, most wireless devices run on battery power, which imposes strict power consumption limitations. In contrast, memory hard algorithms can be performed with relatively little computational complexity and likely less power.

Validated Processing Module Architectures—

One inference that can be made in view of the exemplary system efficiency curve for Ethereum POW mining of FIG. 2C, is that the solution density is very "sparse". As used in the present context, the term "sparse" refers to a solution space that is very thinly populated with valid solutions. In other words, the vast number of attempted header/nonce combinations are not valid solutions; in fact, the sparsity of the Ethash algorithm is an intentional property of proof-of-work algorithms. More directly, as specifically noted above, the probability that a valid solution is miscalculated and passes due to luck is insignificant. However, in a related corollary, the probability that an invalid solution is miscalculated and believed to be valid (i.e., a false positive) may be more common, however sufficiently rare as to offset other considerations (such as cost or speed).

More directly, conventional wisdom has held that mining with unreliable memory is not desirable, as it will likely result in broadcasting invalid POW solutions, thereby wasting resources (e.g., time and power), and perhaps being banned from the network. However, the foregoing analysis shows that some level of invalid POW may be tolerable and/or even preferable.

Accordingly, depending on the particular needs of the application for which a given appliance is being used, validation may or may not be desirable. For example, as discussed supra, characterized memories can be directly used in Ethereum POW mining; however, broadcasting invalid solutions directly to the network from a characterized memory in such an application could have undesirable consequences or invoke countermeasures (e.g., the submitter to be banned temporarily or permanently from the network, or at a minimum, waste resources on generating and broadcasting false POW solutions that will not result in any rewards).

Hence, for such applications, a mechanism to validate POW solutions before they are broadcast, such that characterized memory can be used without the risk of suffering undesirable consequences, is provided herein. FIG. 4 depicts one exemplary embodiment of a "validated" memory architecture 400 for use in these applications; e.g., as all or portions of the processing module(s) 314 of the appliance 300 of FIG. 3.

Figure 4:
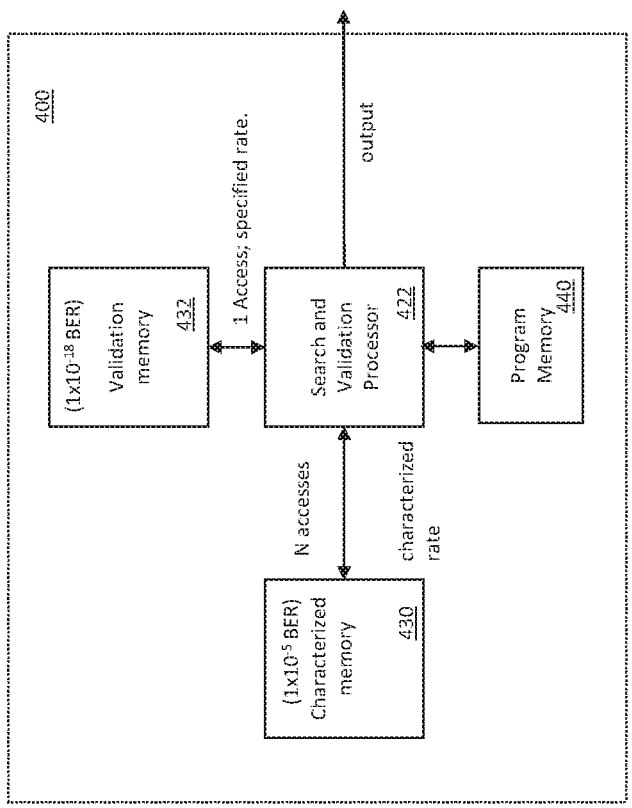
FIG. 4 is a functional block diagram of a first exemplary embodiment of a search apparatus configured to search for proof-of-work (POW) using a blockchain-based search algorithm and validation stage, according to the present disclosure.

As shown in FIG. 4, the "validated" memory architecture 400 includes a characterized memory 430 and search and validation processor 442 apparatus with supporting validation memory 432 and program memory 440. During operation, the memory architecture 400 uses the characterized memory device(s) 430 to search for, and generate, POW solutions in accordance with the aforementioned processes. Thereafter, the validation memory 432 is used to validate the generated POW solutions. For example, in one implementation, the processor 442 executes a hash algorithm utilizing the characterized memory 430 to find a POW solution using the characterized parameter (e.g., a rate which may be over-clocked for acceptable application performance of e.g., $1 \times 10^{-5}$ BER), and then execute a one-time look up verification of the POW solution utilizing the general compute memory (validation memory 432) at its specified rate (e.g., $1 \times 10^{-18}$ BER).

As previously alluded to, Ethash is asymmetric in that a solution is difficult to find, but relatively easy to verify. Within the context of FIG. 4, the validation memory 432 can be used to verify the POW identified by the characterized memory 430 with low processor utilization and a relatively small amount of memory. For example, empirical experiments shows that the Ethash POW mining takes approximately 12-15 seconds to find a suitable header/nonce solution, whereas validation can occur almost instantaneously.

In one exemplary embodiment, the characterized memory 430 is operated to maximize overall search speed (even at the expense of accuracy), whereas the validation memory 432 is used to accurately verify the search (which does not need to be done as quickly). A variety of techniques can be used to maximize the search speed and/or minimize costs of the characterized memory 430. For example, some variants may overclock the characterized memory, other variants may remove internal memory overhead (e.g., ECC, eFuse, CRC, etc.) which take time and consume memory bandwidth. In another such example, a relatively inexpensive memory can be over-clocked to achieve comparable rates to much more expensive general compute alternatives.

Similarly, a variety of techniques can be used to improve accuracy and/or reduce cost of the validation memory 432. For example, the validation memory 432 can use a relatively slow memory that has good BER. In other variants, the validation memory 432 can use memory technologies that are optimized for other applications. For example, a characterized DRAM (which is volatile) can be used to quickly and inexpensively mine for POW, whereas a flash memory (which is non-volatile) can be used as a low-power validation memory 432.

Additionally, the memory architecture 400 of FIG. 4 provides additional synergies which may be unavailable to e.g., the simpler memory architectures. In one exemplary embodiment of the present disclosure, the validation memory 432 tracks the error rate of the characterized memory 430 and monitors memory performance in view of an expected solution density function. For example, within the context of Ethereum POW mining, the validation memory 432 can determine how well the characterized memory 430 is performing over time and/or operational uses. More directly, if the rate for the characterized memory is expected to yield a solution density of 90% (e.g., a BER of $1 \times 10^{-6}$ per FIG. 2C), but the actual solution density is closer to 70%, then the memory is underperforming (e.g., roughly equivalent to a BER of $\sim 5 \times 10^{-5}$).

In some variants, the underperforming characterized memory may be re-characterized for a lower performance. For example, by reducing clock frequency, the memory performance may return to acceptable levels. In other cases, the characterized memory may still offer sufficient solution density to continue operation in its degraded state. In still other implementations, the processor 442 may initiate corrective action (such as more frequent refreshes, replacement, and/or a rewrite of the DAG entries).

As a brief aside, DRAM memory technology stores information as a charge in a capacitive cell; over time, the charge in the DRAM cell decays, thus the DRAM cell must periodically be "refreshed" with the proper value. In some cases, a cell may have a "soft error" because the charge has decayed to an improper value; soft errors may be a product of manufacture (e.g., manufacturing tolerances may result in slightly more or less capacitance for each cell), probabilistically occur over time, and/or may even be intentionally allowed to accumulate. For example, refresh consumes memory bandwidth (the cell cannot be accessed during refresh) thus refreshing may be reduced to increase memory bandwidth. In contrast, malfunctioning cells are considered "hard errors." Common examples of hard errors include memory cells that are stuck "high" or "low." Analogous functionality is present in other forms of memory (e.g., SRAM, Flash, etc.).

In some variants, correctable and uncorrectable faults in the characterized memory 430 may be categorized differently. As previously noted, so-called "correctable" faults can be corrected with e.g., repair and/or error correcting codes (ECC). However, "uncorrectable" faults cannot be corrected due to e.g., exhaustion of repair resources and/or limitations of ECC capability. More directly, the probabilistic accumulation of correctable errors during normal operation can be remedied with e.g., a memory rewrite and/or more frequent refresh intervals; in contrast an accumulation of uncorrectable errors indicates that the characterized memory 430 should be replaced.

In some variants, rewriting the characterized memory 430 merely entails an entry-by-entry copy of the validation memory 432. In other words, the validation memory 432 has the "clean" copy of the Ethereum DAG. The DAG need not be regenerated from scratch for the characterized memory 430.

Artisans of ordinary skill in the related arts given the contents of the present disclosure will readily appreciate that the foregoing example is purely illustrative; various implementations of the foregoing may be modified to adjust a variety of parameters to more or less aggressively mine POW without the risk of suffering undesirable consequences (e.g., higher BER, higher clock rates, and/or lower cost components).

Non-Validated Processing Module Architectures—

As noted above, conventional wisdom has held that mining with unreliable memory is not desirable, however, some level of invalid POW may be tolerable and/or even preferable. Accordingly, in the exemplary embodiment of FIG. 5, another memory architecture 500 is disclosed which is configured to search for proof-of-work (POW) with e.g., the aforementioned Ethash algorithm, in a manner that does not reject invalid solutions (i.e., no validation is performed). As such, no "filter" for invalid solutions is applied at the output of the processing module 314.

Figure 5:
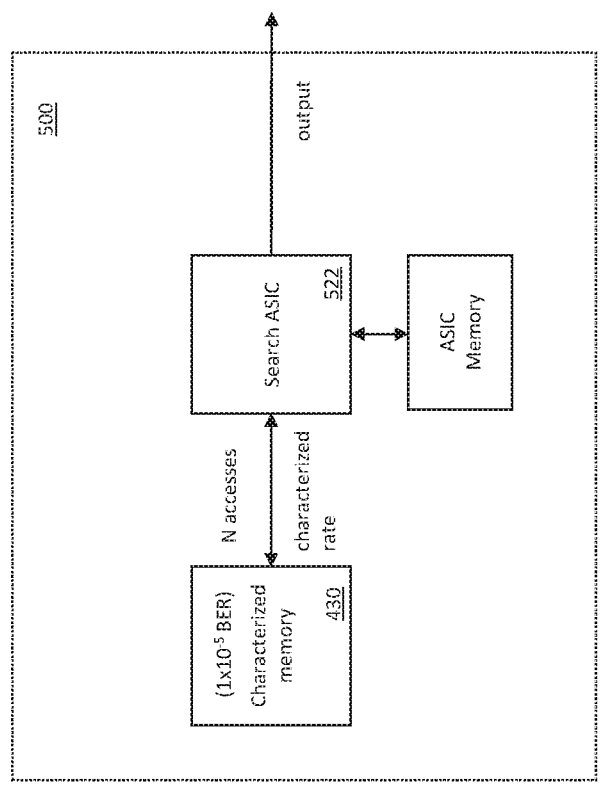
FIG. 5 is a functional block diagram of a second exemplary embodiment of a search apparatus configured to search for proof-of-work (POW) using a blockchain-based search algorithm (without a validation stage) using one or more ASICs, according to the present disclosure.

As shown, the architecture 500 of FIG. 5 includes a characterized memory 430 and a search ASIC 522. As before, the characterized memory 430 stores an Ethash specific directed acyclic graph (DAG). Here, the ASIC(s) is/are used in place of the general purpose processor 422 of FIG. 4 so as to further optimize the search algorithms and reduce appliance power consumption, although it will be appreciated that the general purpose processor 422 of FIG. 4 can be used within the architecture 500 of FIG. 5 if desired.

It will also be appreciated that other processing stages may be applied at the output of the non-validated module architecture 500; e.g., other types of post-processing or filtration may be used, if desired.

Parallelized Characterized Memory Module Architectures—

As discussed supra, Ethash validation is highly asymmetric in that a solution is difficult to find, but relatively easy to verify. Additionally, the nonce selection for Ethash is designed to allow any number of miners to search for solutions in parallel (e.g., each miner randomly selects a nonce). Thus, as shown in FIG. 6A, the present disclosure also envisions processing module architectures 600 that can be used to heavily parallelize characterized memory searching.

Figure 6A:
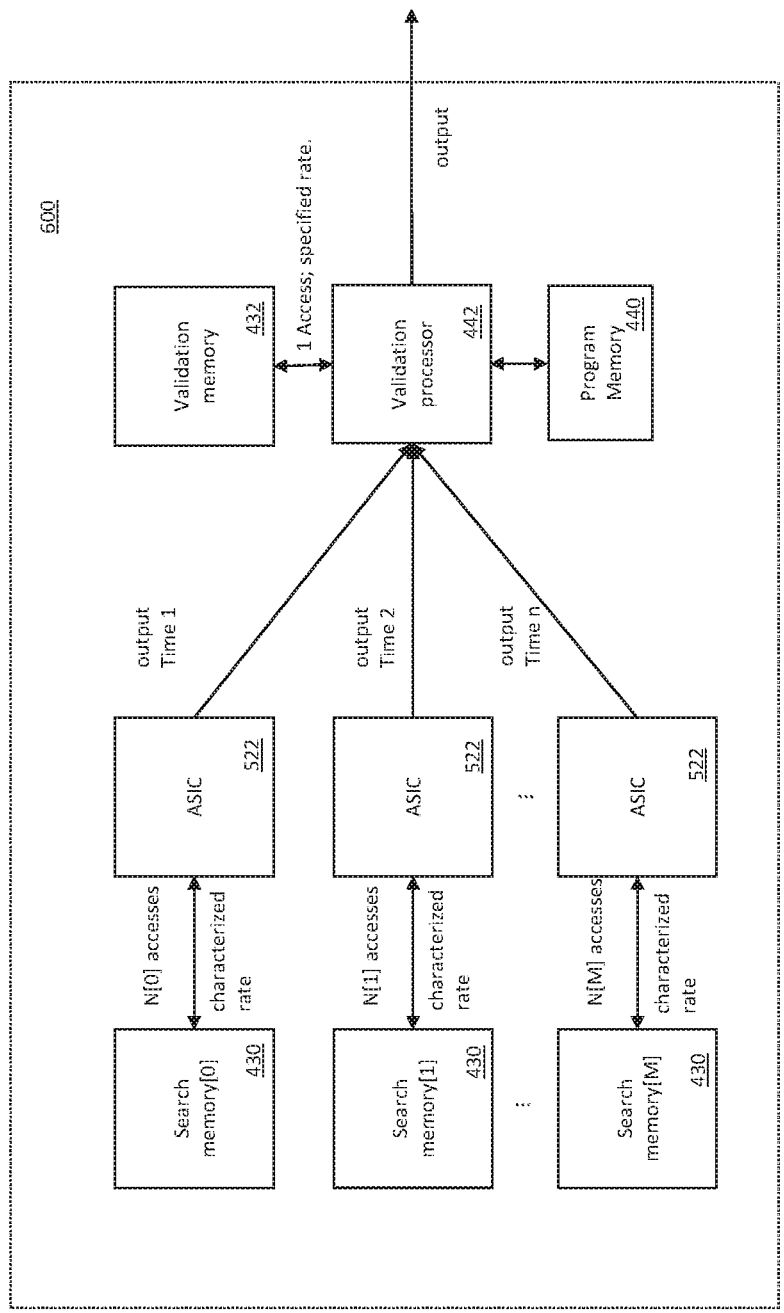
FIG. 6A is a functional block diagram of a first exemplary embodiment of a parallelized search apparatus configured to search for proof-of-work (POW) using a blockchain-based search algorithm and validation stage, according to the present disclosure.

As shown in FIG. 6A, the parallelized module architecture 600 includes at least one validation processor/controller apparatus 422, which is in data communication with both (i) one or more validation memory 432 and (ii) one or more searching ASIC apparatus 522. The searching ASIC apparatus can perform a memory search or hash algorithm utilizing a plurality of search memory (characterized memories 430). As with the architectures described above, each of validation processor/controller apparatus 422 and searching ASICs 522 can be any one of an application-specific integrated circuit (ASIC) central processing unit (CPU), field-programmable gate array (FPGA), or graphics processing unit (GPU), or yet other types of devices, depending on the particular needs of the application. ASICs are chosen as the search processors in the architecture 600 of FIG. 6 for reasons of search algorithm performance and efficiency, but one or more other factors may dictate alternative or complementary configurations.

With respect to an exemplary operation utilizing the validated memory apparatus of FIG. 6A, each one of the searching ASICs 522 can execute a memory search algorithm (e.g., Ethash) to find a POW solution within the memory space of their corresponding searching memory 430. When a header/nonce solution is found, the searching ASIC 522 forwards the POW solution to the validation controller apparatus 422. The validation controller apparatus 422 then validates the POW solution against the validation memory 432. If the header/nonce combination is valid, then the valid solution can be broadcast to the network for validation by the peer nodes of the network. If the solution is invalid then the solution can be ignored or utilized in other ways as discussed in more detail further below.

Figure 6B:
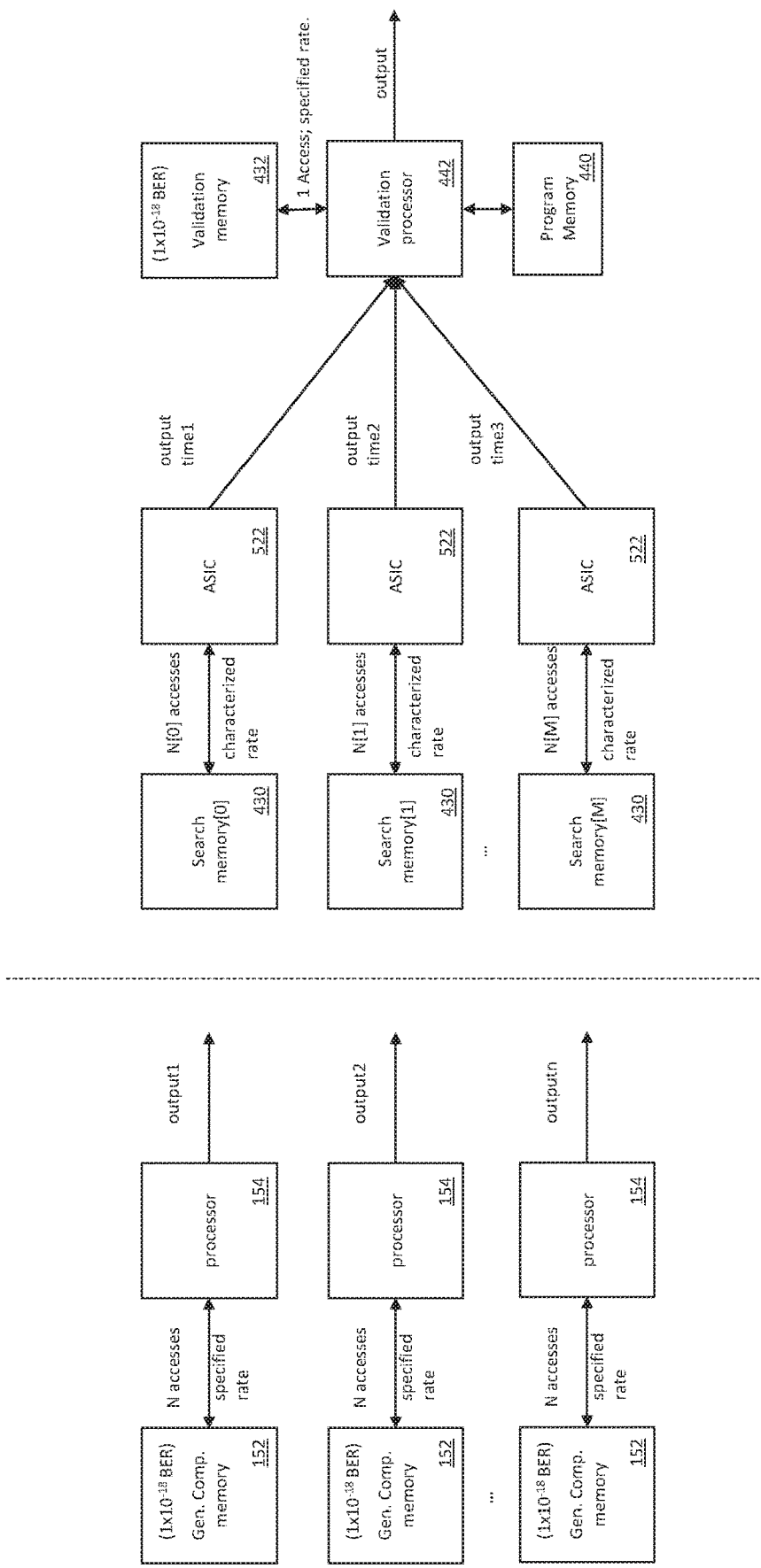
FIG. 6B is a side-by-side comparison of the exemplary embodiment of FIG. 6A and a group of prior art apparatus (such as was described in FIG. 1B).

The asymmetric nature of Ethash allows for massively parallel operation; a single validation controller apparatus 442 can validate results from a large number of searching ASICS/processors 522 (e.g., thousands or tens of thousands of searching apparatus). In particular, empirical evidence shows that the validation process is ~$1 \times 10^{10}$ times faster than generating the POW. FIG. 6B is a side-by-side comparison of the exemplary embodiment of FIG. 6A and a group of prior art apparatus (such as was described in FIG. 1B). As shown in FIG. 6B, the general compute memories 152 must operate at their specified rate to achieve the general compute BER ($1 \times 10^{-18}$); in contrast, the search memories 430 can be overclocked (e.g., a 50% memory bandwidth improvement) according to their characterized rates; the resulting higher BER ($1 \times 10^{-5}$) can be corrected for with a validation memory 432 using its specified rate to achieve the general compute BER ($1 \times 10^{-18}$).

Furthermore, it is noted that this exemplary aspect of the present disclosure (i.e., validation of unreliable search results before the broadcast thereof) is not known from the existing art. Although it is well-known for peer nodes of a network, such as the Ethereum network, to validate solutions broadcast by miners, existing validation mechanisms are focused on the untrusted nature of the actors and assume that faults are malicious. In contrast, the disclosed validation techniques described herein can assume that faults are caused by soft/hard errors of characterized memories that may be unreliable (or operated out of normal operating ranges). More directly, the ASICs/processors 522, 422, 442 of certain exemplary embodiments are not concerned with trust in such applications.

Moreover, other solutions deter one from using characterized memory for the reasons explained elsewhere herein (e.g., wasting resources, and possibly a ban from the network); in fact, existing implementations assume that the results from general compute memories are valid and need not be checked before broadcasting the results to the network. In other words, if the miner is not malicious and assumes that their memory has a low (e.g., effectively zero) error rate, then there is no motivation for the submitter to check their own results before broadcasting them.

In one exemplary embodiment, each of the ASICs/processors and/or memories are capable of isolated operation without other ASICs/processors in the processing system. In one such variant, each search processing entity 422, 522 can independently throttle up or down its memory bandwidth to optimize its performance. For instance, based on a determination that its search memory can have a higher BER, one search processing entity 422/522 can throttle its clock rate up to increase performance and (up to an acceptable BER). In contrast, another search memory that has degraded with use may already have a high BER; therefore, its associated processor would not change its clock rate (or potentially even throttle down). Other independent functionalities may include e.g., maintenance (as described in detail further below), speed reduction, and/or power consumption reduction.

In other embodiments, the search ASICs/processors 422, 522 and validation processors 442 may be dependent on one another for one or more operational modes. For example, a validation processor may centrally track error rates across the entire parallelized memory apparatus and/or trigger memory re-writes of the Ethash DAG when appropriate.

Moreover, there may be external considerations for throttling up/down searching. For example, as previously noted each epoch is only 30,000 blocks. Thus, a miner may want to turn on/off more/less mining appliances or processing modules depending on progress in the current epoch (e.g., it may be preferential to mine harder at the start of the epoch when more solutions are available). In one such variant, an algorithm executing on the appliance host processor (or within a blockchain processing module) makes this determination, and selectively starts up/shuts down the blockchain processing module and/or other appliances modules via a control bus command.

Artisans of ordinary skill in the related arts given the contents of the present disclosure will readily appreciate that the foregoing example is purely illustrative; various implementations of the foregoing may be modified to adjust a variety of different network topologies. While the illustrated embodiment is presented within the context of a single operating entity, other distributed implementations may be suitable where trust is established in other ways (or altogether unnecessary). For example, a community of users that establish trust collectively can mine Ethash. In other cases, a community of users may not care about its miners being malicious (and submitting many invalid header/nonce solutions).

Exemplary Appliance Configurations—

Referring now to FIG. 7A-7E, various particular implementations of the generalized computational appliance of FIG. 3 are shown and described.

Figure 7A:
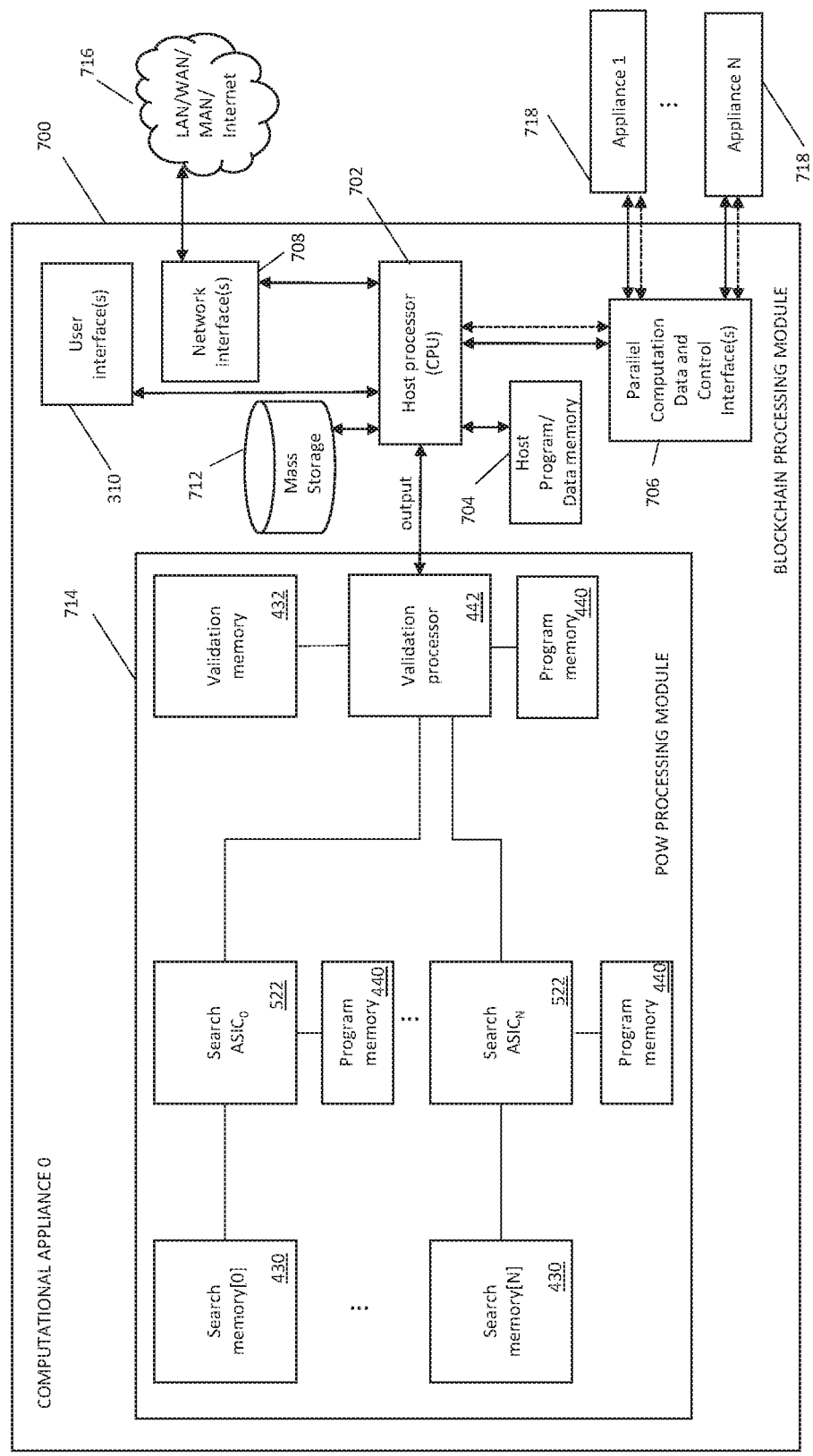
FIG. 7A is a functional block diagram of a first exemplary embodiment of a computational apparatus configured to conduct parallelized searches using characterized memory and where validation is employed, in accordance with the present disclosure.

As illustrated in FIG. 7A, the first embodiment of the appliance 700 includes, inter alia, a host processor/CPU 702, program/data memory 704 supporting the host processor, mass storage 712 (e.g., HDD, SSD, or other), one or more data network interfaces to external LAN/WAN/MAN/Internet(s) 708, a user interface 710 (e.g., capacitive touch screen, speech input, mouse, trackball, touchpad, and/or keyboard).

The appliance also includes a parallel computation data interface 706 such as a PCIe bus interface, USB port, etc. for data communication between the appliance 700 and other such appliances 718 which may be placed in communication with the appliance for purposes of, inter alia, parallel computation such as blockchain searches and/or application programming interface (API) communications discussed in greater detail hereinafter. In the illustrated embodiment, the host processor 702 is configured to execute one or more management algorithms or programs which enable the appliance 700 and any connected other appliances 718 to run in parallel to perform non-duplicative operations, such as blockchain POW searches using different randomized seeds as one example. As previously noted, the appliance 700 may also be in communication with other appliances 718 via the network interface 708.

The appliance 700 of FIG. 7A also includes a blockchain processing module 714; while a single module 714 is shown, it will be appreciated that multiple modules may be used consistent with the present disclosure (e.g., modules 714*a-n* in parallel, not shown). The module(s) 714 in this embodiment include both search logic ("search stage") and validation logic ("validation stage"). The blockchain processing module 714 includes one or more search processing apparatus 522 in the form of customized ASICs having logic optimized for the search algorithms to be performed, as previously described. Also included are one or more "characterized" memory devices 430.

It will be appreciated that while homogeneous search ASICs 522 are shown in FIG. 7A (i.e., each parallel branch of the logic has effectively an identical ASIC), heterogeneous architectures may be used, such as in cases where it is desirous to have the different ASICs (or even ASIC/processor) perform different computations and/or perform the same computation in a different manner. To some degree, the selection of a given ASIC/processor for each search stage "branch" may be driven by the configuration of the respective search (characterized) memory device(s) 430.

The search stage ASICs/processors also have corresponding non-transitory computer readable medium (e.g., program memory devices) 440 that store instructions configured to implement a search on the ASIC/processor.

The validation stage of the processing module 714 of FIG. 7A includes (i) a validation processor 422 and supporting program memory 440, and validation memory 432. The validation stage validates the output of the search stages (i.e., search ASIC 522, supporting program memory 440, and characterized or search memory 430), such as in cases where validation is required (e.g., in support of Ethereum-based searches). The (validated) output of the module 714 is provided to the host 702, which using its management software and protocol stack, distributes and/or stores the output, such as via transmission in a data message over the network interface 708, or to the other connected appliances 708.

Returning again to FIG. 7A, the validation processor 442 may include one or more of a digital signal processor, microprocessor, field-programmable gate array, or plurality of processing components mounted on one or more substrates. The processor 442 may also include an internal cache memory, and is in communication with a memory subsystem, which can include, e.g., SRAM, DRAM, flash and/or SDRAM components. The memory subsystems may implement one or more of DMA type hardware, so as to facilitate data accesses as is well known in the art. While the foregoing discussion is presented in terms of a customized ASIC with optimized processing logic for the algorithms at hand (e.g., Ethash), generic processors may be used in other variants.

In one embodiment, the search memory devices 430 are characterized to provide a range of performances over a range of operating parameters. In some embodiments, the search memories may be memories which suffer from defects (due to fabrication, or refurbishment). In other embodiments, the search memories may be general compute or otherwise qualified memories that are characterized for a range of operating parameters. In some variants, the search memories may be operated out of their prescribed operational parametric ranges; e.g., overclocked and/or operated at higher voltages to increase performance, including operation at higher temperatures as discussed in greater detail elsewhere herein.

In some embodiments, the validation processor 442 utilizes the associated program memory 440 or other storage to temporarily hold a number of data reports or files to monitor and analyze performances of the searching apparatus or ASIC 522. Data stored may relate for example to performance metrics (e.g., error rates, efficiency, etc.) useful to analyze performance, and in one exemplary embodiment, issue a maintenance command to various ones of the searching ASICs to cause, e.g., a system refresh and/or trigger replacement.

In one exemplary embodiment, the host processor 702 (and even the validation processor 442) may be in data communication with an input device via the UI 710, and can be used to receive user input. Common examples of user input may include e.g., changes to operational parameters, replacement notifications, hot-swapping notifications, solution generation parameters, solution notifications, monitoring and/or other analysis.

In some implementations, the exemplary appliance 700 can further be configured with application-specific agents, adapters, packagers, decryptor's/encryptors, or other components configured to process the data of the block such that the data is adapted for presentation or viewing, according to the specific formats if desired. For example, the validation apparatus can use a local adapter to convert, if necessary, the data of the block from its format to a presentation format (e.g., HTML5, Flash, etc.) that is consumable by another miner (or viewable by a human observer).

Figure 7B:
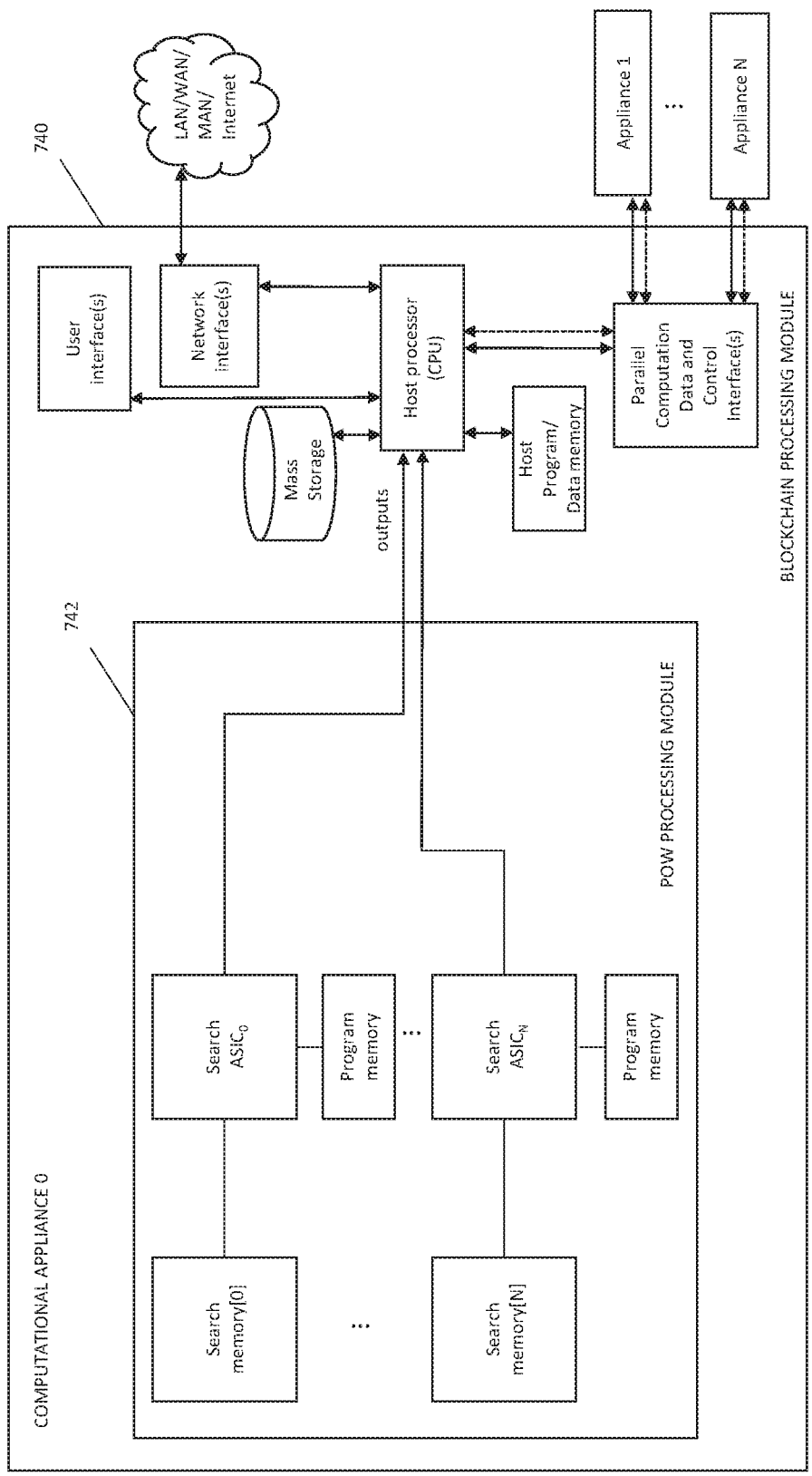
FIG. 7B is a functional block diagram of a second exemplary embodiment of a computational apparatus configured to conduct parallelized searches using characterized memory and where validation is not employed, in accordance with the present disclosure.

FIG. 7B illustrates another embodiment of the computational appliance of the disclosure. In this embodiment, the appliance 740 includes a blockchain processing module 742 with no validation engine or stage. As such, the outputs of the module 742 (shown as a plurality of individual branches 0 through N operating in parallel) are non-validated data which are provided directly to the host processor 702 for further processing/distribution. As described elsewhere herein, certain types of applications are not required to have validation of the search ASIC/processor outputs, and as such this variant of the appliance 740 is useful in such cases.

Figure 7C:
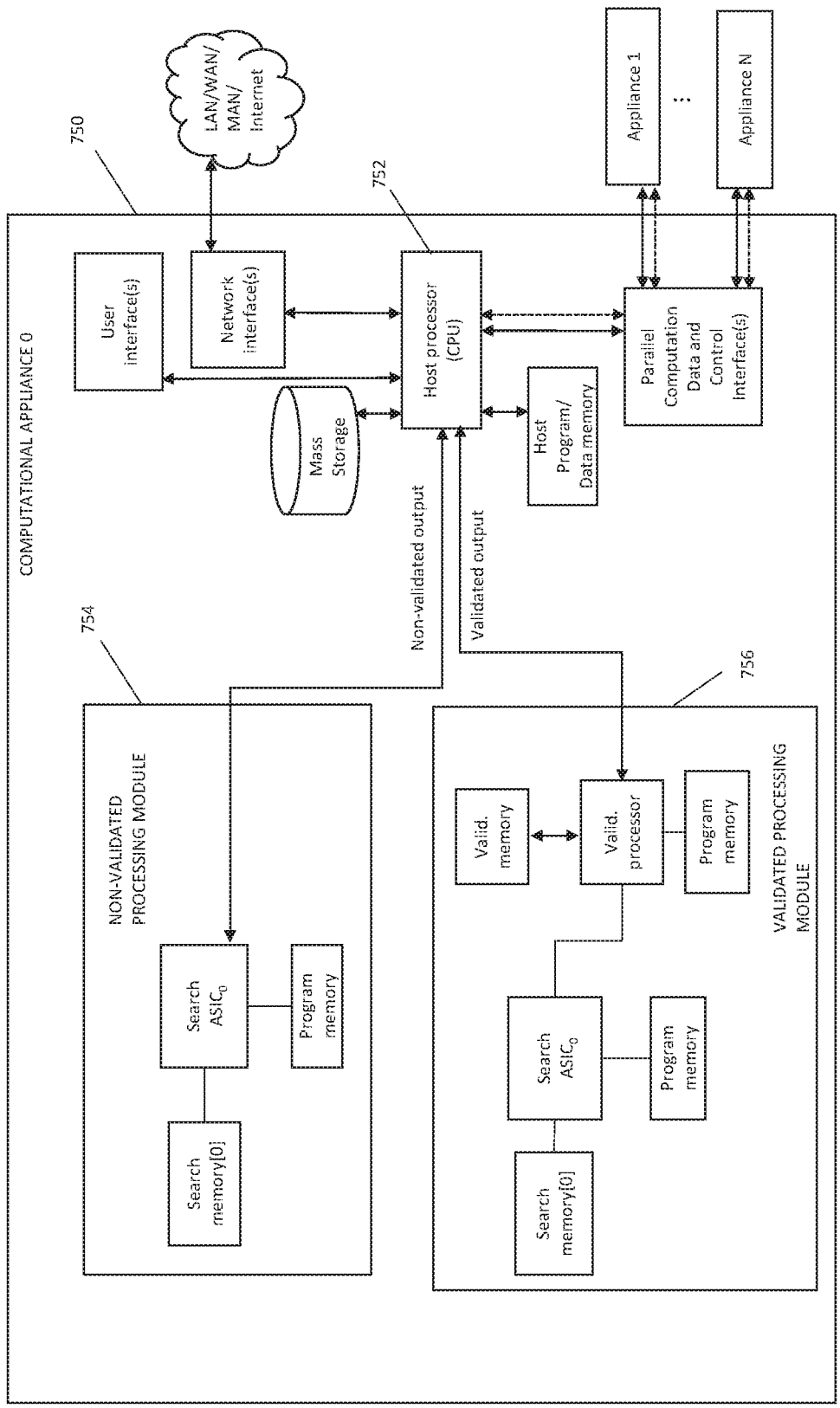
FIG. 7C is a functional block diagram of a third exemplary embodiment of a computational apparatus configured to search using characterized memory, including both non-parallel validated and non-parallel non-validated blockchain modules, in accordance with the present disclosure.

FIG. 7C illustrates another embodiment of the computational appliance of the disclosure. In this embodiment, the appliance 750 includes two blockchain processing modules 754, 756, one with a validation stage, and one with no validation stage. Each module 754, 756 utilizes a single search branch. As such, the respective outputs of the modules 754 and 756 are validated and non-validated data which are provided directly to the host processor 752 for further processing/distribution. The host 752 in this embodiment is configured to selectively utilize the validated/non-validated data from the respective modules based on e.g., application-layer processes running on the host, or as requested by other devices such as the connected appliances.

Figure 7D:
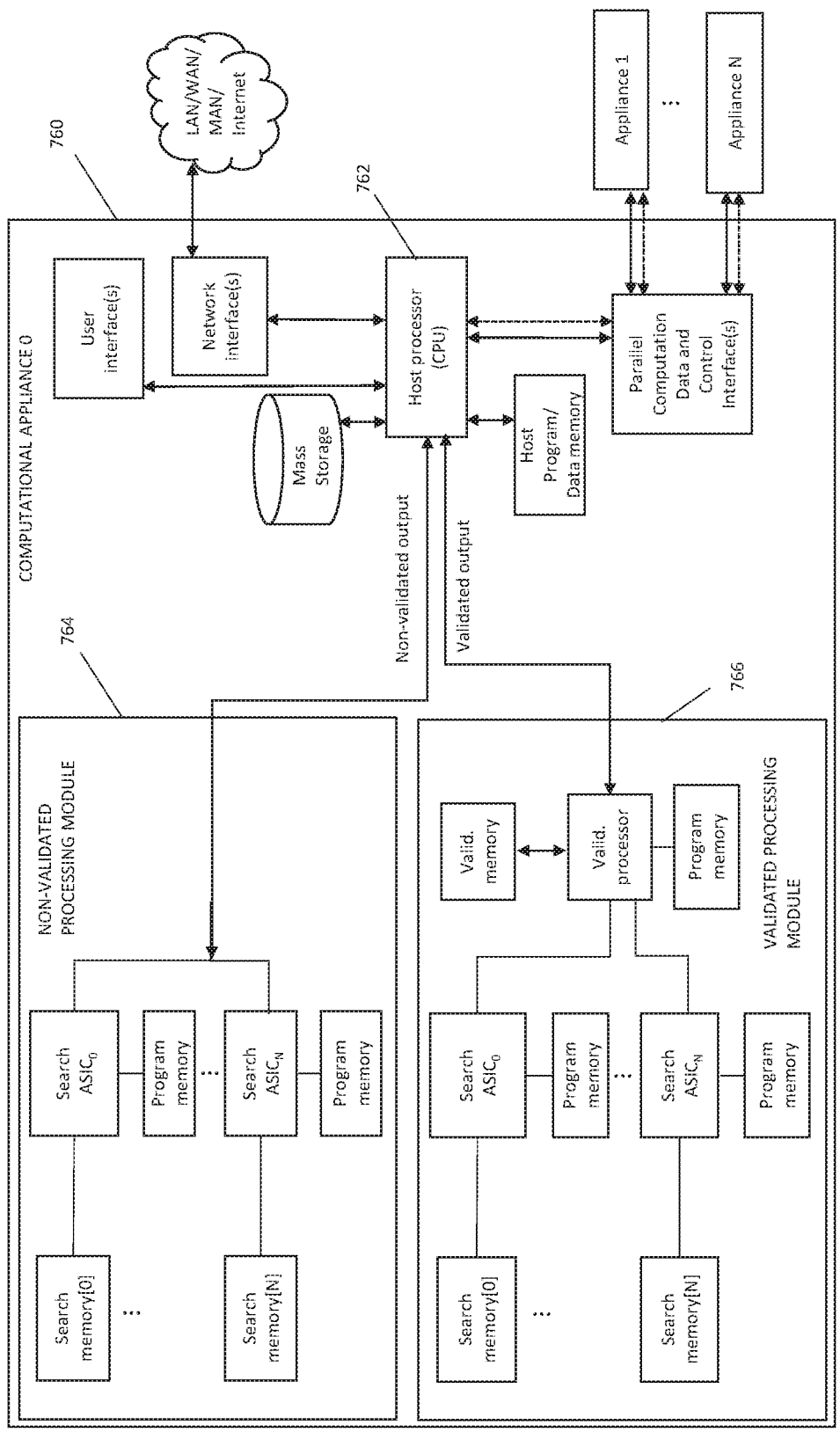
FIG. 7D is a functional block diagram of a fourth exemplary embodiment of a computational apparatus configured to search using characterized memory, including both parallel validated and parallel non-validated blockchain modules, in accordance with the present disclosure.

FIG. 7D illustrates yet another embodiment of the computational appliance of the disclosure. In this embodiment, the appliance 760 includes two blockchain processing modules 764, 766, one with a validation stage, and one with no validation stage, as well as multiple parallel branches of search processing in each module. As with the embodiment of FIG. 7C, the respective outputs of the modules 764 and 766 are validated and non-validated data which are provided directly to the host processor 762 for further processing/distribution. The host 762 in this embodiment is similarly configured to selectively utilize the validated/non-validated data from the respective modules based on e.g., application-layer processes running on the host, or as requested by other devices such as the connected appliances.

Figure 7E:
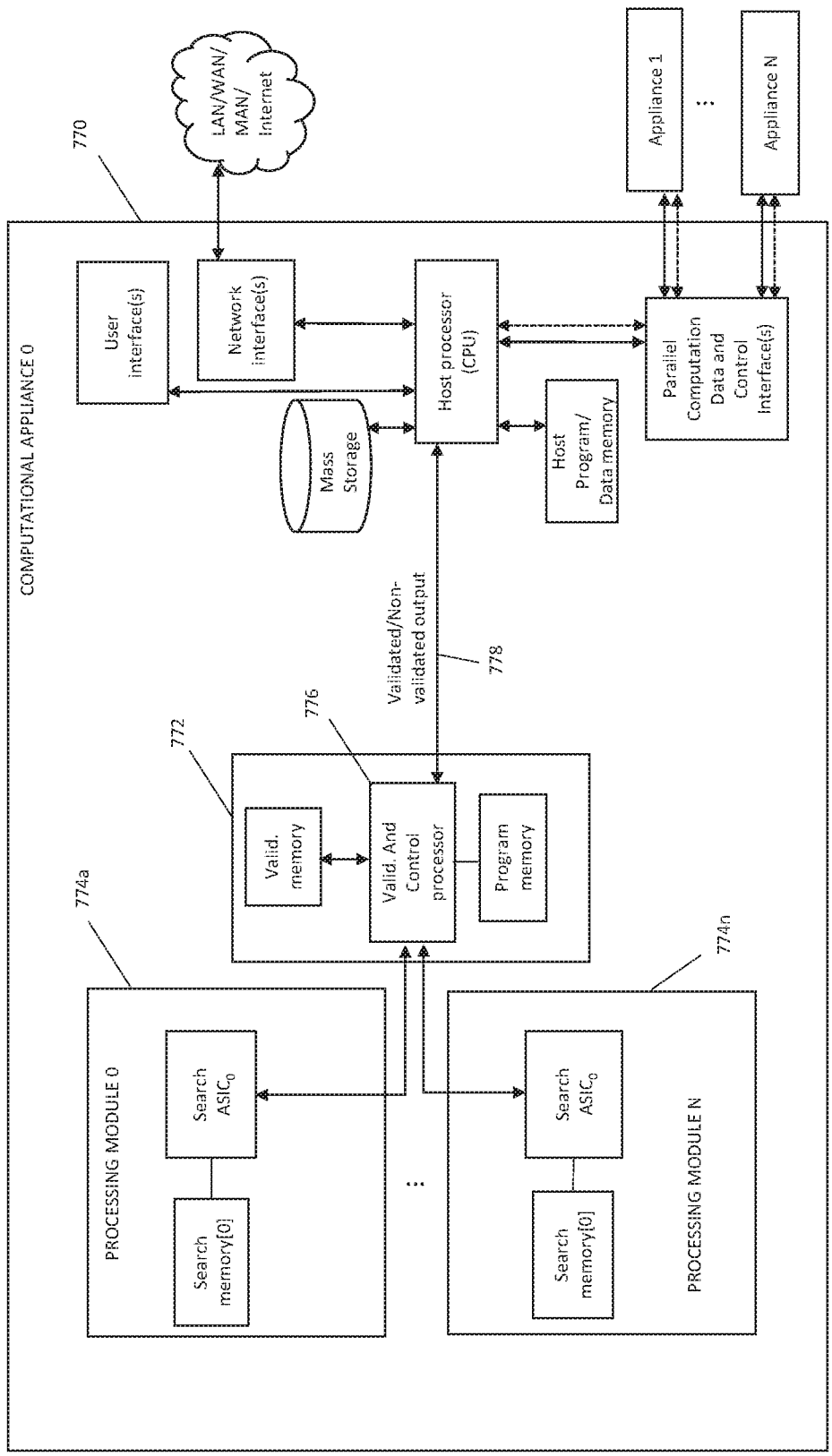
FIG. 7E is a functional block diagram of a fifth exemplary embodiment of a computational apparatus configured to search using characterized memory, including a plurality of homogeneous blockchain processing modules and a validation and control stage, in accordance with the present disclosure.

FIG. 7E illustrates yet a further embodiment of the computational appliance of the disclosure. In this embodiment, the appliance 770 includes multiple non-validated blockchain processing modules 774a-n, as well as a validation and control stage 772 at the output of the modules, including a validation and control processor (VCP) 776. The respective outputs of the modules 774a-n may be, at the discretion of the VCP 776, be validated or not, the validated and non-validated data 778 being provided selectively to the host processor 772 for further processing/distribution. The host 762 in this embodiment is similarly configured to selectively utilize the validated/non-validated data from the validation module 772 based on e.g., application-layer processes running on the host, or as requested by other devices such as the connected appliances 708. Moreover the host 772 can cause the VCP to configure or utilize the outputs from the individual modules 774*a-n* in a particular fashion, as well as causing configuration/control of the module components themselves (e.g., search memories 430 or the search ASICs 522).

Distributed Blockchain Systems—

Figure 8A:
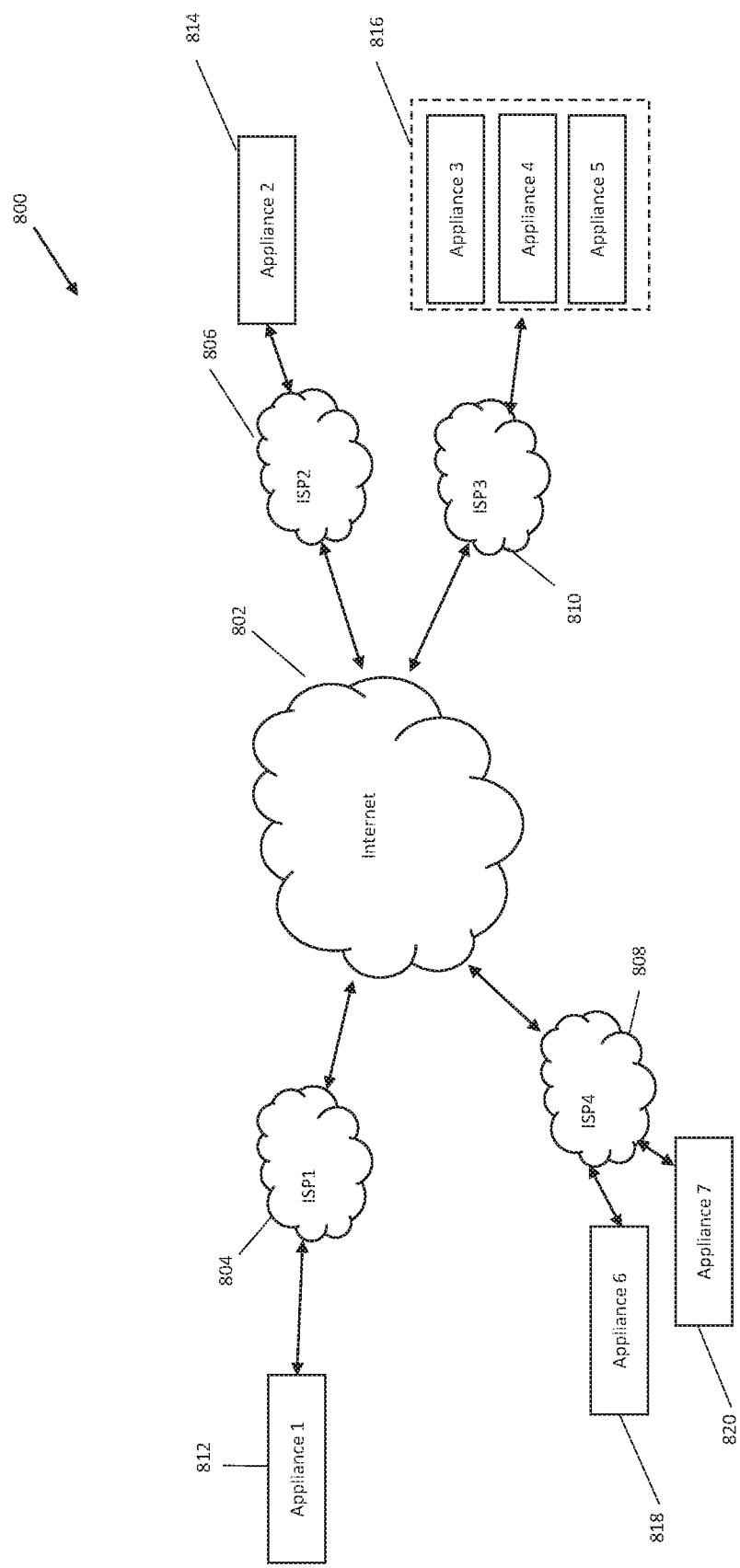
FIGS. 8A-8C illustrate a typical network architecture (FIG. 8A) and POW and consensus transaction (FIGS. 8B and 8C), useful in conjunction with various aspects of the present disclosure.
Figure 8B:
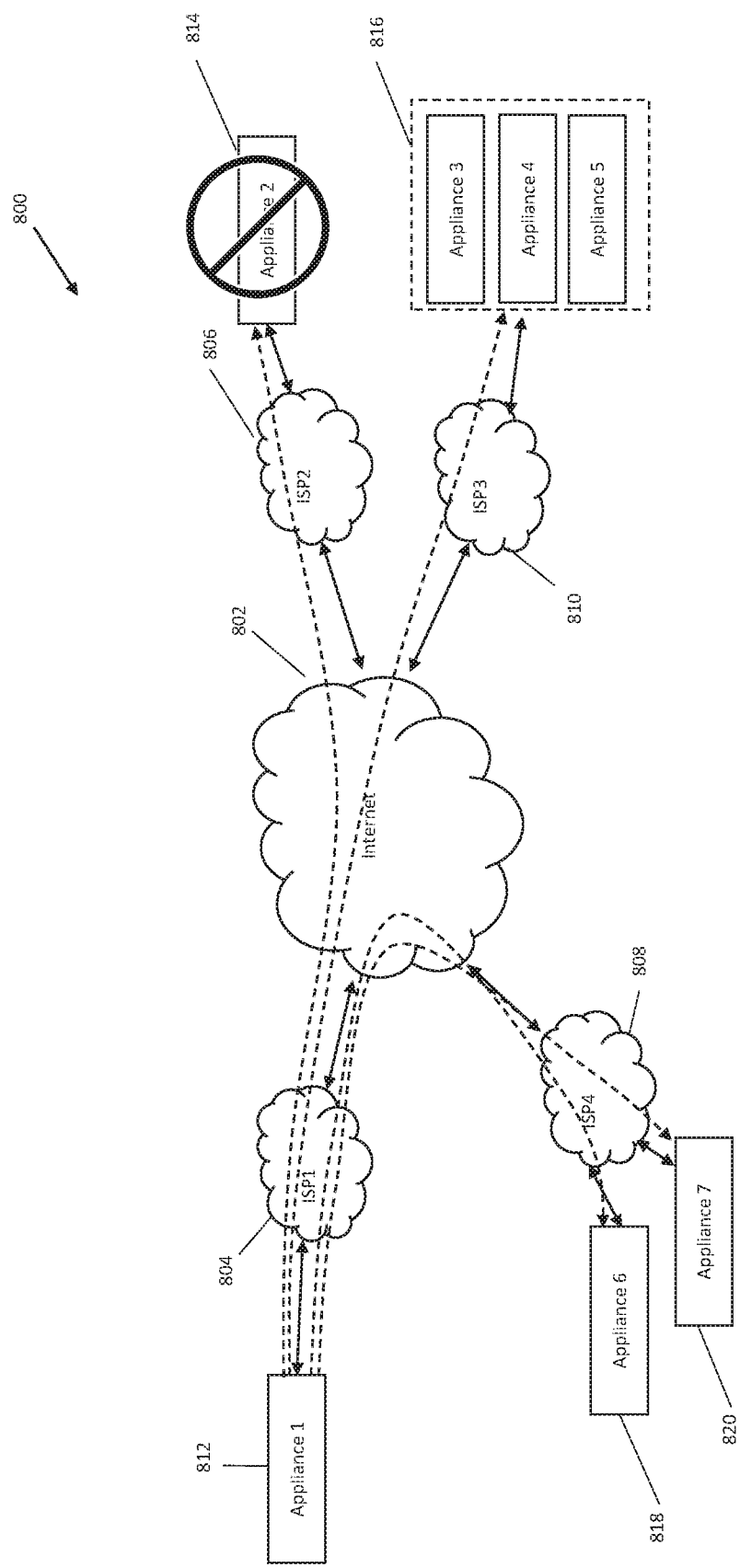

FIGS. 8A and 8B illustrate a typical network architecture (FIG. 8A) and POW consensus transaction (FIG. 8B) useful in combination with the aforementioned blockchain ledger appliances. As shown in FIG. 8A, the network architecture 800 includes a centralized network (e.g., internetwork such as the Internet) 802, and a plurality of access networks such as ISPs (Internet Service Providers) 804, 806, 808, 810 serving a plurality of different end-user or miner appliances 812, 814, 816, 818, 820. In some cases, the end users/miners are individual appliances served by their own ISPs (e.g., Appliance 1 812 via ISP1 804), or perhaps multiple individual appliances served by a common ISP (e.g., Appliance 6 818, Appliance 7 820 via ISP4 808), or an appliance aggregator (e.g., a mining collective or "farm") served by a ISP (e.g., farm 816, ISP3 810).

In FIG. 8B, Appliance 1 812 broadcasts a POW it has generated, by for example, transmitting its solution onto the broader network of miners/appliances, including to the Appliance 2 814. As shown by the dotted arrows, this transmission to other miners traverses the ISPs and is independently verified by each appliance. In the illustrated example, Appliance 2 814 does not verify the POW (either due to a component failure or malicious activity), however all the other appliances can verify the POW; this results in "consensus" (e.g., more than 50% of the appliances have validated the block) and so the proposed POW can be added to the blockchain. It should be specifically pointed out that verification times for a proposed POW are much faster than generating a POW (on the order of $1 \times 10^{-10}$ times faster). Additionally, verifying a proposed block need not occur simultaneously nor is any appliance treated differently than the others; the block is only added to the blockchain when consensus (e.g., simple majority) is reached.

Figure 8C:
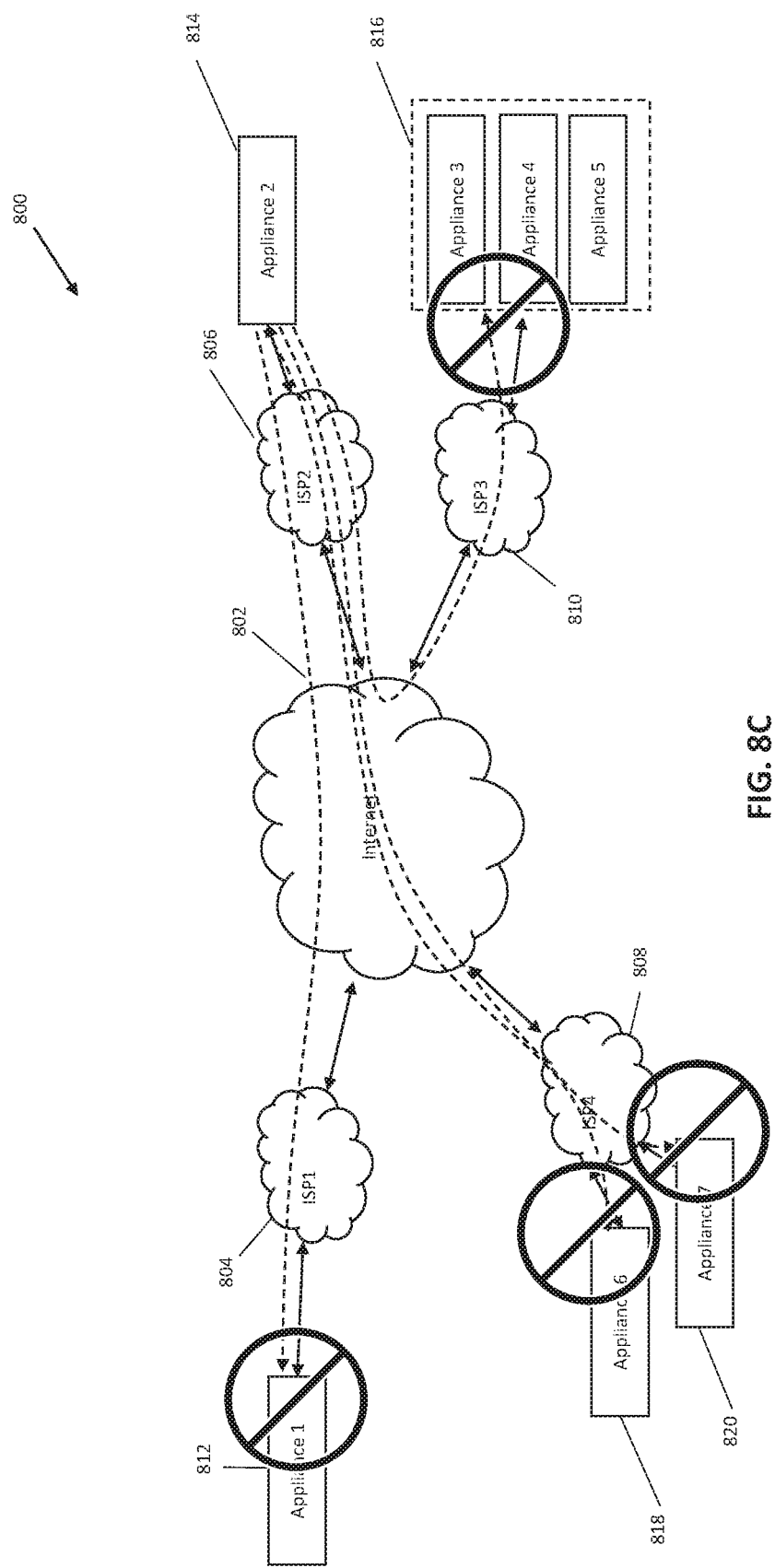

In FIG. 8C, Appliance 2 814 broadcasts a malicious (or faulty) POW it has generated. As shown by the dotted arrows, this transmission to other miners traverses the ISPs and is independently verified by each appliance. In the illustrated example, each of the other appliances does not verify the POW thus the proposed POW is not added to the blockchain. As is illustrated in FIG. 8C (and was previously described), attacking the blockchain requires the malicious attacker to control more than 50% of the nodes; this is considered infeasible for any reasonably sized community.

While the foregoing discussion has been directed to the use of blockchains within cryptocurrencies, artisans of ordinary skill in the related arts will readily appreciate, given this disclosure, that blockchain-based data structures may be useful in any scenario where many untrusted peer devices (e.g., appliances) trust a common shared ledger of transactions. More directly, by providing memory hard POW techniques that can be implemented within a wide variety of characterized memory devices (e.g., at low cost or no cost), the various appliances and techniques described herein may enable an entirely new ecosystem of trusted device-to-device transactions. For example, the blockchain appliance technology described above may be readily used in any fog-based wireless network (e.g., where many devices at the edge of the network directly communicate with one another without the benefit of a centralized network entity per se) or other "mesh" type networks including the Internet-of-Things (IoT).

FIG. 9A illustrates one embodiment of future "fog" network architectures (such as is contemplated within e.g., 3GPP 5G networks). Fog networks enable many devices to communicate directly with one another at the edge of the network, without requiring a core network 902 to traverse the broader internet 904. Fog networks may be loosely organized, and some devices may be part of multiple fog networks (e.g., Appliance 2 912). As shown in FIG. 9A, three fog networks service a number of appliances (e.g., Fog Network 1 includes Appliance 1 910, Appliance 2 912; Fog Network 2 includes Appliance 2 912, Appliance 3 914; and Fog Network 3 includes Appliance 4 916, Appliance 5 918). The fog networks are connected to a core network 902 and can reach the internet 904 if needed. Additionally, other peers may be located in traditional networks (e.g., Appliance 6 920 and Appliance 7 922 are serviced via traditional ISP 906).

The ultra high-throughput, low-latency, edge-based architecture 900 leverages fog network capability and allows for, inter alia, inter-fog communication and intra-fog communication (as opposed to only "edge-to-ISP-to-core-to-ISP-to-edge"). For instance, as shown in FIG. 9B, Appliance 1 910 can submit a proposed block to appliances in its own fog (e.g., Appliance 2 912) completely via the fog radio access network (RAN) 1 (i.e., without accessing the core network 902). Moreover, appliances may forward the proposed blocks to other appliances that it sees (e.g., Appliance 2 912 can forward to Appliance 3 914). Additionally, the broadcast may be picked up by other unconnected fog networks and propagated throughout (e.g., Appliance 4 916 can receive the broadcast and forward to Appliance 5 918) as well as legacy networks (e.g., via the ISP 906). Notably, fog networks greatly reduce the burden of the core network and the internet by introducing a plethora of direct device-to-device (D2D) transmissions.

More generally however, it should be emphasized that the proof-of-work (POW) and associated overhead for blockchain data structures may be less efficient than other database and/or accounting data schemes among trusted entities; however, blockchain technologies are primarily useful to reduce counterparty risk in untrusted situations (e.g., that the other party to the transaction would deny a transaction). Incipient research in 5G is directed to the use of ad hoc and fog based computing; under such circumstances there may be many situations where counterparty risk is unavoidable.

For example, as shown in FIG. 9C, temporary ad hoc network 930 is formed from Appliance 8 932, Appliance 9 934, and Appliance 10 936. The ad hoc network 930 may be formed responsive to e.g., a discovery procedure and/or random access procedure. For example, Appliance 8 932, Appliance 9 934, and Appliance 10 936 may discover one another based on beacon signaling, out-of-band communication, and/or user coordination. Under such circumstances, the ad hoc network does not have access to a commonly trusted database 938. Moreover, none of the appliances can trust the other appliances. However, the appliances can create and/or use a blockchain ledger to secure transactions between one another. Thereafter, the transactions can be settled with a conventional database 938 over traditionally trusted communications when enough of the community has re-established connectivity (via the fog network 940 of FIG. 9D). Notably, as expressly shown in FIG. 9D, only a simple majority of the community needs to re-establish communications; the temporary blockchain ledger will include the transactions for Appliance 10 936 (even though Appliance 10 936 cannot reach the database 938).

In some embodiments, the appliances validating and searching apparatuses/memories described herein can support trusted localized (versus centralized) data transactions and can enable communications to devices in close proximity via the FOG RANs shown in FIGS. 9A-9D. In some variants, this can be used to enable rapid transactions in dense geographical distributions (e.g., rather than bottlenecking through a small centralized group of miners). In other variants, this can be used to enable secure transactions even where no party trusts other parties.

Yet further, edge based communication such as that supported by the architecture FIGS. 9A-9D can reduce latency and reliance on network backhaul bandwidth to achieve better quality of service (QoS), and/or edge analytics/stream mining. The foregoing features improve the user-experience directly and can also indirectly provide redundancy in case of failure.

While blockchains are primarily used in the context of cryptocurrencies, nothing in the technology is specifically limited to cryptocurrencies or financial transactions. More directly, blockchain ledgering can be used to check-in and/or check-out any form of digital asset. More generally, blockchain ledgering is useful in imposing conservation properties on digital assets in the virtual domain. Potential applications for the blockchain ledgering devices described herein are wide ranging and may encompass e.g., memory sharing, processor sharing, content sharing, and/or other forms of resource sharing.

Exemplary Application Programming Interface (API)—

As a brief aside, blockchain technologies trade off scalability, immutability, and security; any blockchain technology can only provide two of the foregoing three qualities. For example, Bitcoin is designed to be highly secure and immutable because transactions are focused on a limited pool of scarce resources (Bitcoin can securely add new blocks, and the blocks cannot be changed once added). As a result Bitcoin has significant limitations on scalability (the Bitcoin consensus requirement becomes exponentially more difficult as more miners join the community.) In the context of Bitcoin, security and immutability are "features" of the cryptocurrency that incentivize and reward speculation and hoarding. However, blockchains are not a "one-size-fits-all" technology; in fact, blockchain ledgering can be tailored for systems which require more or less e.g., security, scalability, and/or immutability.

For example, attempts have been made to "bolt-on" sidechains to existing cryptocurrencies so as to offset the limitations of the primary blockchain. A sidechain allows a subset of miners to internally perform consensus for their tokens within the sidechain (rather than across the entire community). In other words, the sidechain allows a set of miners to speed up consensus (scalability) by giving up some level of security (the subset of miners in the sidechain is easier to compromise than the entire community).

More generally however, some aspects of the present disclosure are directed to the creation of insecure (less secure), limited-use (less scalable), and/or temporary (less immutable) blockchains for use with a distributed blockchain ledger appliances. As previously noted, the ledger apparatus described above includes an interface to negotiate and initialize a blockchain with other ledger apparatus. In one such implementation, the blockchain ledger apparatus can negotiate ledger parameters associated with scalability, immutability, and/or security and a proof-of-work (POW) seed. Common examples of such parameters may be for example, the number of community users, whether new members may be added to the community or removed, the expected lifetime of the ledger, whether transactions should be public or private, the amount of complexity and/or latency acceptable for checking in and checking out records, the complexity of proof-of-work (POW), the speed of transactions, and/or any number of other ledger based parameters.

In one exemplary embodiment, the blockchain API allows a user (or community of users) to define the appropriate parameters and POW schema to generate a new blockchain ledger and ruleset. In some cases, the blockchain API may also communicate such parameters to new participants after the blockchain has been created. In this way, newly generated blockchain ledger can be used by the members for a variety of different customized applications.

For example, in one such implementation, the appliances may limit scalability by limiting (or not limiting) the number of miners in the community. In some cases, the blockchain ledger should be publicly distributed. In other cases, the blockchain ledger need not be, or should not be, publicly distributed. In other examples, the ledger may contain sensitive information. Similarly, the appliances may agree to the level of security that is required or not required; for example, lower levels of security may acceptable or may even be offset by external factors (external authentication, etc.). Additionally, the blockchain may or may not be mutable. For example, it may be easier or harder for a blockchain to be changed. For example, the cost of changing a block (e.g., how strong the POW is) may be adjusted.

In one embodiment, a blockchain application programming interface (API) provided with the ledger appliance enables the creation and/or sharing of a proof-of-work (POW) schema based on the parameters. The POW schema can be used to generate a memory hard (or processor hard) POW problem. For example, within the context of memory hard POW, the POW schema may be an algorithm and/or parameters necessary to generate a directed acyclic graph (DAG) memory search. Common examples of such parameters may include e.g., difficulty, nonce, seed, solution size, solution space, epoch length, etc. Similarly, for a processor hard POW, the POW schema may be a hash function and/or parameters associated therewith.

In some cases, the POW schema may be dynamically adjusted over time. For example, the validity time for the DAG memory may be dynamically adjusted to create e.g., long or short epochs. In some variants, the blockchain API may determine the POW schema based on other parameters of the blockchain. For example, longer or shorter epochs may have consequences with regard to security and/or scalability.

In some cases, small scale blockchain ledgers may not have a sufficient population of miners "racing" to find proof-of-work. As previously noted, the "race" competition ensures that entropy for the community accumulates faster than can be feasibly attacked by a single miner. Small blockchain communities may not be able to guard against external attackers (who may have access to much larger compute resources), consequently in some variants the blockchain ledgering API may further include timer expirations. For example, rather than limiting the number blocks found per epoch, an epoch may be changed frequently enough to thwart attacks. In other words, an epoch can change faster than an external attacker can mine enough proof-of-work (POW) to attack the blockchain.

More generally, artisans of ordinary skill in the related arts will readily appreciate that the availability of a generalized (implementation independent) application programming interface (API) in conjunction with inexpensive blockchain ledger equipment can be used to greatly improve the proliferation, ease of use, and accessibility of blockchain technology. In some cases, this may enable localized and/or specialized blockchain ledgers to securely, scalably, and/or immutably record e.g., low cost, or no-cost (barter) transactions.

Artisans of ordinary skill in the related arts given the contents of the present disclosure will readily appreciate that the foregoing example is purely illustrative; the various techniques described herein may find broad applicability in any applications for memory hard blockchain data structures.

Moreover, it will be appreciated that the present disclosure contemplates varying embodiments structured based on, inter alia, the need for synchronicity (i.e., the ordering of events), and/or the expected temporal duration of the mechanism. As a brief aside, different blockchains will have different needs. The purpose of one exemplary type of blockchain is to create a synchronous system (i.e., one allowing for ordering of events). In certain contexts such as a social media network, the exact order of events often is not critical. In contrast, in a financial context, ordering typically is critical. Hence, the present disclosure contemplates blockchains that may be short in duration (e.g., transient or more ethereal), as well as those which may be long running or perpetual, and anywhere in-between. As described above, each may utilize different security, scalability, and immutability requirements.

Methods for Inexpensive Memory Searches—

FIG. 10 is a logical flow diagram of one generalized method 1000 for creating and/or agreeing to use a distributed ledger, such as that described in the various embodiments of the computational appliance described herein. In one exemplary embodiment, a community of computational appliances can negotiate and/or define parameters for a proof-of-work (POW) schema via an application programming interface (API).

At step 1002 of the method 1000, one or more proof-of-work (POW) parameters are determined. As previously noted, proof-of-work (POW) is a virtual representation of physical entropy; in this manner POW introduces physical conservation laws into the virtual domain. More directly, a blockchain represents the accumulation of entropy. By logical extension, the POW generation for a blockchain dictates its growth rate of entropy (and by extension: security, scalability, and/or immutability). Various aspects of the present disclosure parameterize the various factors which may affect and/or require the characteristic entropy growth rate of a blockchain.

Common examples of parameters may include a minimum security, a minimum scalability, and/or a maximum mutability. Such parameters may include e.g., difficulty, nonce, seed, solution size, solution space, epoch length, etc. In one exemplary embodiment, an API may enable a community of ledgering appliances to agree upon e.g., difficulty (solution size, solution space, epoch length) and a randomized seed. Thereafter the ledgering appliances may each individually generate a corresponding DAG based on the commonly agreed upon parameters.

Security parameters may be based on the sensitivity of the data. Common examples of sensitive data include e.g., financial transactions, tangible or intangible property, personal data, identifying data and/or other such information. Common examples of insensitive data include e.g., advertisements, time specific data, location specific data, etc. For example a blockchain ledger that is to be used to track medical records may have significantly higher security requirements than a blockchain ledger used to record the number of advertisements that a user has seen.

In other examples, scalability parameters may be based on the number of ledgers either in the community or expected to join the community, the length of use, technological limitations, transaction latency, transaction throughput, and/or other use considerations. For example, a blockchain ledger that is to be used for a long time for rapid transactions among a public community may be relatively scalable so as to accommodate new participants, whereas a blockchain ledger that is used to track transactions privately among a closed group need not be as scalable.

In still other examples, immutability parameters may be based on e.g., consequences of failure, likelihood of error, likelihood of mistake, known authorities, trust among ledgers, etc. For example, a blockchain ledger that is to be used to collect data having a strong likelihood of mistake and/or fraud may be penalized and/or enforced by a chain authority; under such a situation, the chain authority may be empowered to change various blocks of the blockchain to remedy a fraud.

Artisans of ordinary skill in the related arts will readily appreciate that the foregoing parameters are purely illustrative, and that other such parameters may be substituted with equivalent success given the contents of the present disclosure. Moreover, while the present disclosure is primarily directed to proof-of-work (POW), other techniques may be substituted with equivalent success. Common examples include proof-of-stake algorithm (e.g., where conservation is imposed by ownership of tokens), proof-of-authority (e.g., where conservation is inferred from authority), proof-of-space (e.g., where conservation requires memory), proof-of-bandwidth (e.g., where conservation requires bandwidth), etc.) More generally, artisans of ordinary skill in the related arts will readily appreciate that the laws of physical conservation can be imposed by imposing any number of practical limitations on operation.

In one exemplary embodiment, one or more appliances determines the one or more proof-of-work (POW) parameters. In other embodiments, an appliance receives the POW parameters from another ledger appliance or a community of ledger appliances. In still other embodiments, an appliance receives the POW parameters via an out-of-band interface (e.g., received from a trusted entity). For example, a small community of appliances may use parameters previously received from a mutually trusted core network entity. In still other embodiments, the ledger appliance may receive POW parameters from a party and/or counterparty to a transaction. In some cases a default set of parameters is used.

In variants where a community of ledger appliances determines the POW parameters, the POW parameters may be mutually agreed upon based on a common application. In other cases, the POW parameters may be negotiated according to a prioritization (or de-prioritization) scheme. In some cases, negotiation may occur dynamically. For example, a small community of appliances may use a dynamically determined short term blockchain only during ad hoc networking. In some cases, the prioritization (or de-prioritization) may include a transfer of various costs and benefits for each of the community participants; an overall scheme which best accommodates the community is selected. For example, all appliances may agree on a minimum amount of security but vary as to e.g., immutability or scalability. Under such a scenario, the appliances may fairly settle on an acceptable fit by balancing the costs and benefits for immutability and scalability in equal measures. In another such scenario, certain appliances may have a larger (or smaller) representation in determining immutability and scalability.

In some embodiments, ledger appliances may negotiate parameters to e.g., to create "forks" or "sidechains". For example a community of ledger appliances may split into two or more blockchains. In some cases, the main blockchain may permanently "fork" into two distinct blockchains which are independent and will not be subsequently rejoined. In other cases, the main blockchain may spawn a sidechain. A "sidechain" uses a so-called "two-way peg" that locks tokens of the main blockchain to create tokens in the sidechain, the sidechain can thereafter transact its sidechain tokens without affecting the main blockchain. Later, the sidechain tokens can be converted back to the main blockchain by locking the sidechain tokens and unlocking the main blockchain tokens. A security protocol ensures that the main blockchain and sidechain tokens cannot be concurrently active. Forking and/or generating sidechains can be used by a community of ledger appliances to dynamically adjust various aspects of ledger operation. More directly, a community of ledger appliances can dynamically agree to augment a ledger that is secure and scalable but not immutable, with a sidechain to provide immutability (at the cost of either security or scalability).

At step 1004 of the method 1000, a proof-of-work (POW) schema is determined. As used herein, the term "schema" refers to a common plan or procedure that may be implemented by each individual ledger appliance.

In one exemplary embodiment, the ledger appliance has a base schema that is modified according to the determined parameters of step 1002 so as to be more or less, scalable, secure, and/or immutable. In other embodiments, the ledger appliances may coordinate, propose, or otherwise agree to use a particular schema. For example, the ledger appliances may have a set of memory hard schemas, a set of processor hard schemas, and/or a set of network hard schemas. In some cases, the ledger appliances may additionally transact various parameters to select a base schema. For example, a mixed community of ledger appliances may have preferences due to differences in hardware.

In one exemplary embodiment, the base schemas may be specify the type of proof-of-work (POW) protocol. For example, POW may be based on a challenge-response protocol (where a challenge is issued by an entity (such a network authority), and the miner must appropriately respond). In another example, POW may be based on a solution-verification protocol (where a problem is selected (usually arbitrarily), and solutions are mined).

The schemas may include public and/or private information. For example, some schemas are based on purely public information, thereby allowing anyone to participate. Other schemas may use private information, thereby ensuring that only a limited set of miners may participate. For example, a private community of ledger appliances may share secret information (such as hardware identifiers, nonces, or other one-time use information) with one another; this information may be transferred only once and thereafter used to generate POW. Only ledger appliances that have all of the shared secret information would be able to participate thereafter.

In some variants, the schemas may attempt to generate proof-of-work (POW) that is useful or non-useful. For example, Bitcoin uses a non-useful proof of work (i.e., the POW is worthless for other applications). Some examples of POW that may be useful are e.g., calculating values that meet certain criteria (e.g., finding prime numbers), locating data in memory, contacting other network entities, etc.

In some embodiments, schema may impose conditions on timeliness. In other embodiments, POW may rely on competitive mining. For example, a memory search of a generated directed acyclic graph (DAG) may be regenerated after a threshold number of solutions have been mined. In other examples, a DAG may be regenerated after a time interval. In still other examples, a DAG may be regenerated based on e.g., negotiated agreement.

In one exemplary embodiment, the POW is a memory hard search through a data set. For example, the POW may be a memory search of a generated directed acyclic graph (DAG). Depending on the size of the memory search and the search space, the memory search can be made arbitrarily asymmetric (e.g., hard or easy) relative to the verification (e.g., verifying the memory search) In another exemplary embodiment, the POW is a processor hard hashing algorithm against a data set, the processor must calculate hashes using a nonce (number used once) to achieve a minimum value. Depending on the minimum value, the hash may be made arbitrarily asymmetric relative to verification. In another example, the POW may be "network hard" or "network bound"; e.g., the miner must collect a minimum number of tokens issued by other network entities. Network hard tasks can be made arbitrarily asymmetric based on the number of tokens and/or the remoteness of the network entities. More generally, artisans of ordinary skill in the related arts will appreciate that any proof-of-work technique may be made arbitrarily more or less hard, so as to better accommodate POW requirements.

At step 1006 of the method 1000, proof-of-work (POW) is mined according to the POW schema, and at step 1008 of the method 1000, POW is checked.

In one exemplary embodiment, the ledger appliances mine for memory hard POW via characterized memory devices. In one exemplary embodiment, memory device characterization includes a determination of one or more levels of actual or predicted performance over a range of conditions and/or operational parameters. Common metrics for performance include without limitation: bit error rate (BER), bandwidth, correctable/uncorrectable fault ratio, data rate, latency, throughput, and/or any number of other methods to characterize data generated by the memory. Common conditions and/or operational parameters include without limitation: refresh rate, clock rate, cycle time, voltage, temperature, humidity, and/or any other factor that can be adjusted for memory operation.

In one exemplary embodiment, ledger appliances may mine for processor hard POW via characterized processor devices. In one exemplary embodiment, processor device characterization includes a determination of one or more levels of actual or predicted performance over a range of conditions and/or operational parameters. Common metrics for performance include without limitation: compute error rate, bandwidth, data rate, latency, throughput, and/or any number of other methods to characterize data generated by the processor. Common conditions and/or operational parameters include without limitation: refresh rate, clock rate, cycle time, voltage, temperature, humidity, and/or any other factor that can be adjusted for processor operation.

In one exemplary embodiment, the ledger appliances mine for network hard POW via characterized network connections. In one exemplary embodiment, network connectivity characterization includes a determination of one or more levels of actual or predicted performance over a range of network conditions. Common metrics for performance include without limitation: bandwidth, connectivity, quality of service, data rate, throughput, latency, etc. Common conditions and/or operational parameters include without limitation: network bandwidth, weather, temperature, humidity, etc.

In some embodiments, the POW schema is associated with a solution density function. A "solution density function" defines the probability of finding a valid solution for the application within a solution space. For example, a solution density function for POW mining may describe the probability of discovering a solution as a function of BER. In some cases, the solution density function can be used to determine an overall system efficiency i.e., the relative efficiency of characterized memory performance relative to general compute memory performance. More generally, the solution density function and/or system efficiency curve may be used to select a desired output for a memory bound applications as a function of one or more memory performance parameters. Moreover, while two dimensional mathematical relationships have been described supra, substantially more complex mathematical functions may incorporate e.g., multiple dimensions, statistical components, systems of equations, non-linear behavior, piecewise modeling, parametric modeling, geometric modeling, differential analysis, and/or any other form of mathematical expression.

In one exemplary embodiment, the solution density function may include analytically or mathematically determined components. For example, within the context of the aforementioned cryptocurrency POW mining, the likelihood of finding valid solutions within the solution space can be mathematically derived based on assumptions as to the e.g., uniformity of search and a probability density. Other applications may assume non-uniform searching, varying probability densities, likelihood as a function of validity/invalidity, and/or any number of other factors. It is further appreciated that solution density functions may change over time. For example, in the context of the aforementioned cryptocurrency POW mining the number of valid solutions which are discovered but which have already been claimed may affect success rates. Thus, some variants may attempt to empirically account for successful results as a historical function of solutions within an epoch (e.g., the likelihood of finding the first solution in the epoch may be high, the likelihood of finding the last unique (30,000th) solution of the epoch may be substantially lower). In some cases, such information may be useful to determine the aggressiveness/conservativeness of characterized memory use (e.g., throttling up or down search speeds based on the epoch progress).

In other embodiments, the solution density function may include empirically determined components. For example, the aforementioned cryptocurrency POW mining behavior may historically vary as a function of cryptocurrency pricing. The population of active miners significantly impacts the rate at which unique solutions are claimed. While human behavior may be difficult to mathematically model, historical data can provide adequate predictions to generate an empirical model of the solution density function. Additionally, many applications are notoriously difficult to mathematically model and/or infeasible to model (e.g., weather, large neural networks, large population simulations, etc.); in such applications, historical data may be used to determine an empirical model of the solution density function, or otherwise inform or modify a base solution density function.

In some embodiments, the solution density function may incorporate commercial interest or business model considerations. Cryptocurrency speculation has been erratic since its inception; at some high points, proof-of-work rewards could be substantial, for example, mining during a cryptocurrency bubble could hypothetically completely offset the cost of e.g., a research and development phase for an experimental memory technology. Similarly, during lulls in prices, the return on cryptocurrency mining may be worthless or even a net loss (when considering alternative revenue streams for memory appliances). Consequently, the solution density function may account for commercial returns or other business considerations. Common examples of such considerations may include: profit/loss, expense/revenue, appreciation/depreciation, contractual requirements, and/or any number of other financial incentives and/or penalties.

Referring back to step 1006, embodiments that mine for memory hard POW via characterized memory devices may use so-called "second-class memory." Second-class memory has BER that are higher than permissible for first class memory (e.g., $1\times10^{-18}$ BER). In one such variant, second-class memory minimally exceeds a floor BER threshold (e.g., $1\times10^{-5}$ BER). In some implementations, the error rate can being caused from defects (for instance, from fabrication issues, experimental technologies, refurbished memory, etc.). In other implementations, the error rate is intentionally induced such as by e.g., overclocking the memory to increase performance.

In the previously described implementations, solution generation is based on memory reads within a search space. In alternative embodiments, solution generation may use memory writes. For example, some applications may use substantial memory bandwidth in a write process, where subsequent accesses only require low bandwidth reads. More generally, the various aspects of the present disclosure may be used in any type of memory access (reads, writes, fusing, processing-in-memory, etc.).

In one embodiment, the characterized rate is selected to achieve a memory performance. For example, in one such implementation, the characterized rate is selected to achieve a bit error rate (BER). Other variants may select a characterized rate to achieve a desired e.g., bandwidth, correctable/uncorrectable fault ratio, data rate, latency, throughput, etc. In alternative embodiments, the characterized rate is selected based on one or more operational considerations.

While the foregoing examples are presented in the context of a characterized rate, any operational parameter or condition may be substituted with equivalent success. Common conditions and/or operational parameters include without limitation: refresh rate, clock rate, cycle time, voltage, temperature, humidity, and/or any other factor that can be adjusted for memory operation. For example, memory searching may be use a characterized voltage to achieve a specific power consumption.

In other examples, the memory may be operated at specific extreme temperatures (e.g., heat, cold, and/or humidity). In some cases, extreme temperatures may be the direct result of reduced environmental support (e.g., reducing the HVAC overhead required for a mining operation). Current criticisms leveled at extant mining apparatus often cite the environmental costs of mining equipment (e.g., kWh of electricity, HVAC BTU, etc.) In short, extant mining is decidedly "non-green," and if implemented on a large scale, could have profound negative impacts on the earth's ecosystem. As such, if mining or similar processing equipment could operate with relaxed HVAC requirements and/or reduced electrical demands, and make use of work product such as memory devices which would otherwise be thrown away (as in the various implementations of the present disclosure), such solutions would be much more desirable from an ecological perspective as well.

As a related note, many mining operations are (as of the date of this writing) locating/relocating to colder climates to use natural ambient temperature in place of HVAC. However, in order to supply the necessary electricity to such facilities, additional grid capacity, distribution lines, etc. must be built, all leading to further ecological degradation, especially in areas which heretofore have been less affected by human activities. Stated simply, extant mining apparatus and techniques are pushing man-made ecological degradation selectively to earth's most well preserved and pristine areas. This could degrade and waste some of earth's most precious resources at an accelerated rate compared with e.g., warmer climates. Processing apparatus which can tolerate higher operational temperatures can help reduce some of the negative effects on the planet by enabling mining operations in warmer climates where e.g., power infrastructure already exists.

In some implementations, ledger appliances may adjust POW mining dynamically. For example, memory search speeds can be throttled up or down so as to tradeoff between bit error rate (BER) and power consumption. Dynamic adjustment of characterized parameters may be used to adjust for a variety of different considerations. In other such implementations, the characterized rate is selected statically. For example, data mining appliances may over-clock all memories to the same rate, and manage differences in BER with error-tolerant computing. Still other variations of the foregoing may alternate between dynamic and static parameterizations so as to determine the most effective operation mode. For example, an apparatus using experimental memory technologies may dynamically adjust voltage (holding all other parameters constant) for one iteration, and then dynamically adjust clock rate (holding voltage constant) for a subsequent iteration to determine the ideal combination of voltage and clock rate.

While device performance is tied to solution density in the illustrative examples, there may be situations where there is no relationship (or only a slight relationship). In one embodiment, the characterized parameter is selected based on solution considerations. For example, a characterized rate may be selected to achieve a particular system efficiency. In some such variations, different solution considerations may be weighted differently e.g., false positive solutions may be more or less heavily weighted than false negatives.

In a related tangent, there may be applications that are not dependent upon device performance. In such cases, the characterized parameter may be selected based on application considerations. For example, the application may have specific processing, memory, or other resource considerations that should be accounted for when using the characterized memory. As but one such instance, an application may perform both uniform searching and non-uniform searching; uniform searching may allow for more lax refresh rates and higher clock rates, whereas non-uniform searching may require stricter refreshing and slower clocking.

In one embodiment, the characterized rate is selected based on commercial interests and/or business considerations. As previously noted, certain commercial and/or business considerations may warrant more or less aggressive memory use. For example, cryptocurrency rewards may be sufficiently lucrative to operate memories at rates and voltages high enough to be destructive. In other examples, memory may be expensive and worth keeping functional as long as possible. Still other variations of the foregoing may be substituted by artisans of ordinary skill in the related arts with equivalent success given the contents of the present disclosure, the foregoing being purely illustrative.

In one exemplary embodiment, a population of characterized memories are used. In some variants, the memories can be parallelized (e.g., using different nonces, salts, hashes, or other forms of seeding). In some cases the seeding may be randomized; in other cases, seeding may be coordinated. In other variants, the memories may be assigned to different portions of an application (e.g., different search spaces). In still other embodiments, multiple memories perform a common search and use a majority "vote" to provide outputs.

In still other variants, the memories may be "striped" (as in a RAID type configuration). In some striping variants, the memories may include various portions of data, redundancy information (parity), correction information (e.g., hamming codes, CRC) and/or some combination thereof.

In some cases, different devices within a population of devices may be individually configured to run with different operational parameters and/or desired performances. For example, in some cases it may be desirable to run some devices at very high speeds and other devices at lower BER. For example, a diverse population of devices may excel in different aspects of an application; e.g., uniform searching over a large search area may be done with many devices at high speed (e.g., redundancy of memory searches), whereas non-uniform searching of a sub-sector may be performed with a single device at lower BER (which can be slower but must be accurate).

Returning again to FIG. 10, when a POW solution is found in step 1006, some embodiments may directly provide without further checking. In other embodiments, solutions should be checked before use (steps 1008 of the method 1000). In some variants, an additional monitoring and analysis process 1100 is performed if the solution fails the checking procedure (described in greater detail below).

In one exemplary embodiment, solutions from multiple searching apparatuses can be checked with the same checking apparatus, thereby providing a more distributed and efficient approach. In one such variant, checking a solution is asymmetric relative to searching for solutions. In other embodiments, a searching apparatus checks its own solutions.

In the present context, the term "valid" and/or "validation" refers to a solution which satisfies a requirement external to the memory device e.g., a validity check of the application. In one such example, a result for a header/nonce combination for a directed acyclic graph (DAG) is valid if it exceeds a predetermined target threshold. As used herein, the term "verify" and/or "verification" refers to a value that is checked to be true or accurate internal to the memory (e.g., neither a soft or hard error). While validity checks and verification checks are usually synonymous, not all applications treat validity and verification identically.

In one exemplary embodiment, a validation apparatus checks that the solution is valid for external use. In one such implementation, the validation apparatus includes a first-class memory, such as memory with general compute BER (e.g., $1 \times 10^{-18}$ BER or better). In some implementations, the validation process includes checking whether the header/nonce solution is unique and verifying that the DAG transitions result in digested mix that exceeds a target threshold.

If the identified POW solution is valid, it is published/broadcasted to the network to be validated by the peer nodes of the network. Conversely, if the header/nonce solution is invalid (for either lack of uniqueness or incorrect DAG transitions) then the solution is ignored.

In some embodiments, a verification apparatus verifies that the identified solution is an accurate memory access. For example, if the solution was identified at a first clock rate characterized with a first BER (e.g., $1\times10^{-5}$), then the verification apparatus may re-read the memory locations at a lower speed characterized by a more accurate BER (e.g., $1\times10^{-18}$). In some cases, re-reading the same memory location may be counterproductive because the original read may have refreshed the memory location (e.g., reading a DRAM location results in re-charging (or discharging) the capacitive cell); thus in some cases, the re-read may be performed at the lower clock rate on a memory with mirrored data. If the identified solution is verified, then it can be used. Conversely, if the solution is not verified then the identified solution may either be ignored or used in its corrected form.

In some embodiments, a checking apparatus may ensure that the returned result appears to be "sane." Sanity checking refers to checks which do not validate or verify, but only filter values that are clearly incorrect based on some predetermined expectation. Common examples of sanity checks include checking e.g., that a value is within a range of acceptable values, that the value complies with accepted formats, that the value does not significantly deviate from historic values, that the value does not deviate from expected statistical behavior, and/or any number of other criteria. For example, certain types of machine learning and/or artificial intelligence applications may include limitations on data ranges or results (e.g., an oil drill cannot be drilling beyond a maximum or minimum value, certain DNA sequences do not generate proteins, etc.).

Moreover, while the foregoing discussions are presented in the context of checking a solution using e.g., a validation memory, other forms of checking may be based on computation and/or external information. More generally, any technique for checking that the solution is acceptable for use may be substituted with equivalent success. Common examples of checking may include e.g., error checking (CRC, hamming, parity), format checking, authentication, authorization, error correction, and/or reformatting.

When a ledger finds proof-of-work (POW), it can propose to add blocks to the blockchain. Thereafter, the process is repeated (return to step 1006).

In one exemplary embodiment, the validation apparatus transmits or broadcasts the validated solution to a plurality of peers in a network for validation by at least some of the peer miners. Each data subset (e.g., transaction block) is stored on nodes of the system or nodes that are in communication therewith. Once a peer miner in the network puts forth processing effort to validate the block, it circulates the block for the transaction to other nodes for consensus. When a consensus is reached (e.g., that the block is valid), the block is appended to the blockchain. For example, the valid block can be appended to the blockchain in a time stamp order. In some variants, once the block has been validated and added to the blockchain, the submitter can receive compensation for the work. For example, the submitter can receive a digital redeemable token in exchange for integration of the valid block as part of the blockchain. The digital token would be virtual currency (e.g., a digital coin, such as Ether, etc.). However, with respect to other contemplated applications, other types of compensation can be received, such as a fiat currency, a coupon, an exchanged service, etc.

The present disclosure recognizes that blockchain "blocks" can take on a broad spectrum of information, such as data relating to financial transactions, non-monetary transactions, and/or any other type of data record. In some cases, blocks may include referential information e.g., pointers, etc. For example, pointers could include human readable pointers, file names, file handles, uniform resource locator (URLs), uniform resource identifier (URIs), or other types of text-based addresses. In some implementations, the pointers may be document object identifiers (DOIs), which point to documents, or pointers indicating permanent references that index to supporting evidence, documents, etc. For example, the pointers may reference an indexing system, which could include the pointer address indicative of the location (e.g., specific network locations, virtual/cloud-based storage locations) for such documents. In other implementations, the blocks can include profile data, such that profiles can be generated and added to the database with the validated transaction block. Additionally, in some implementations, the data included in the transaction block can be encrypted, particularly in scenarios where the data is highly sensitive or private, such as with medical records, etc.

In some embodiments, the solution may be provided to a peer entity for use within an application. The peer entity may be trusted or untrusted. In other embodiments, the solution may be provided to a centralized entity (e.g., a cloud server), distributed among a number of entities (e.g., a fog based network) or otherwise used within a client side application. Still other network topologies may be substituted with equivalent success, the foregoing being purely illustrative.

As previously noted there are many envisioned uses for the various principles described herein. For example, the solutions may be used for e.g., biometric searches, environmental or natural population characterization (e.g., characterizing multipath fading effects for telecommunications, climate prediction, biological population simulations, etc.), artificial intelligence and/or machine learning applications (e.g., audio or visual image recognition, object recognition, etc.), probabilistic and/or stochastic pattern recognition, and/or any number of other memory based simulation and/or modeling.

Methods for Monitoring and Analyzing Characterized Memory Performance—

Referring now to FIG. 11, a logical flow diagram of one generalized method 1100 for monitoring and analyzing characterized memory performance using the computational appliance of the present disclosure is presented.

Notably, one synergistic aspect of characterized memories and solution density functions is that the device's remaining usable life and/or performance margins can be inferred from the fault density. More directly, existing general compute memories are required to be nearly "ideal" for practical use, thus errors necessitate replacement regardless of the memory's actual usability. In fact, the unrealistically high performance requirements for general compute memories leave ample margin for many modern applications. By monitoring the performance of a characterized memory during operation, the gradual decay of hardware performance can be managed so as to maximize usable memory lifetime.

In one exemplary embodiment, the method 1100 is initiated responsive to the detection of a fault (e.g., from the aforementioned step of 1008 of FIG. 10). In other embodiments, the method 1100 may continuously run as a monitoring process. In still other embodiments, the method 1100 may be periodically performed on regular intervals (e.g., once every minute, hour, day, week, etc.), or triggered by various events. For example, event triggered monitoring may be based on e.g., a penalty event (or a frequency of penalty events). Other common examples of trigger events may include: a number of faults exceeding a designated threshold, a rate of change of faults exceeding a designated threshold, a rate of accumulation of faults exceeding a designated threshold, historic fault accumulation behavior (for similar memory technologies), user or business considerations (e.g., triggered by miner queries, automated financial performance reporting, etc.), and/or any number of other points of interest.

At step 1102 of the method 1100, performance is compared to the expected solution density function. In other embodiments, performance is compared to an expected system efficiency.

As discussed elsewhere herein, POW algorithms, like Ethash for example, are memory intensive, and therefore memory degradation will occur at a probabilistic rate. Different kinds of memory have different degradation rates. Accordingly, in one exemplary embodiment, each of the memories degradation rates can be monitored or tracked. For example, the degradation rate may be based on the rate of accumulating memory errors (which will increase as the memory drops off in accuracy). Once a memory has too many failures (for instance, past a certain threshold), the system can cause the degraded memory to refresh.

In one exemplary embodiment, a running proof-of-work (POW) efficiency is compared to the BER that should result from the current characterized memory operating at the characterized rate. For example, for a characterized memory having a corrected BER of $1 \times 10^{-5}$ should generate Ethereum POW with a system efficiency not below 90% (see FIG. 2C, supra). Thus, when system efficiency falls below 90%, the characterized memory is performing outside of the expected solution density.

More generally, a variety of different metrics can be used to determine operation that requires remediation. For example, a reduced data rate may indicate higher internal bandwidth consumed by error correction. Similarly, a reduced latency or throughput may indicate longer error correction intervals and/or lower yields from error correction. Still other variants may be substituted with equivalent success by artisans of ordinary skill, given the contents of the present disclosure.

In the present context, the term "outside" a solution density function or system efficiency refers to performance that exceeds the bounds (either minimum or maximum) of acceptable performance. As a related usage, the term "inside" a solution density function or system efficiency refers to performance that lies within the bounds of acceptable performance.

In some implementations, a margin of tolerance is implemented. For example, even though POW efficiency for the characterized memory and characterized rate should be 90%, corrective action may not be undertaken until 85% (e.g., a 5% margin). While the foregoing examples are provided in view of a threshold value (e.g., a minimum or maximum value), other forms of comparison may be used including e.g., absolute ranges, relative ranges, statistical analysis, rate of change, and/or any number of other such analytics commonly used in the quality assurance arts.

Referring back to FIG. 11, the illustrated embodiment takes no action if the performance is inside the expected solution density function or system efficiency (for example, the process can return to the aforementioned step 1006 of FIG. 10). However, in other embodiments (not shown), maintenance or other routine activities may be performed even where the performance is inside the expected solution density function or system efficiency. For example, when a fault is incurred within the solution density function or system efficiency, the memory may be refreshed and/or one or more entries may be corrected. Similarly, system efficiency for error-tolerant applications may be used to select and/or track performance; dynamic performance metrics may be used to dynamically adjust error-tolerant application parameters and/or infer when system maintenance is required.

When performance is outside the expected solution density function or system efficiency, then the faults may additionally be characterized as either "correctable" faults and/or "uncorrectable" faults (step 1104). As previously noted, "correctable" faults can be corrected with e.g., repair and/or error correcting codes (ECC). However, "uncorrectable" faults cannot be corrected due to e.g., exhaustion of repair resources and/or limitations of ECC capability. Thus, for example, one technique for determining whether a fault is a correctable or uncorrectable fault is to write one or more sectors of the memory with the corresponding DAG section and read back the contents; if the sector is correctly written then the faults were correctable. If instead, the sector is incorrectly written, then the incorrect writes uncorrectable faults. In other variants, the memory may be removed from service and tested via traditional memory testing methods (e.g., reading and writing back a checkerboard pattern, an all "ones" and all "zeroes", a pseudorandom generator, etc.). Other techniques for determining whether a memory fault is correctable or uncorrectable will be readily appreciated by those of ordinary skill in the related arts.

As shown in FIG. 11, when the memory has an excessive amount of faults and the faults (or a significant fraction thereof) can be corrected, then the memory can be refreshed and/or re-characterized. As previously noted, refreshing the memory may be performed by re-writing the memory contents (e.g., the current DAG or a portion thereof) to the memory. In one exemplary embodiment, the memory contents are copied from a presumed pristine copy (e.g., such as from the validation memory). In other embodiments, the memory contents (or a portion thereof) may be generated from scratch (e.g., such as where there is no validation stage memory).

In some variants, the refreshed portion may be identical to its prior contents. In other variants, the memory may be written with a different pattern (e.g., to wear-level memory usage). For example, within the context of an Ethereum DAG, a refreshed sector of memory may receive a different portion of the DAG. Juggling the Ethereum DAG over the entire surface of a characterized memory may further allow for longer usable life since each cell is probabilistically allocated different values over time.

Furthermore, the memory may be re-characterized where some faults are uncorrectable or where performance can be improved by adjusting other operational parameters (e.g., clock rate, voltage, etc.). For example, a memory that only needs to operate at a BER of $1 \times 10^{-5}$ can be re-characterized to run at a slower clock rate, higher voltages, etc. By using less aggressive operational parameters, the performance of the memory can be improved and/or the usable life can be extended.

Moreover, artisans of ordinary skill in the related arts will readily appreciate that a greater number of hard errors merely reduces the acceptable margin of soft errors. As a related corollary, since the margin of soft errors reduces as hard errors accumulate, the memory degradation can be accurately managed throughout the entire duration of its usable life. In other words, the frequency of memory refreshing will increase as the memory degrades. When the cost of refreshing and/or re-characterizing the memory approaches (or outweighs) the benefits of keeping the memory in service, then the memory can be removed from service permanently.

For example, assume that a memory is running at $1 \times 10^{-5}$ BER (90% efficiency). Operational parameters for the memory may be set aggressively until it falls below 85% efficiency (indicating that the memory's performance is slipping down the curve of FIG. 2C). At that point, the memory may be re-characterized for less aggressive clock rates and/or voltages (returning to the 90% efficiency).

At step 1108 of the method 1100, when the memory has an excessive amount of faults and the faults (or a significant portion thereof) are uncorrectable, then the memory should be replaced.

While the foregoing discussion is presented within the context of DRAM memory technologies, artisans of ordinary skill in the related arts given the contents of the present disclosure will readily appreciate that other memory technologies may be substituted with equivalent success. For example, Flash memory is non-volatile memory that does not "refresh", however Flash memory designates a set of sectors to replace broken cells; the replacement cells can be "fused" in. The Flash memory usable life ends when all of the fuses have been consumed. Analogous techniques can be used within other memory technologies such as FeRAM and/or 3D memories.

Alternative Computational Appliance Applications—

As explained above, validating results from unreliable memory for POW-based mining of cryptocurrencies (e.g., Ethereum) is just one exemplary application for the computational appliance that is contemplated by the present disclosure. The various techniques described hereinafter may be suitable for a range of applications.

Exemplary Social Media Network Operations

As noted above, the potential applications for blockchain data structures may be wide ranging. One such application is social networking, where the computing power and/or memory of the apparatus/system of the present disclosure can be used to store a user's data in blockchain repositories that can be trusted, encrypted, and widely disseminated.

In one exemplary embodiment, a social media network based on blockchain data structures could be disseminated and held by many parties in an open ledger type format in exchange for e.g., cryptocurrency or other compensation. Unlike centralized social networking platforms that sell user data for profit, the distributed social media network may be privacy-focused such that a user would be provided with control over how their data is used, mined, and/or sold. Moreover, the user may have the ability to opt-in or opt-out of how data is collected.

In contrast to advertisement or data selling schemes, the present disclosure contemplates users earning and spending cryptocurrency or other financial instruments (which can be unique to the social media network). In some variants, the user may be able to earn money for viewing targeted advertisements, patronizing businesses, and/or "taste making". In some variants, the user may be able to buy and/or sell goods and/or pay for services (regardless of whether it the transaction is user-to-user, user-to-business, business-to-business, or business-to-user or charity-based). Such a social network may utilize memory hard databases and provide fluid virtualized transactions for e.g., publishers (e.g., journalists) and content creators.

Moreover, in some embodiments, a digital currency mined using the systems of the present disclosure could be used to run/financed the social media network, as well as be used for transactions made through the social media network. Such a cryptocurrency could even be created specifically for, and unique to, the social media network.

Artisans of ordinary skill in the related arts given the contents of the present disclosure will readily appreciate that the foregoing example is purely illustrative; the various techniques described herein may find broad applicability in any applications for de-centralized user controlled social networking.

Other Exemplary Uses for Invalid Solutions—

In the prior discussions, valid POW solutions were broadcasted to the network and invalid solutions were ignored. As noted above, invalid solutions would be construed by untrusting peer miners as e.g., a failed malicious attempt. However, in a community of miners that trust one another, invalid POW solutions may be used in proving that actual work was being done (e.g., mining was being performed) even though no valid solutions were found. More directly, "near misses" may still have significantly less value than a valid solution, but they may have some value more than nothing. More directly, a "near miss" solution is still evidence of real work that was done; however, because it cannot be validated by an external party, it is not fungible outside of the trusted context.

Consider the exemplary scenario where Company A hires Company B for X duration (e.g., an epoch) to mine for solutions, and the expected outcome for that task is that Y valid solutions (e.g., 20) should be found in that X duration, within a certain predefined space of memory. As previously noted, mining is a probabilistic process and it is possible that Company B only finds half of the valid solutions that were contracted for. Under such conditions, Company A might assume Company B only did half of the contracted work or worked for half of the contracted time, unless Company B can prove otherwise.

One way to prove that actual work was performed is for Company B to provide Company A with the "near misses". A randomly generated string of random numbers and letters (representative of the hash function) cannot be verified and would be easily debunked, however near misses can be verified (even where they cannot be validated). Additionally, the density function of a "near miss" can be used to determine how much work was actually done and the "exchange rate" for near misses to valid solutions. As a brief aside, artisans of ordinary skill in the probability arts will recognize that the density function of the solution is low (i.e., it is difficult to find a solution) when there is a lot of variance. A "near miss" may have a density function variance that may be ten times or a hundred times greater than valid solutions (a near miss is easier to find), but it is more than zero (i.e., better than no credit).

In the aforementioned scenario, Company B may show that they have not breached any contractual obligations to Company A and acted in good faith. As a result Company A could provide Company B with contractual compensation for the POW solutions that were found and possibly a prorated compensation for the showing of their good faith work effort during the contracted time. More directly, the ability to use near misses as a lesser form of POW reduces the contractual uncertainty of probabilistic activities, thereby improving the negotiation of terms.

Artisans of ordinary skill in the related arts given the contents of the present disclosure will readily appreciate that the foregoing example is purely illustrative; the various techniques described herein may find broad applicability in any applications for evidencing memory hard work and/or business models that contractually specify memory hard work obligations.

"Non-hoarded" Applications—

By its nature, prior art paradigms such as Bitcoin involve some element of "hoarding" of the currency (i.e., Bitcoins), by virtue of there being a finite supply of Bitcoins that ultimately can be obtained by miners by showing valid POW. As in conventional mineral mines, once the extant supply of minerals is gone, no further mining is possible. As such, there is a strong incentive for such hoarding of the finite assets, increasingly so as the volume of remaining (unobtained) assets declines toward zero. Moreover, in the Bitcoin paradigm, the solution becomes increasingly more difficult with time, since the bar is effectively being raised constantly as miners obtain more and more Bitcoin, and the blockchain gets longer.

In contrast, for non-monetary paradigms wherein blockchain/distributed ledger technology can be applied, such as e.g., medical records of a plurality of individuals, there is no incentive to hoard, and a scarcity of "assets" is not desired. There is in effect no incentive to "race to the solution" as in e.g., Bitcoin. Such "non-scarce" applications as e.g., medical records are accordingly a good fit with the memory-hard, characterized memory appliances and approaches of the present disclosure, since the advantages of brute-force (processor hard) technology are effectively inapplicable in such cases. The solution is in each case effectively stable, and there is nothing to be gained by throwing massive amounts of processing capability (or memory capability for that matter) at the problem.

Notably, in such applications as the aforementioned medical records, the degree of difficulty of the solution can be scaled (even dynamically) based on any number of factors such as for instance: (i) the type of application/data protected (e.g., medical records may be much more "sensitive" than say records relating to one's online usage or music preferences, thereby requiring a much harder solution); (ii) time/date (certain temporal periods may have greater or lesser requirements imposed on them), and (iii) volume of participants/records (e.g., systems with few participants or records may want to impose different solution requirements than those with a large number of participants/records).

Accordingly, the memory hard appliances and techniques described herein are well suited to such dynamic scaling, since their performance can be directly scaled in silicon (e.g., by adding more or less characterized and/or "out of range" general compute memory) based on difficulty.

It will be recognized that while certain aspects of the disclosure are described in terms of a specific sequence of steps of a method, these descriptions are only illustrative of the broader methods of the disclosure, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the disclosure disclosed and claimed herein. Furthermore, features from two or more of the methods may be combined.

While the above detailed description has shown, described, and pointed out novel features of the disclosure as applied to various embodiments, it will be understood that various omissions, substitutions, and changes in the form and details of the device or process illustrated may be made by those skilled in the art without departing from the disclosure. This description is in no way meant to be limiting, but rather should be taken as illustrative of the general principles of the disclosure. The scope of the disclosure should be determined with reference to the claims.

It will be further appreciated that while certain steps and aspects of the various methods and apparatus described herein may be performed by a human being, the disclosed aspects and individual methods and apparatus are generally computerized/computer-implemented. Computerized apparatus and methods are necessary to fully implement these aspects for any number of reasons including, without limitation, commercial viability, practicality, and even feasibility (i.e., certain steps/processes simply cannot be performed by a human being in any viable fashion).

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, it will be understood by a person of ordinary skill in the art that the signal may represent a bus of signals, where the bus may have a variety of bit widths.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can include RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general purpose or special-purpose computer, or a general-purpose or special-purpose processor. Also, any connection is properly termed a computer-readable medium. For example, if the software is transmitted from a web site, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium.

What is claimed is:

1. A blockchain ledger apparatus, comprising:
a processor apparatus;
a data interface in data communication with the processor apparatus, the data interface configured to communicate via a data network; and
at least one blockchain processing module in data communication with the processor apparatus, the at least one blockchain processing module comprising:
a memory apparatus; and
a search apparatus in data communication with the memory apparatus, the search apparatus configured to search the memory apparatus according to a blockchain algorithm;
wherein the memory apparatus is configured to provide:
a first performance in error rate when the memory apparatus is operated in accordance with a first operating parameter; and
a second performance in error rate when the memory apparatus is operated in accordance with a second operating parameter;
wherein the search apparatus is configured to operate the memory apparatus in accordance with the first operating parameter to cause the memory apparatus to provide the first performance in error rate during execution of the blockchain algorithm;
wherein the processor apparatus is configured to:
receive user input data indicative of a user request; and
cause the search apparatus to operate the memory apparatus in accordance with the second operating parameter to cause the memory apparatus to provide the second performance in error rate during execution of the blockchain algorithm;
wherein the at least one blockchain processing module comprises a plurality of blockchain processing modules configured to be selectively activated and deactivated by the processor apparatus; and
wherein the blockchain ledger apparatus further comprises a non-transitory computer readable medium storing one or more instructions which when executed by the processor apparatus causes the processor apparatus to:
determine a progress within an epoch of the blockchain algorithm; and
based at least on the progress, selectively activate or deactivate at least one of the plurality of blockchain processing modules.

2. The blockchain ledger apparatus of claim 1, wherein the first performance associated with the first operating parameter comprises a characterized bit error rate performance associated with at least one of: (i) an applied voltage; (ii) an over-clocking rate; and (iii) a temperature.

3. The blockchain ledger apparatus of claim 1, wherein the memory apparatus comprises a general compute memory apparatus having a specified rate for operation under standardized operating conditions; and
wherein the first operating parameter comprises a characterized rate for operation under non-standardized operating conditions.

4. The blockchain ledger apparatus of claim 1, wherein the memory apparatus comprises a defective memory apparatus; and
wherein the first operating parameter comprises a characterized rate for operation under non-standardized operating conditions.

5. The blockchain ledger apparatus of claim 1, wherein the at least one blockchain processing module comprises a validation stage, the validation stage configured to validate at least one output of the search apparatus, the at least one output generated from a search of the memory apparatus according to the blockchain algorithm.

6. The blockchain ledger apparatus of claim 5, wherein the processor apparatus is further configured to transmit the at least one output of the search apparatus to a peer device when the at least one output is successfully validated.

7. The blockchain ledger apparatus of claim 1, wherein the at least one blockchain processing module comprises a plurality of blockchain processing modules; and
wherein a first blockchain processing module has a first configuration which is different than a second blockchain processing module that has a second configuration.

8. The blockchain ledger apparatus of claim 7, wherein the first configuration comprises a first overclocking rate and the second configuration comprises a second overclocking rate.

9. An apparatus, comprising:
a processor; and
at least one blockchain device in communication with the processor, the at least one blockchain device comprising:
a memory; and
a search circuit in communication with the memory, the search circuit configured to search the memory according to a blockchain algorithm;
wherein the memory is operable to provide:
a first performance in error rate when the memory is operated in accordance with a first operating parameter; and
a second performance in error rate when the memory is operated in accordance with a second operating parameter;
wherein the apparatus is configured to selectively cause, based on error rate, the search circuit to operate the memory in accordance with either the first operating parameter, or the second operating parameter, during execution of the blockchain algorithm; and
wherein the at least one blockchain device comprises a plurality of blockchain devices configured to be selectively activated and deactivated by the processor; and
wherein the apparatus further comprises a non-transitory computer readable medium storing one or more instructions which when executed by the processor causes the processor to:
determine a progress within an epoch of the blockchain algorithm; and
based at least on the progress, selectively activate or deactivate at least one of the plurality of blockchain devices.

10. The apparatus of claim 9, wherein the first performance associated with the first operating parameter comprises a characterized BER (bit error rate) performance associated with at least one of: (i) an applied voltage; (ii) an over-clocking rate; and (iii) a temperature.

11. The apparatus of claim 9, wherein the at least one blockchain device comprises a validation stage, the validation stage configured to validate at least one output of the search apparatus, the at least one output generated from a search of the memory apparatus according to the blockchain algorithm.

12. The apparatus of claim 11, wherein the processor is further configured to transmit the at least one output of the search apparatus to a peer device when the at least one output is successfully validated.

13. The apparatus of claim 9, wherein the at least one blockchain device comprises a plurality of blockchain devices; and
wherein a first blockchain device has a first configuration comprising a first overclocking rate which is different than a second blockchain device that has a second configuration comprising a second overclocking rate.

14. An apparatus, comprising:
a processor; and
a plurality of blockchain devices in communication with the processor, wherein each of the plurality of blockchain devices comprises:
a memory; and
a search circuit in communication with the memory, the search circuit configured to search the memory according to a blockchain algorithm;
wherein the apparatus is configured to use the plurality of blockchain devices to perform a same search in parallel using different operating parameters corresponding to different memory performance levels in error rate in the plurality of blockchain devices; and
wherein the apparatus is configured to selectively activate or deactivate at least one of the plurality of blockchain devices based on a progress within the blockchain algorithm.

15. An apparatus, comprising:
a processor;
at least one blockchain device in communication with the processor, wherein the at least one blockchain device comprises a plurality of blockchain devices configured to be selectively activated and deactivated by the processor; and a non-transitory computer readable medium storing one or more instructions which when executed by the processor cause the processor to:
determine a progress within an epoch of the blockchain algorithm; and
based at least on the progress, selectively activate or deactivate at least one of the plurality of blockchain devices.

16. The apparatus of claim 15, wherein the at least one blockchain device comprises:
a memory; and
a search circuit in communication with the memory, the search circuit configured to search the memory according to a blockchain algorithm.

17. The apparatus of claim 16, wherein the memory is characterized by a first performance associated with a first operating parameter; and
wherein the search circuit is configured to operate the memory in accordance with the first operating parameter.

18. The apparatus of claim 14, wherein the plurality of blockchain devices include a first blockchain device and a second blockchain device;
wherein a memory of the first blockchain device is configured to provide a first performance in error rate when the memory of the first blockchain device is operated in accordance with a first operating parameter;
wherein a search circuit of the first blockchain device is configured to operate the memory of the first blockchain device in accordance with the first operating parameter to perform the search;
wherein a memory of the second blockchain device is configured to provide a second performance in error rate when the memory of the second blockchain device is operated in accordance with a second operating parameter; and
wherein a search circuit of the second blockchain device is configured to operate the memory of the second blockchain device in accordance with the second operating parameter to perform the search.

* * * * *